United States Patent
Shimoura et al.

[11] Patent Number: 5,739,848
[45] Date of Patent: Apr. 14, 1998

[54] OBJECT RECOGNITION APPARATUS AND METHOD

[75] Inventors: Hiroshi Shimoura; Kenji Tenmoku, both of Osaka, Japan

[73] Assignee: Sumitomo Electric Industries, Ltd., Osaka, Japan

[21] Appl. No.: 731,582

[22] Filed: Oct. 16, 1996

Related U.S. Application Data

[62] Division of Ser. No. 301,434, Sep. 7, 1994, Pat. No. 5,638,116.

[30] Foreign Application Priority Data

| Sep. 8, 1993 | [JP] | Japan | 5-223357 |
| Sep. 8, 1993 | [JP] | Japan | 5-223358 |
| Nov. 25, 1993 | [JP] | Japan | 5-295631 |
| Dec. 7, 1993 | [JP] | Japan | 5-306725 |

[51] Int. Cl.$^6$ ............................ H04N 7/00; G06K 9/00; G06F 7/70
[52] U.S. Cl. ..................... 348/119; 382/104; 364/424.01
[58] Field of Search .............................. 348/113, 116, 348/118, 119, 143, 148, 169; 382/103, 104, 106, 107, 190; 364/460, 424.01, 424.02; 180/169

[56] References Cited

U.S. PATENT DOCUMENTS

| 4,476,494 | 10/1984 | Tugaye | 348/208 |
| 4,855,822 | 8/1989 | Narendra et al. | 348/118 |
| 5,051,906 | 9/1991 | Evans, Jr. et al. | 348/119 |
| 5,208,750 | 5/1993 | Kurami et al. | 348/119 |
| 5,220,508 | 6/1993 | Ninomiya et al. | 348/119 |
| 5,259,037 | 11/1993 | Plunk | 382/291 |
| 5,332,057 | 7/1994 | Butsuen et al. | 180/169 |
| 5,367,457 | 11/1994 | Ishida | 348/119 |
| 5,493,392 | 2/1996 | Blackmon et al. | 348/135 |

Primary Examiner—Amelia Au
Attorney, Agent, or Firm—Cushman Darby & Cushman IP Group of Pillsbury Madison & Sutro LLP

[57] ABSTRACT

An object recognition apparatus that can recognize an object in an image acquired by an on-vehicle camera mounted on a vehicle with high efficiency and accuracy. A recognition processing is carried out in a cut off range, which is cut off from the image, and in which an object to be recognized is supposed to be present. The cut off range is obtained using support information supplied from a position detection device and/or an anti-lock brake device of the vehicle. Since the object in the image changes its position as the vehicle moves, the displacement must be estimated during the object recognition. The estimation requires camera attitude parameters of the on-vehicle camera with respect to the road, and the estimation is performed using support information supplied from the position detection device and/of the anti-lock brake device. This will improve the efficiency and accuracy of obtaining the camera attitude parameters.

10 Claims, 49 Drawing Sheets

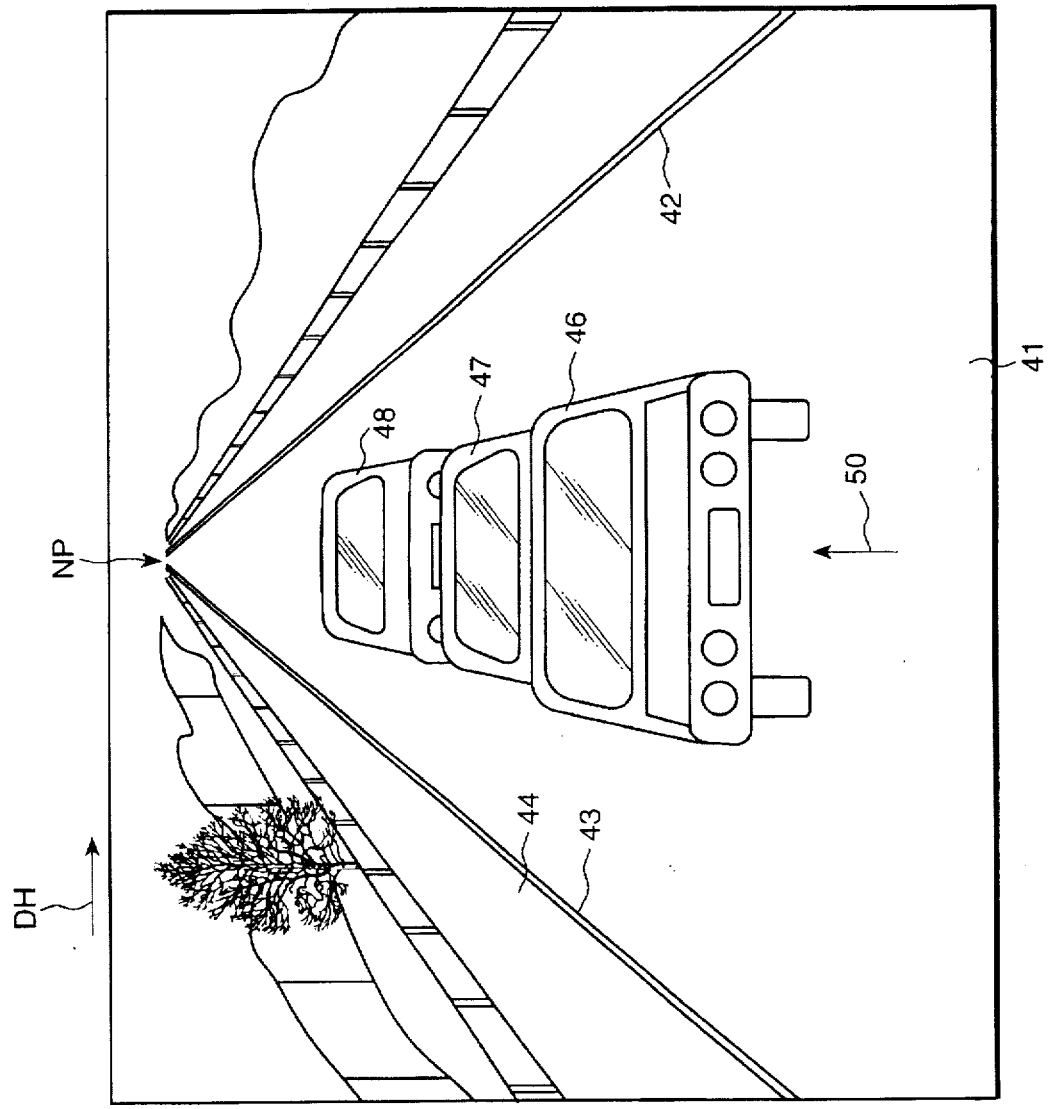

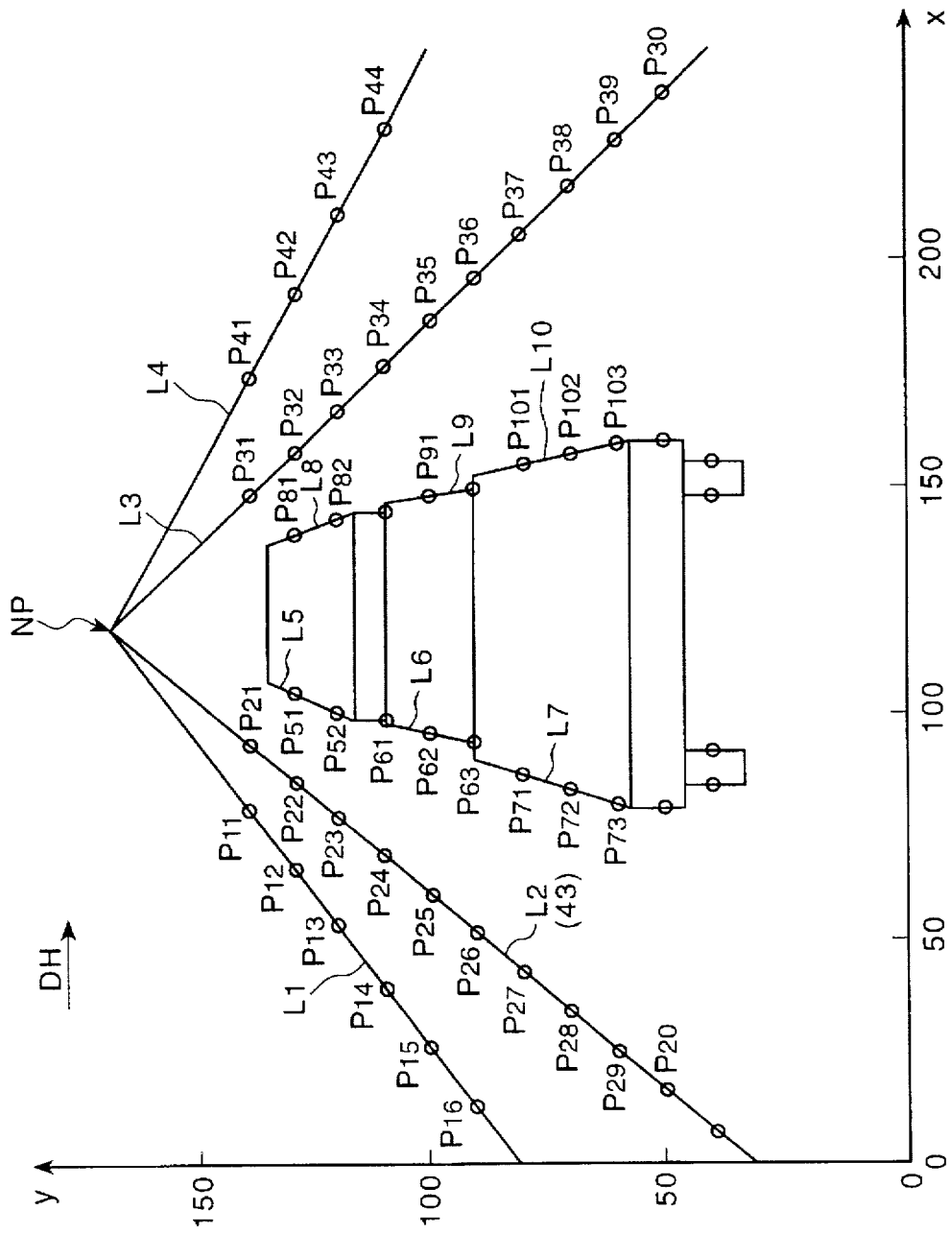

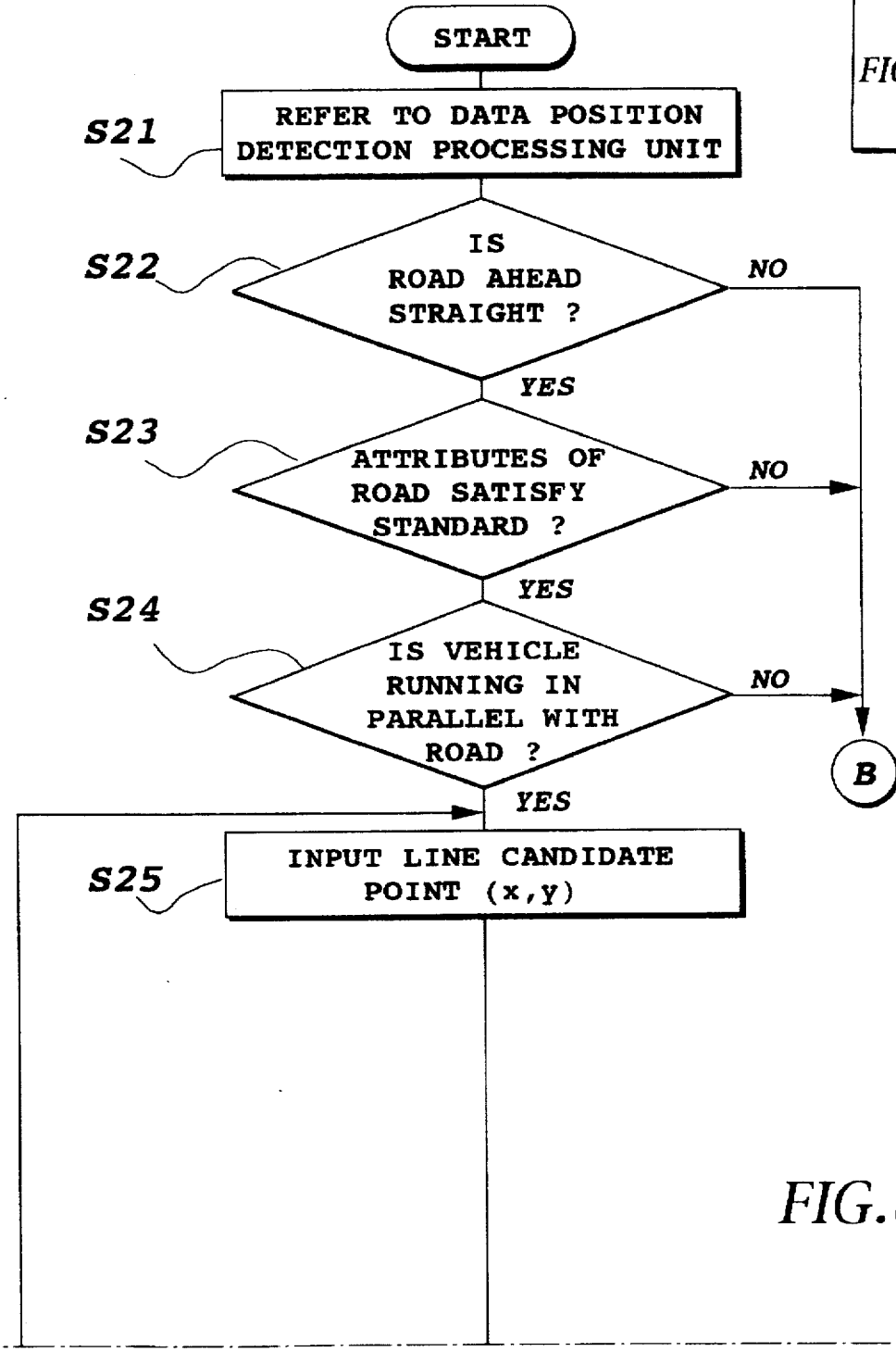

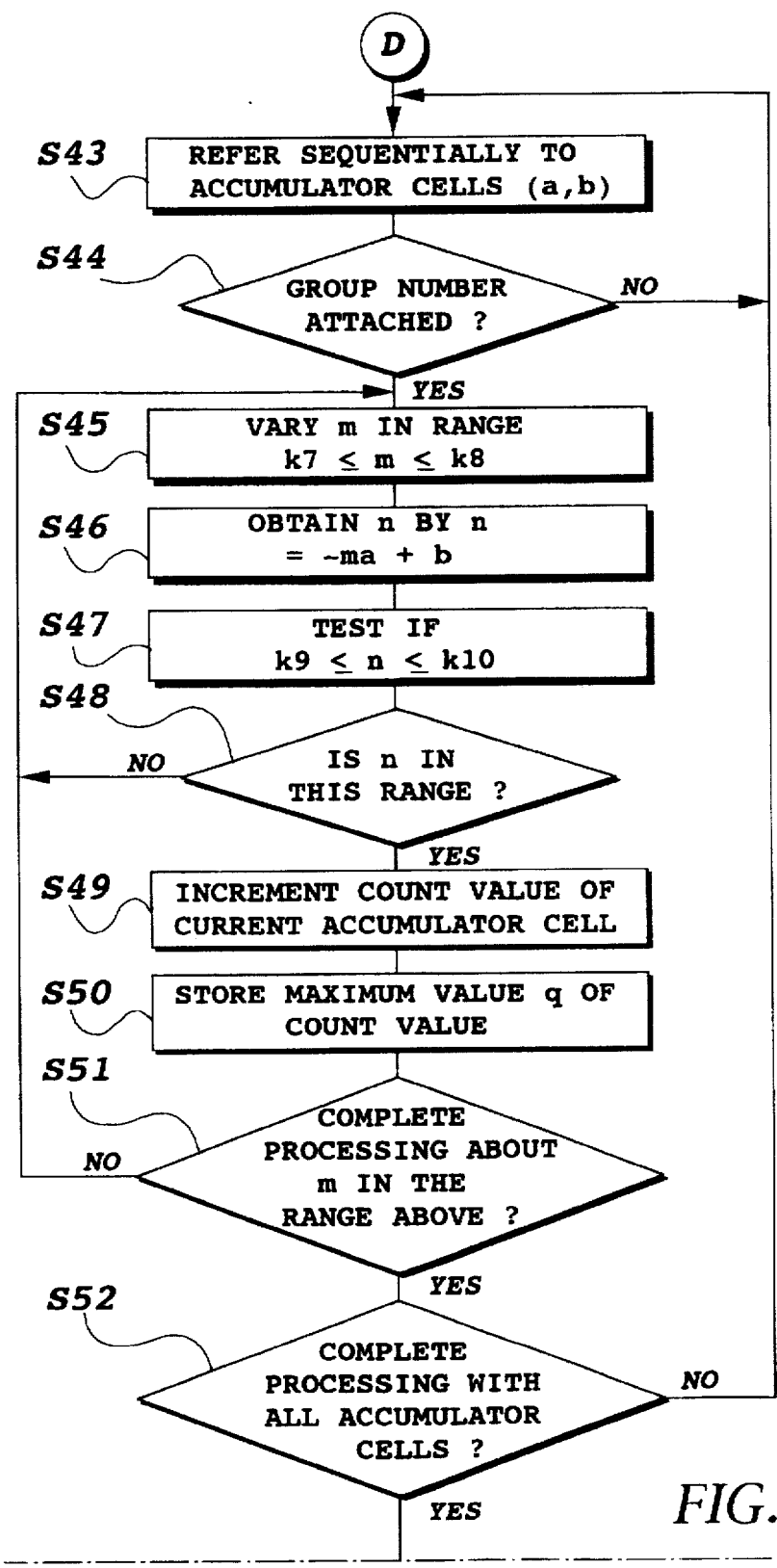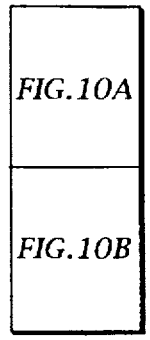
FIG. 10A

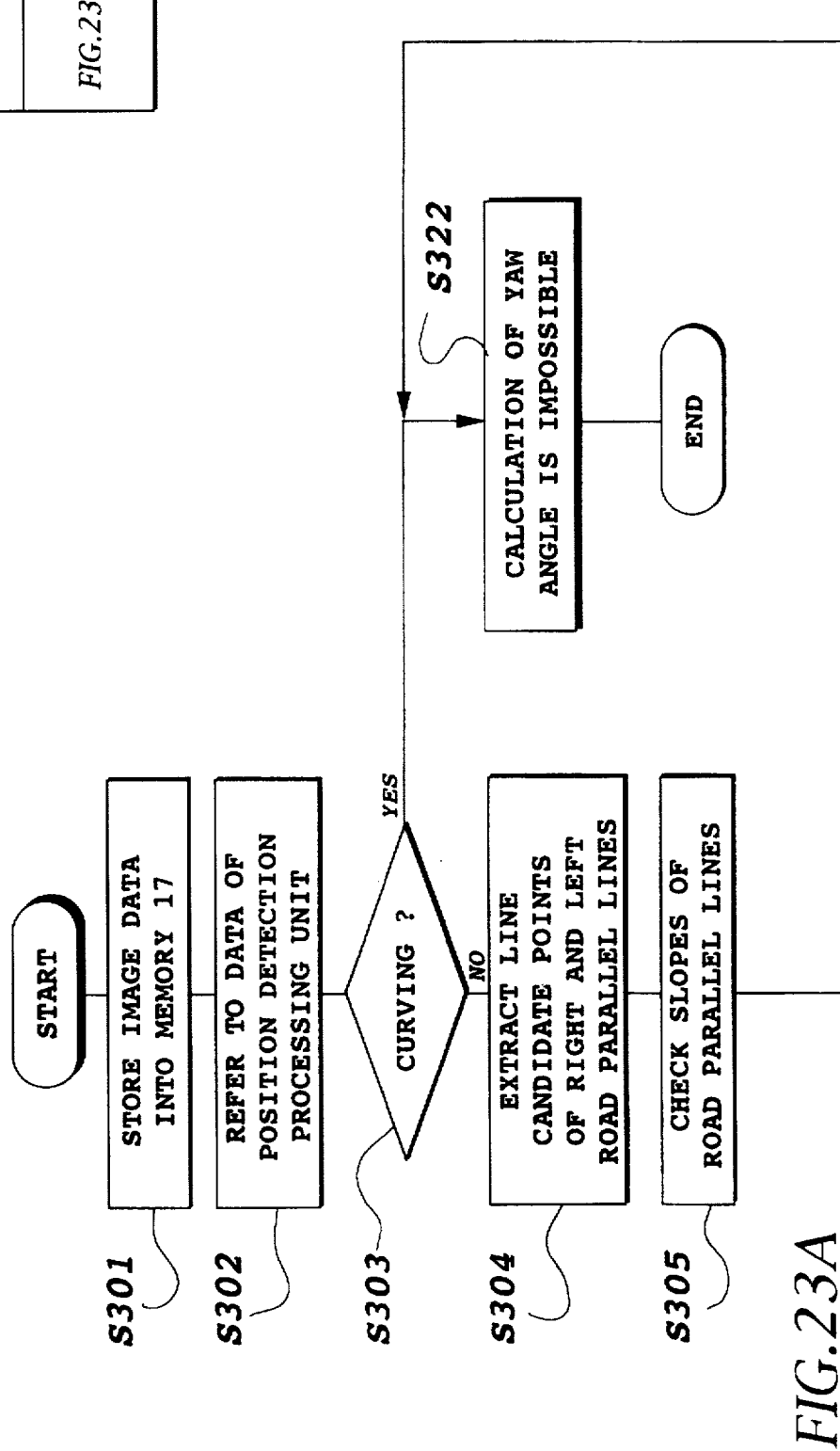

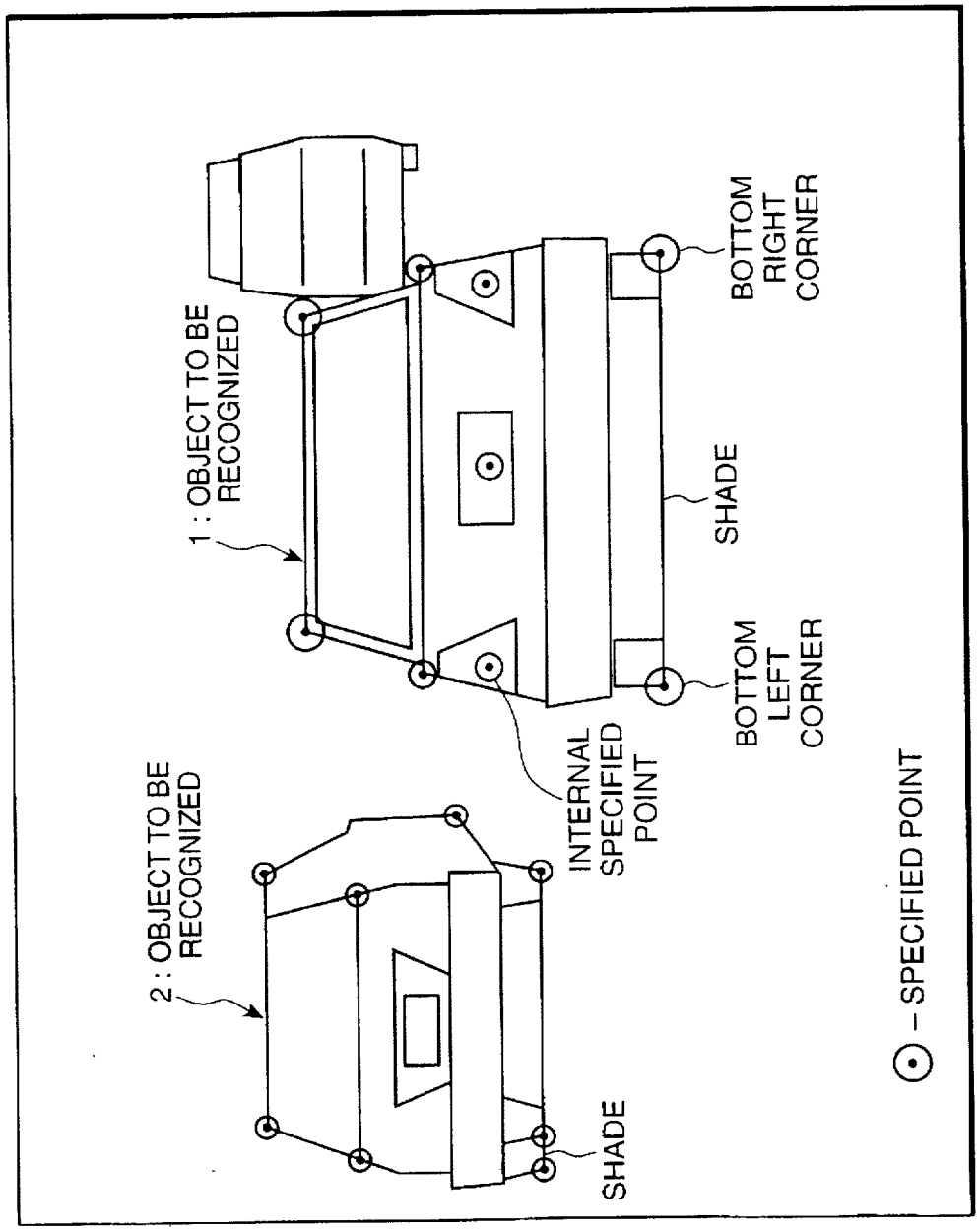

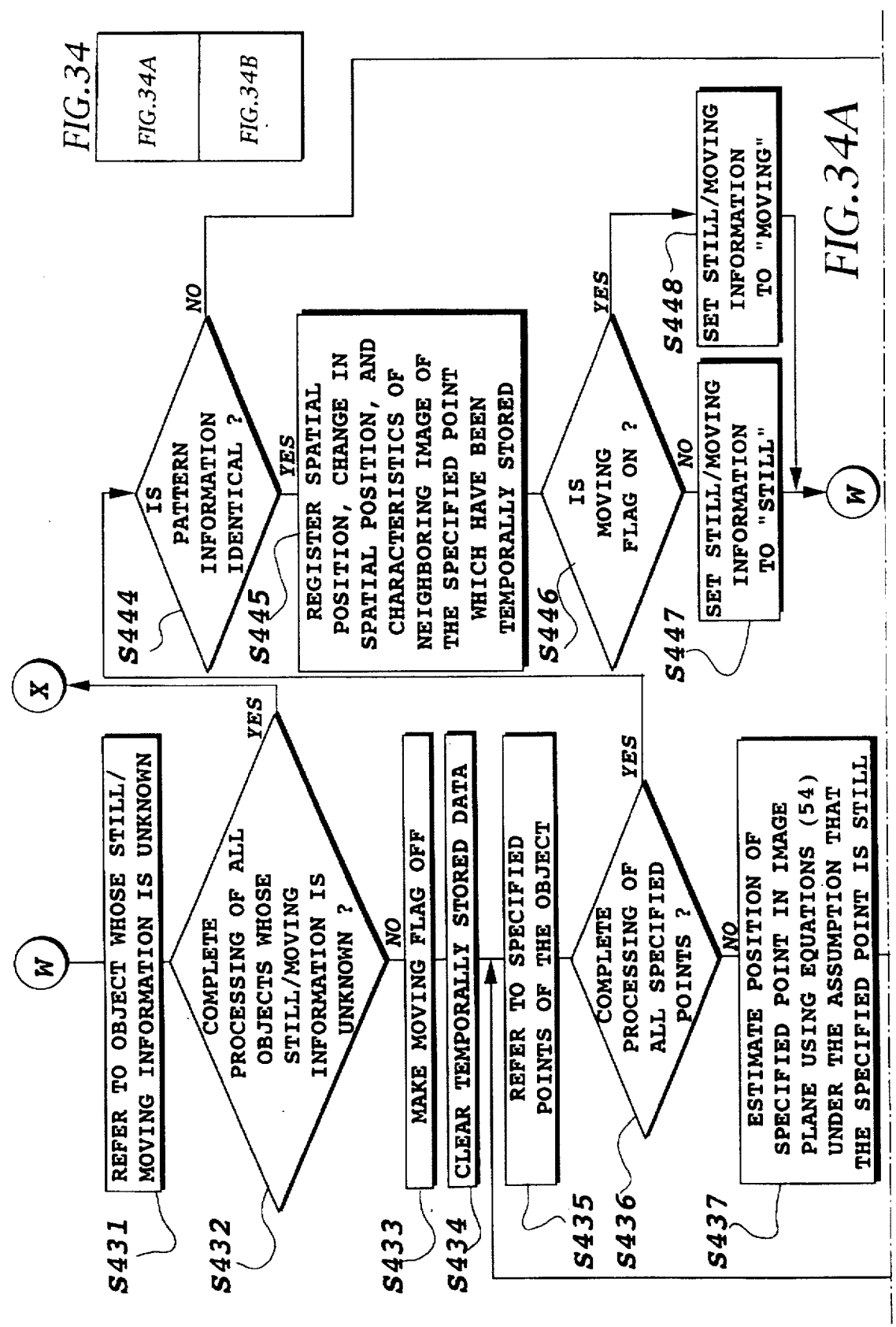

OBJECT REGISTRATION TABLE

| OBJECT NO | PRESENCE/ ABSENCE OF REGISTRATION | PATTERN INFORMATION | | | STILL/MOVING INFORMATION | NUMBER OF SPECIFIED POINTS | POINTER TO SPECIFIED POINTS |
|---|---|---|---|---|---|---|---|
| | | TYPE | SIZE | COLOR TONE | | | |
| 1 | | | | | | | |
| 2 | | | | | | | |
| 3 | | | | | | | |
| 4 | | | | | | | |

*FIG. 36A*

SPECIFIED POINT REGISTRATION TABLE

| NO. | PRESENCE/ ABSENCE | SPATIAL POSITION | | | CHANGE IN SPATIAL POSITION | | | CHARACTERISTICS OF NEIGHBORING IMAGE |
|---|---|---|---|---|---|---|---|---|
| | | X | Y | Z | $\Delta X$ | $\Delta Y$ | $\Delta Z$ | |
| 1 | | | | | | | | |
| 2 | | | | | | | | |
| 3 | | | | | | | | |
| 4 | | | | | | | | |
| 5 | | | | | | | | |

*FIG. 36B*

OBJECT RECOGNITION APPARATUS AND METHOD

This is a division of application Ser. No. 8/301,434, filed Sep. 7, 1994 now U.S. Pat No. 5,638,116.

BACKGROUND OF THE INVENTION

1. Field of the Invention

The present invention relates to an object recognition apparatus and method performing recognition of objects on and around a road, on which a vehicle is traveling, on the basis of images picked up by an on-vehicle camera, and to a camera attitude parameter generating apparatus and method producing camera attitude parameters which represent the attitude of the on-vehicle camera with respect to the road, and are used for the recognition of objects.

2. Description of Related Art

Various techniques have been proposed to pick up images ahead of or behind a vehicle by an on-vehicle camera, and to recognize objects in the images. For example, if the foregoing vehicles are recognized by processing the foregoing images of the vehicle, which are acquired by the on-vehicle camera, the results can be used in an automatic operation of the vehicle, thereby preventing an accident. Specifically, if other vehicles abnormally approach the vehicles, an accident can be prevented by automatic steering or brakes. Furthermore, if road signs can be recognized, the information associated with the road signs can be used in a navigation apparatus for directing a course of the vehicle.

When recognizing an object in an image acquired by an on-vehicle camera, the position of the object in the image changes every moment. A high efficiency recognition of such object which moves in an image from moment to moment requires accurate camera attitude parameters which represent the attitude of the on-vehicle camera with respect to the road, that is, to a quiescent coordinate system. In other words, the behavior of an object in an image can be estimated on the basis of the accurate camera attitude parameters. Using the estimation results makes it possible to cut off an image portion, which would include the object, from the image acquired, and to carry out an image recognition processing of the cut off image portion, which will improve the image processing efficiency. Here, the camera attitude parameters include the yaw angle, the roll angle and the pitch angle of the on-vehicle camera with respect to a road (a quiescent coordinate system) and a traverse deviation distance of the on-vehicle camera from a reference line parallel to the road.

The camera attitude parameters may be changed by variables inherent to the vehicle such as acceleration, speed, bearing of the vehicle. Many of these variables can be provided by a position detection processing unit and an anti-lock brake unit, which are mounted on the vehicle. The position detection processing unit has a basic function of detecting the current position of the vehicle on the basis of the mileage and bearing of the vehicle, and displaying them on a display unit with a road map. The anti-lock brake unit has a g-sensor detecting the acceleration (including deceleration) of the vehicle, and a wheel speed sensor detecting the rotational speed of a wheel, and controls the brake pressure on the basis of the detection results, thereby preventing the wheels from locking, and achieving an optimum braking.

In a conventional system, however, these data handled by the position detection processing unit or the anti-lock brake unit are not utilized to obtain the camera attitude parameters, and hence, the accuracy and efficiency of obtaining the camera attitude parameters are insufficient.

Since various objects such as vehicles, pedestrians, road signs will appear or disappear in a scene picked up by the on vehicle camera, an object that comes into a scene of the on-vehicle camera at a particular processing period must be identified in the scene at the next processing period. To achieve this, a tracking recognition of an object must be implemented by taking account of the position of the object, the change in the position, a positional detection error, identification of a still or moving state, patterns of the object, or the like. The tracking recognition of an object requires a quick processing because it is carried out by successively acquiring images by the on-vehicle camera while the vehicle is traveling.

SUMMARY OF THE INVENTION

It is therefore an object of the present invention to provide a camera attitude parameter generating apparatus and method which can produce camera attitude parameters with high accuracy and at high efficiency by using information provided by a position detection processing unit or an anti-lock brake unit.

It is another object of the present invention to provide an object recognition apparatus which can recognize an object on and around a road in images acquired by an on-vehicle camera.

According to a first aspect of the present invention, there is provided a camera attitude parameter generating apparatus comprising:

- an on-vehicle camera mounted on a vehicle to acquire an image ahead of or behind the vehicle;
- means for detecting a pair of road parallel lines in the image acquired by the on-vehicle camera while the vehicle is traveling on a road, each of the road parallel lines being parallel with the longitudinal direction of the road;
- means for obtaining the intersection of the pair of road parallel lines, thereby generating the intersection as a road vanishing point; and
- parameter generating means for generating at least one of camera attitude parameters on the basis of the pair of road parallel lines and the road vanishing point, the camera attitude parameters representing the attitude of the on-vehicle camera with respect to the road.

Here, the camera attitude parameters may include the yaw angle, roll angle, pitch angle of the on-vehicle camera with respect to a road, and a traverse deviation distance of the vehicle from a predetermined first reference line associated with the road.

The camera attitude parameter generating apparatus may further comprise a position detection device including sensors and road map data, the position detection device detecting first support information including a bearing, a position, and a mileage of the vehicle, wherein the parameter generating means uses the first support information in generating the camera attitude parameters.

The position detection device may provide the parameter generating means with the bearing of the vehicle and a bearing of the road from the position detection device, and the parameter generating means may obtain an angle between the bearing of the vehicle and the road parallel lines on the basis of the difference between the bearing of the vehicle and the bearing of the road, and may use the angle for calculating the camera attitude parameters.

The parameter generating means may consider the angle between the bearing of the vehicle and the road parallel lines to be zero if the difference between the change in the bearing of the vehicle and the change in the bearing of the road while the vehicle travels a predetermined distance is less than a predetermined value.

The parameter generating means may consider the angle between the bearing of the vehicle and the road parallel lines to be zero if the change in the bearing of the vehicle continues to be less than a predetermined value for a predetermined distance.

The parameter generating means may generate the attitude parameters only when the angle between the bearing of the vehicle and the road parallel lines is zero.

The parameter generating means may obtain the bearing of the vehicle from the position detection device, and may inhibit the generation of the camera attitude parameters if the change in the bearing of the vehicle is greater than a predetermined value.

The position detection device may provide the parameter generating means with information associated with the speed of the vehicle, and the parameter generating means may generate the camera attitude parameters when the speed of the vehicle is within a predetermined range.

The position detection device may provide the parameter generating means with information associated with the acceleration of the vehicle, and the parameter generating means may inhibit the generation of the camera attitude parameters when the acceleration exceeds a predetermined value.

The parameter generating means may generate the camera attitude parameters at a predetermined interval of mileage or time, and may generate averages of the generated camera attitude parameters as parameters associated with the attitude of the on-vehicle camera with respect to the vehicle.

The camera attitude parameter generating apparatus may further comprise a brake control device having second support information for controlling brakes of the vehicle, wherein the parameter generating means generates the camera attitude parameters using the second support information in addition to the first support information supplied from the position detection device.

The brake control device may have information associated with the acceleration of the vehicle, and the parameter generating means may inhibit the generation of the camera attitude parameters when the acceleration exceeds a predetermined value.

The brake control device may have information associated with an operation of the brakes, and the parameter generating means may inhibit the generation of the camera attitude parameters when at least one of the brakes is operated.

According to a second aspect of the present invention, there is provided a camera attitude parameter generating apparatus comprising:
  an on-vehicle camera mounted on a vehicle to acquire an image ahead of or behind the vehicle;
  road parallel line detecting means for detecting a pair of road parallel lines in the image acquired by the on-vehicle camera while the vehicle is traveling on a road, each of the road parallel lines being parallel with the longitudinal direction of the road;
  road vanishing point generating means for obtaining the intersection of the pair of road parallel lines, thereby generating the intersection as a road vanishing point;
  yaw angle observation means for observing the yaw angle of the on-vehicle camera with respect to the road on the basis of a coordinate of the road vanishing point, thereby outputting an observed yaw angle;
  a position detection device having sensors and road map data, the position detection device detecting first support information including a bearing, a position, a mileage, and changes in the bearing of the vehicle;
  yaw angle estimation means for estimating the yaw angle of the on-vehicle camera with respect to the road by applying the previously obtained yaw angle with respect to the road and the changes in the direction of the vehicle to a recursion formula prepared in advance, thereby outputting an estimated yaw angle; and
  yaw angle generating means for generating the yaw angle of the on-vehicle camera with respect to the road by using at least one of the observed yaw angle and the estimated yaw angle.

Here, the yaw angle generating means may select the estimated yaw angle as the yaw angle of the on-vehicle camera with respect to the road when the observed yaw angle is not obtained by the yaw angle observation means.

The yaw angle generating means may obtain the difference between the estimated yaw angle and the observed yaw angle, may obtain a weighted average of the estimated yaw angle and the observed yaw angle, and may output the weighted average as the yaw angle, if the difference is within a predetermined range.

The yaw angle generating means may obtain the difference between the estimated yaw angle and the observed yaw angle, and may output the estimated yaw angle as the yaw angle of the on-vehicle camera with respect to the road if the difference is greater than a predetermined value.

The yaw angle generating means may output the observed yaw angle as the yaw angle of the on-vehicle camera with respect to the road when the estimated yaw angle has been made the yaw angle of the on-vehicle camera for more than a predetermined interval.

The yaw angle generating means may suppress the output of the yaw angle of the on-vehicle camera with respect to the road until a turn of the vehicle has been completed when the turn is detected on the basis of the first support information supplied from the position detection device.

The camera attitude parameter generating apparatus may further comprise:
  pitch angle observation means for observing a pitch angle of the on-vehicle camera with respect to the road on the basis of a coordinate of the road vanishing point outputted from the road vanishing point generating means; and
  pitch angle generating means for estimating, if the road vanishing point is not obtained by the road vanishing point generating means and only a single road parallel line is obtained by the road parallel line detecting means, the coordinates of the road vanishing point on the basis of the single road parallel line and the yaw angle of the on-vehicle camera with respect to the road outputted from the yaw angle generating means, and outputting the pitch angle of the on-vehicle camera with respect to the road on the basis of the estimated coordinates of the road vanishing point.

The pitch angle generating means may suppress the output of the pitch angle of the on-vehicle camera with respect to the road until a turn of the vehicle has been completed when the turn is detected on the basis of the first support information supplied from the position detection device.

The camera attitude parameter generating apparatus may further comprise:
  slope detecting means for detecting the slope of each road parallel line outputted from the road parallel line generating means;

traverse deviation distance observation means for observing a traverse deviation distance of the on-vehicle camera from a predetermined reference line parallel with the road by using the slope of the road parallel lines detected by the slope detecting means and the height of the on-vehicle camera from the surface of the road, thereby outputting an observed traverse deviation distance;

traverse deviation distance estimation means for estimating the traverse deviation distance of the on-vehicle camera with respect to the road by obtaining the mileage of the vehicle included in the first support information supplied from the position detection device, and by applying a previously obtained traverse deviation distance of the on-vehicle camera with respect to the road and the mileage of the vehicle to a recursion formula prepared in advance; and traverse deviation distance generating means for generating the traverse deviation distance of the on-vehicle camera with respect to the road by using at least one of the observed traverse deviation distance and the estimated traverse deviation distance.

The traverse deviation distance generating means may select the estimated traverse deviation distance as the traverse deviation distance of the on-vehicle camera with respect to the road when the observed traverse deviation distance is not obtained by the traverse deviation distance observation means.

The traverse deviation distance generating means may obtain the difference between the estimated traverse deviation distance and the observed traverse deviation distance, and may output the estimated traverse deviation distance as the traverse deviation distance of the on-vehicle camera with respect to the road if the difference is greater than a predetermined value.

The traverse deviation distance generating means may suppress the output of the traverse deviation distance of the on-vehicle camera with respect to the road until a turn of the vehicle has been completed when the turn is detected on the basis of the first support information supplied from the position detection device.

According to a third aspect of the present invention, there is provided an object recognition apparatus mounted on a vehicle comprising:

an on-vehicle camera acquiring an image around the vehicle;

a position detection device including sensors and road map data, the position detection device detecting first support information including a bearing, a position, and a mileage of the vehicle;

means for estimating an image cut off range in the image acquired by the on-vehicle camera on the basis of the first support information supplied from the position detection device, the image cut off range is assumed to include an object to be recognized; and means for recognizing the object in the image cut off range.

Here, the means for estimating an image cut off range may comprise:

means for estimating, on the basis of the position of the object in the image at a particular time, the position of the object in the image at the next time, the interval between the particular time and the next time being determined in advance; and means for determining the image cut off range on the basis of the estimated position.

The means for estimating an image cut off range may provide the image cut off range with an error range that allows a certain amount of error in determining the image cut off range.

The means for estimating an image cut off range may determine the error range on the basis of the difference between the estimated position of the object in the image and an actual position at which the object is actually recognized in the image.

The position detection device may have information associated with the speed of the vehicle, and the means for estimating an image cut off range may determine the error range in accordance with the speed of the vehicle.

The means for estimating an image cut off range may determine the error range such that the error range is substantially proportional to the speed of the vehicle when the speed of the vehicle is greater than a predetermined value.

The position detection device may provide the means for estimating an image cut off range with information associated with the bearing of the vehicle, and the means for estimating an image cut off range may determine the error range in accordance with an amount of change in the bearing of the vehicle.

The means for estimating an image cut off range may determine the error range such that the error range is substantially proportional to the change in the bearing of the vehicle when the change of the bearing of the vehicle per unit time or per unit mileage is greater than a predetermined value.

The object recognition apparatus may further comprise:

camera attitude parameter generating means for generating camera attitude parameters representing the attitude of the on-vehicle camera with respect to the road; and reliability obtaining means for obtaining reliability of the camera attitude parameters generated by the camera attitude parameter generating means, wherein the means for estimating the position of the object estimates the position of the object in the image using the camera attitude parameters, anti means for estimating the image cut off range estimates the error range on the basis of the reliability of the camera attitude parameters.

The object recognition apparatus may further comprise a brake control device having information for controlling a brake of the vehicle, and controlling the brake on the basis of the information, wherein the reliability obtaining means obtains the reliability on the basis of the information of the brake control device.

The brake control device may have information associated with the acceleration of the vehicle, and the reliability obtaining means may reduce the reliability when the acceleration of the vehicle is greater than a predetermined value.

The brake control device may have information associated with the operation of the brake of the vehicle, and the reliability obtaining means may reduce the reliability when the brake of the vehicle is operated.

The position detection device may have information associated with attributes of the road on which the vehicle is running, and the means for recognizing the object may determine the type of the object on the basis of the attributes of the road supplied from the position detection device.

According to a fourth aspect of the present invention, there is provided a tracking recognition apparatus performing a tracking recognition of an object on and around a road, on which a vehicle is traveling, on the basis of an image acquired by an on-vehicle camera which picks up an image ahead of or behind the vehicle, the tracking recognition apparatus comprising:

- image converting means for converting the image acquired by the on-vehicle camera into a digital image signal at every processing period;
- means for generating contours of one or more objects in the image on the basis of the digital image signal supplied from the image converting means;
- means for determining coordinates of one or more specified points in the image, the specified points being selected in-advance for each object to be recognized so that the position of each object is substantially determined by the specified points;
- registration means for registering the specified points to a memory with characteristics of a neighboring image of the specified points;
- means for generating camera attitude parameters of the on-vehicle camera, the camera attitude parameters representing the attitude of the on-vehicle camera with respect to the road;
- spatial coordinate converting means for converting the coordinates of the specified points registered in the registration means into spatial positions of the specified points by using the camera attitude parameters of the on-vehicle camera;
- a position detection device detecting the position of the vehicle, and producing mileage data and bearing data of the vehicle;
- first estimating means for estimating spatial positions of the specified points at the next processing period on the basis of the mileage data, the bearing data of the vehicle, and the spatial positions of the specified points obtained by the spatial coordinate converting means;
- second estimating means for estimating the coordinates of the specified points at the next processing period in the image associated with the spatial positions;
- means for determining an error range around the coordinates of the specified points estimated by the second estimating means when an image of the next processing period is outputted from the image converting means; and
- decision means for deciding whether the same specified points are present in the error range in the image of the next processing period on the basis of the characteristics of the neighboring image of the specified points,
- wherein if the decision means decides that the same specified points are present, the object is tracked by obtaining the spatial positions of the specified points, whereas if the decision means decides that the same specified points are absent, the registration associated with the object is canceled.

Here, if the decision means decides that at least one of the specified points is present in the error range, the tracking of the object may be continued, whereas if the decision means decides that none of the specified points is present in the error range, the registration associated with the object may be canceled.

If the decision means decides that all of the specified points is present in the error range, the tracking of the object may be continued, whereas if the decision means decides that at least one of the specified points is absent in the error range, the registration associated with the object may be canceled.

The registration means may store pattern information for identifying objects to be recognized, and if the decision means decides that the same specified points are present in the error range, matching of the pattern of the object with that of the pattern information registered in the registration means may be decided, and if the matching is negated, the registration associated with the object may be canceled.

The first estimation means may obtain spatial positional changes in the specified points on the basis of the spatial positions of the specified points outputted from the spatial position converting means and the spatial positions of the specified points determined at the immediately preceding processing period, and may determine that the object associated with the specified points is still if the spatial positional changes are within a predetermined range, or is moving if the spatial positional changes exceed the predetermined range, and wherein the spatial coordinate converting means obtains the spatial positions of the specified points of the next processing period by considering the spatial positional changes in the specified points if the object associated with the specified points is decided to be moving.

The first estimating means may decide that the object associated with the specified points is moving if the spatial positional change of one of the specified points exceeds the predetermined range, whereas the first estimation means may decide that the object is still if the spatial positional changes of all the specified points are within the predetermined range.

The second estimation means may obtain, if the spatial positions of the specified points are not obtained in the immediately preceding period, the coordinates of the specified points in the image assuming that the object is still, and the decision means may decide whether the same specified points are present in an extended range wider than the error range on the basis of the characteristics of the neighboring image of the specified points registered in the registration means if the decision means decides that the same specified points are not present in the error range.

The registration means may cancel the registration associated with the object, if the decision means decides that the object is not present in the extended range.

According to a fifth aspect of the present invention, there is provided a camera attitude parameter generating method comprising the steps of:

- detecting a pair of road parallel lines in an image acquired by an on-vehicle camera, which is mounted on a vehicle to acquire an image ahead of or behind the vehicle while the vehicle is traveling on a road, each of the road parallel lines being parallel with the longitudinal direction of the road;
- obtaining the intersection of the pair of road parallel lines, thereby generating the intersection as a road vanishing point; and
- generating at least one of camera attitude parameters on the basis of the pair of road parallel lines and the road vanishing point, the camera attitude parameters representing the attitude of the on-vehicle camera with respect to the road.

According to a sixth aspect of the present invention, there is provided a camera attitude parameter generating method comprising the steps of:

- detecting a pair of road parallel lines in the image acquired by an on-vehicle camera, which is mounted on a vehicle to acquire an image ahead of or behind the vehicle while the vehicle is traveling on a road, each of the road parallel lines being parallel with the longitudinal direction of the road;

obtaining the intersection of the pair of road parallel lines, thereby generating the intersection as a road vanishing point;

observing the yaw angle of the on-vehicle camera with respect to the road on the basis of a coordinate of the road vanishing point, thereby outputting an observed yaw angle;

detecting, by using sensors and road map data, first support information including a bearing, a position, a mileage, and changes in the bearing of the vehicle;

estimating the yaw angle of the on-vehicle camera with respect to the road by applying the previously obtained yaw angle with respect to the road and the changes in the direction of the vehicle to a recursion formula prepared in advance, thereby outputting an estimated yaw angle; and generating the yaw angle of the on-vehicle camera with respect to the road by using at least one of the observed yaw angle and the estimated yaw angle.

According to a seventh aspect of the present invention, there is provided an object recognition method for use with a vehicle comprising the steps of:

detecting, by using sensors and road map data, first support information including a bearing, a position, and a mileage of the vehicle;

estimating an image cut off range in an image acquired by an on-vehicle camera, which acquires an image around the vehicle on the basis of the first support information supplied from the position detection device, the image cut off range is assumed to include an object to be recognized; and recognizing the object in the image cut off range.

According to an eighth aspect of the present invention, there is provided a tracking recognition method performing a tracking recognition of an object on and around a road, on which a vehicle is traveling, on the basis of an image acquired by an on-vehicle camera which picks up an image ahead of or behind the vehicle, the tracking recognition method comprising the steps of:

converting the image acquired by the on-vehicle camera into a digital image signal at every processing period;

generating contours of one or more objects in the image on the basis of the digital image signal;

determining coordinates of one or more specified points in the image, the specified points being selected in advance for each object to be recognized so that the position of each object is substantially determined by the specified points;

registering the specified points to a memory with characteristics of a neighboring image of the specified points;

generating camera attitude parameters of the on-vehicle camera, the camera attitude parameters representing the attitude of the on-vehicle camera with respect to the road;

converting the coordinates of the specified points registered into spatial positions of the specified points by using the camera attitude parameters of the on-vehicle camera;

detecting the position of the vehicle, and producing mileage data and bearing data of the vehicle;

estimating spatial positions of the specified points at the next processing period on the basis of the mileage data, the bearing data of the vehicle, and the spatial positions of the specified points;

estimating the coordinates of the specified points at the next processing period in the image associated with the spatial positions;

determining an error range around the coordinates of the specified points when an image of the next processing period is outputted; and deciding whether the same specified points are present in the error range in the image of the next processing period on the basis of the characteristics of the neighboring image of the specified points, wherein if the same specified points are present, the object is tracked by obtaining the spatial positions of the specified points, whereas if the same specified points are absent, the registration associated with the object is canceled.

According to the first aspect of the present invention, the accuracy and efficiency of producing the camera attitude parameters can be increased because the information possessed by the position detection device and/or the brake control device is utilized in obtaining the camera attitude parameters. Here, a typical brake control device is an anti-lock brake device.

According to the second aspect of the present invention, the road vanishing point can be obtained by extracting, from an image acquired by the on-vehicle camera, two road parallel lines which lengthen in parallel with the road in the image plane, and by obtaining the intersection of the two road parallel lines. Then, the yaw angle of the on-vehicle camera with respect to the road can be observed based on the coordinate of the road vanishing point. Specifically, when the x-axis and y-axis of the image plane are set in the horizontal and vertical directions, respectively, the yaw angle is observed based on the x-coordinate.

The yaw angle of the on-vehicle camera with respect to the road can be estimated by obtaining information associated with the bearing of the vehicle from the position detection device independently of the image information acquired by the on-vehicle camera, and by applying the previously calculated yaw angle of the on-vehicle camera with respect to the road and an amount of change in the bearing of the vehicle into the recursion formula.

Thus, if the observation value of the yaw angle of the on-vehicle camera with respect to the road cannot be obtained by the yaw angle observation means, the estimated yaw angle can be adopted as the yaw angle, and the road vanishing point can be obtained. In contrast, if the observation value of the yaw angle of the on-vehicle camera with respect to the road can be obtained by the yaw angle observation means, the observed yaw angle can be adopted as the yaw angle. Thus, the observed value and the estimated value of the yaw angle can complement to each other. As a result, even if the observed value of the yaw angle cannot be obtained because of a traffic jam or the like, the camera attitude parameters can be obtained using the estimated value of the yaw angle. This will facilitate an effective recognition of an object in an image picked up by the on-vehicle camera.

In addition, the pitch angle of the on-vehicle camera with respect to the road can be observed on the basis of the coordinate of the road vanishing point. Specifically, when the x-axis and y-axis of the image plane are set in the horizontal and vertical directions, respectively, the pitch angle is observed based on the y-coordinate.

The pitch angle of the on-vehicle camera with respect to the road can also be obtained by the following process. First, the direction, at which the road vanishing point is present, is obtained independently of the image information acquired by the on-vehicle camera by using the yaw angle of the on-vehicle camera with respect to the road, which is calculated by the yaw angle generating means. This means that the x-coordinate of the road vanishing point is obtained. Then, the y-coordinate of the road vanishing point is estimated by obtaining the intersection between the vertical line passing through the x-coordinate and the single road parallel line. The pitch angle of the on-vehicle camera with respect to the road can be obtained based on the y-coordinate.

Furthermore, the traverse deviation distance of the on-vehicle camera from the reference line parallel with the road can be observed using the slope of the road parallel line, which is detected by the slope detection means, and the information associated with the height of the on-vehicle camera from the surface of the road.

The traverse deviation distance of the on-vehicle camera with respect to the road can be estimated by obtaining information associated with the mileage of the vehicle from the position detection device independently of the image information acquired by the on-vehicle camera, and by applying to the recursion formula the previously calculated traverse deviation distance of the on-vehicle camera with respect to the road and the mileage of the vehicle.

Thus, if the observation value of the traverse deviation distance of the on-vehicle camera with respect to the road cannot be obtained by traverse deviation distance observation means, the estimated traverse deviation distance can be adopted as the traverse deviation distance, and the road vanishing point can be obtained. In contrast, if the observation value of the traverse deviation distance of the on-vehicle camera with respect to the road can be obtained by the traverse deviation distance observation means, the observed traverse deviation distance can be adopted as the traverse deviation distance. Thus, the observed value and the estimated value of the traverse deviation distance can complement to each other.

According to the third aspect of the present invention, the image cut off range, which is assumed to include the object to be recognized, is calculated on the basis of the information obtained from the position detection device. The image recognition is performed within the calculated image cut off range. This makes it possible to increase the efficiency and accuracy of the recognition processing.

An optimum image cut off range can be defined by setting the error range in such a manner that the error range is proportional to the speed of the vehicle, because the displacement of object in the image plane will increase with the speed of the vehicle, and hence, the error will also increase with the speed.

An optimum image cut off range can be defined by setting the error range in such a manner that the error range is proportional to the change in the bearing of the vehicle, because the displacement of object in the image plane will increase with the change in the bearing of the vehicle, and hence, the error will also increase with the bearing change.

Furthermore, the reliability of the camera, attitude parameters is calculated, and the error range is set in accordance with the reliability. This makes it possible to obtain the image cut off range that can positively contain the object to be recognized.

An optimum error range can be set by reducing the reliability of the camera attitude parameters when the acceleration of the vehicle is large or the brake is operated, because the pitch angle of the vehicle will increase to an abnormal level in these cases, and hence, the calculation accuracy of the camera attitude parameters will be degraded.

In addition, determining the kind of the object on the basis of the attribute of the road, on which the vehicle is traveling, makes it possible to recognize different types of objects during traveling, for example, on an expressway or a common road.

According to the fourth aspect of the present invention, the tracking recognition of the object is carried out on the basis of the characteristics of the neighboring image around the specified points. This makes it possible to reduce the processing time because the identification of the specified points is carried out only in a limited area within the error range in the image plane.

When a decision is made that the same specified points are present, the Object is tracked by obtaining the spatial position of the specified points, whereas when the opposite decision is made, the registration associated with the object is deleted, thereby increasing the efficiency of the tracking recognition.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 2A and 2B illustrate images acquired by an on-vehicle camera;

FIGS. 3A and 3B illustrate straight line portions obtained by joining line candidate points extracted from the images of FIGS. 2A and 2B, respectively;

FIGS. 4A and 4B are diagrams for explaining a line candidate point extraction processing, wherein FIG. 4A illustrates an image picked up by the on-vehicle camera, and FIG. 4B illustrates the changes in the three prime color image data on a particular scan line;

FIGS. 23A, 23B and 24 are flowcharts for explaining a yaw angle calculation processing of the on-vehicle camera;

FIG. 29 illustrates contours of an object obtained by an image processing, and specified points set at corners of or in the contours;

FIG. 36A shows a recognition object registration table; and

FIG. 36B shows a specified point registration table.

DETAILED DESCRIPTION OF PREFERRED EMBODIMENTS

Figure 1:
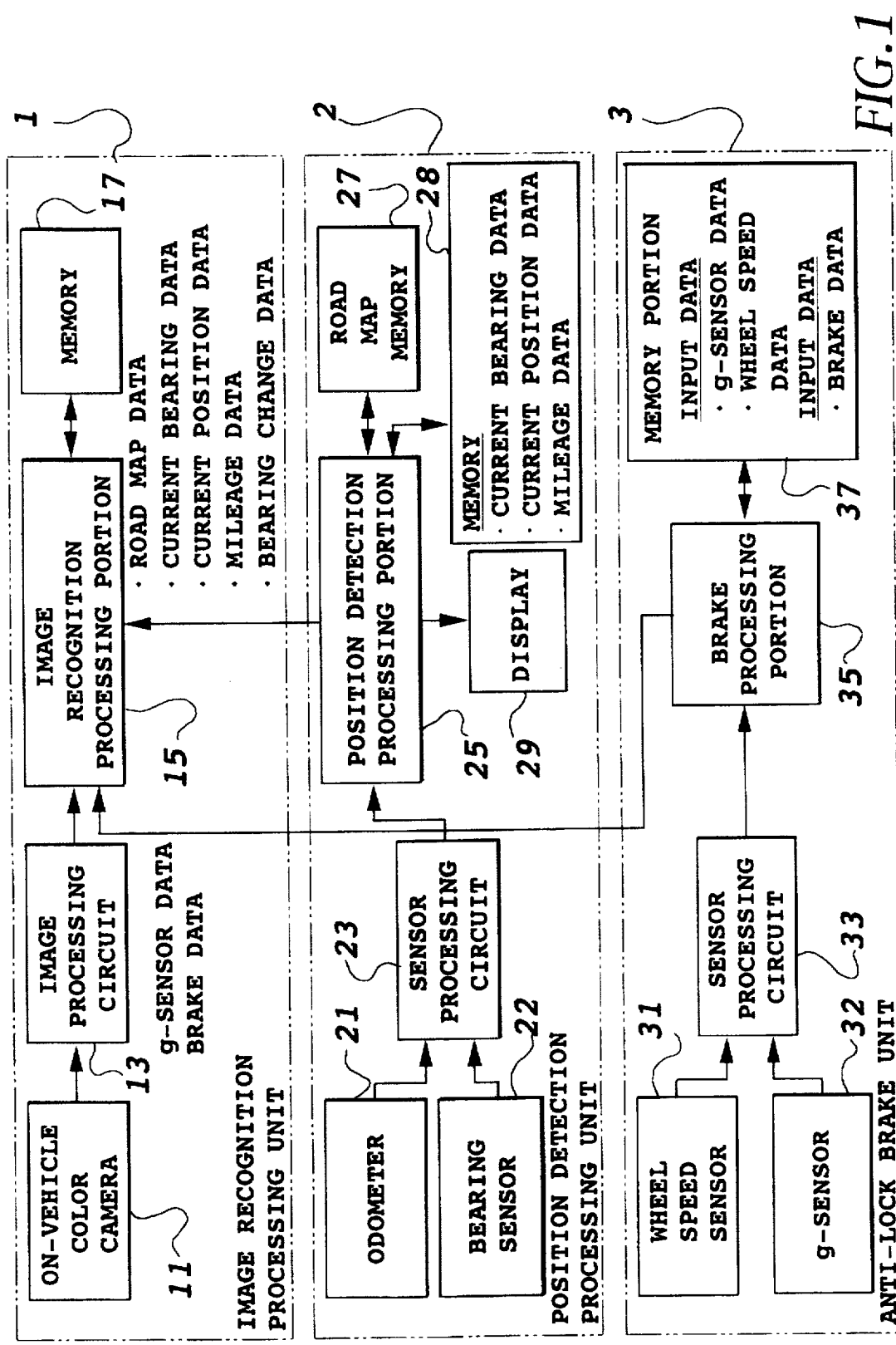
FIG. 1 is a block diagram showing an embodiment of an image recognition processing system in accordance with the present invention.

The invention will now be described with reference to the accompanying drawings.

EMBODIMENT 1

1. Outline of an Image Recognition Processing System

An image recognition processing system described below is a device for performing recognition of objects about a road on the basis of an image acquired with an on-vehicle camera. Recognized objects are, for example, pedestrians, road facilities such as traffic signals, road signs, road marks depicted on a road, overpasses crossing over the road on which a vehicle is moving, and other motor vehicles.

The image recognition system recognizes objects in the image acquired by an on-vehicle color camera by carrying out the following four processings (1)–(4). The processings (2)–(4) can be achieved by an on-vehicle black-and-white camera.

(1) Line candidate point extraction processing.

(2) Road vanishing point calculation processing.

(3) Attitude parameter calculation processing of an on-vehicle camera.

(4) (Tracking) recognition processing of objects.

The line candidate point extraction processing is a processing for extracting points constituting a line (called "a parallel line with a road") along the moving direction of a vehicle in the image acquired by the on-vehicle color camera. Among the lines, are included two sides of the road, white or yellow lines on the road, the median, sidewalks, contours of foregoing vehicles, and contours of road signs.

The road vanishing point calculation processing is a processing for obtaining the vanishing point in the image, which is determined as the intersection of right and left edges of the road, on which the vehicle is moving. The road vanishing point is calculated based on the line candidate points obtained by the line candidate point extraction processing.

The attitude parameter calculation processing of the on-vehicle camera is a process for obtaining the attitude of the on-vehicle camera with regard to the road. This processing utilizes the vanishing point and the parallel lines with the road obtained by the road vanishing point calculation processing.

The recognition processing of objects is a process for recognizing objects in an image acquired by the on-vehicle camera. In this processing, an image portion including an object to be recognized is cut off from the image plane, in which the position of the object changes with the running of the vehicle. Thus, the displacement of the object in the image plane is estimated on the basis of the camera attitude parameters, and the image portion is cut off from the image plane based on the estimation.

The tracking recognition processing of objects is a process for recognizing objects in an image acquired by the on-vehicle camera, and tracing them. In this processing, one or more specified points of each object, which will substantially determine the position of the object, have been stored for each object in advance. When tracking an object, positions of the specified points of the object in successive images, which will change from time to time, are estimated on the basis of the attitude parameters of the on-vehicle camera and the like, and the estimated positions are tested on the basis of image data whether they agree with the specified positions stored in advance. Although the objects themselves will be moving or still, the positions of the specified points of each of them are estimated on the basis of the attitude parameters of the on-vehicle camera or the like.

Using the image recognition processing system makes it possible to recognize objects around the vehicle. Applying the recognition results to the automatic control of steering and braking will open the way for automatic travel of a vehicle, and contribute to safe movement of the vehicle. In addition, recognizing road signs and traffic signals serves to guide the vehicle to a destination.

The arrangement of the image recognition processing system will be described below, followed by the description of (1) the line candidate point extraction processing, (2) the road vanishing point calculation processing, (3) the attitude parameter calculation processing of the on-vehicle camera, and (4) the tracking recognition processing of objects.

2. Arrangement of the image recognition processing system

FIG. 1 is a block diagram showing an electrical arrangement of an image recognition processing system. The image recognition processing system has an image recognition processing unit 1 for recognizing images of objects about the vehicle. The image recognition processing unit 1 is connected to a position detection processing unit 2 that detects the current position and the moving direction of the vehicle, and to an anti-lock brake unit 3 that prevents the wheels from being locked by a sudden brake. The processing of the image recognition processing unit 1 utilizes the internal information of the position detection processing unit 2 and the anti-lock brake unit 3 as support information. As shown in FIG. 1, the support information includes road map data, current bearing data, current position data, mileage data, and bearing changing data, which are supplied from the position detection processing unit 2, and g-sensor data and brake data, which are supplied from the anti-lock brake unit 3.

The image recognition processing unit 1 includes an on-vehicle color camera 11 mounted on the front section or the inside of the vehicle. The on-vehicle color camera 11 picks up a scene ahead of the vehicle. In addition to, or instead of the on-vehicle color camera 11, another on-vehicle camera may be mounted which picks up a scene behind or at the sides of the vehicle.

The on-vehicle color camera 11 outputs electric analog color signals that represent each point of the acquired image. The analog signals are subject to the analog-to-digital conversion, and are converted into image data by an image processing circuit 13. The image data are inputted to an image recognition processing portion 15 including a microcomputer. The image recognition processing portion 15 is connected to a memory portion 17 including a RAM (Random Access Memory), and receives the support information from the position detection processing unit 2 and the anti-lock brake unit 3.

The position detection processing unit 2 includes an odometer (a wheel speed sensor, for example) 21 for detecting the mileage of the vehicle, and a direction sensor (a gyro, for example) 22. The outputs of these sensors 21 and 22 are handled by a sensor processing circuit 23, and converted into the mileage data and the current bearing data. These data are inputted to the position detection processing portion 25 incorporating the microcomputer, which calculates the current position data of the vehicle based on the data supplied from the sensor processing circuit 23.

The position detection processing portion 25 is connected to a road map memory 27 storing the road map, a memory portion 28 including a RAM, a display unit 29 such as a CRT (Cathode Ray Tube) or a liquid crystal display panel. The road map memory 27 is composed of a CD-ROM, for example. The position detection processing portion 25 searches the road map memory 27 on the basis of the calculated current position data, and reads out the map data in the neighborhood of the current position. The read out road map is displayed on the display unit 29 together with a mark indicating the current position on the road map.

The position detection processing portion 25 provides the image recognition processing portion 15 of the image recognition processing unit 1 with the road map data, the current bearing data, the current position data and the mileage data, as the support information. In addition to these data, the bearing changing data which represents a changing amount of the moving direction per unit time or per unit mileage may also be supplied to the image recognition processing portion 15 as the support information.

The anti-lock brake unit 3 has a wheel speed sensor 31 that detects the rotation speed of the wheels, and a g-sensor 32 that detects the acceleration and deceleration of the vehicle. The output of the sensors 31 and 32 are handled by a sensor processing circuit 33, and converted into wheel speed data and g-sensor data. These data are inputted to a brake processing portion 35 incorporating a microcomputer. The brake processing portion 35 is connected to a memory portion 37 including a RAM. Here, the functions of the odometer 21 and the wheel speed sensor 31 can be achieved by either of them. Accordingly, it may be possible to employ one of the two sensors, and share its output between the position detection processing unit 2 and the anti-lock brake unit 3.

The brake processing portion 35 generates brake data based on the wheel speed data and the g-sensor data when the brake pedal is operated, and controls electromagnetic solenoids or the like not shown in this figure, on the basis of the brake data. Thus, the braking pressures on the respective wheels are controlled, thereby preventing the wheels from being locked.

The brake processing portion 35 provides the image recognition portion 15 of the image recognition processing unit 1 with the g-sensor data and the brake data, as the support information.

3. Line Candidate Point Extraction Processing

Next, the line candidate point extraction processing will be described.

Figure 2B:
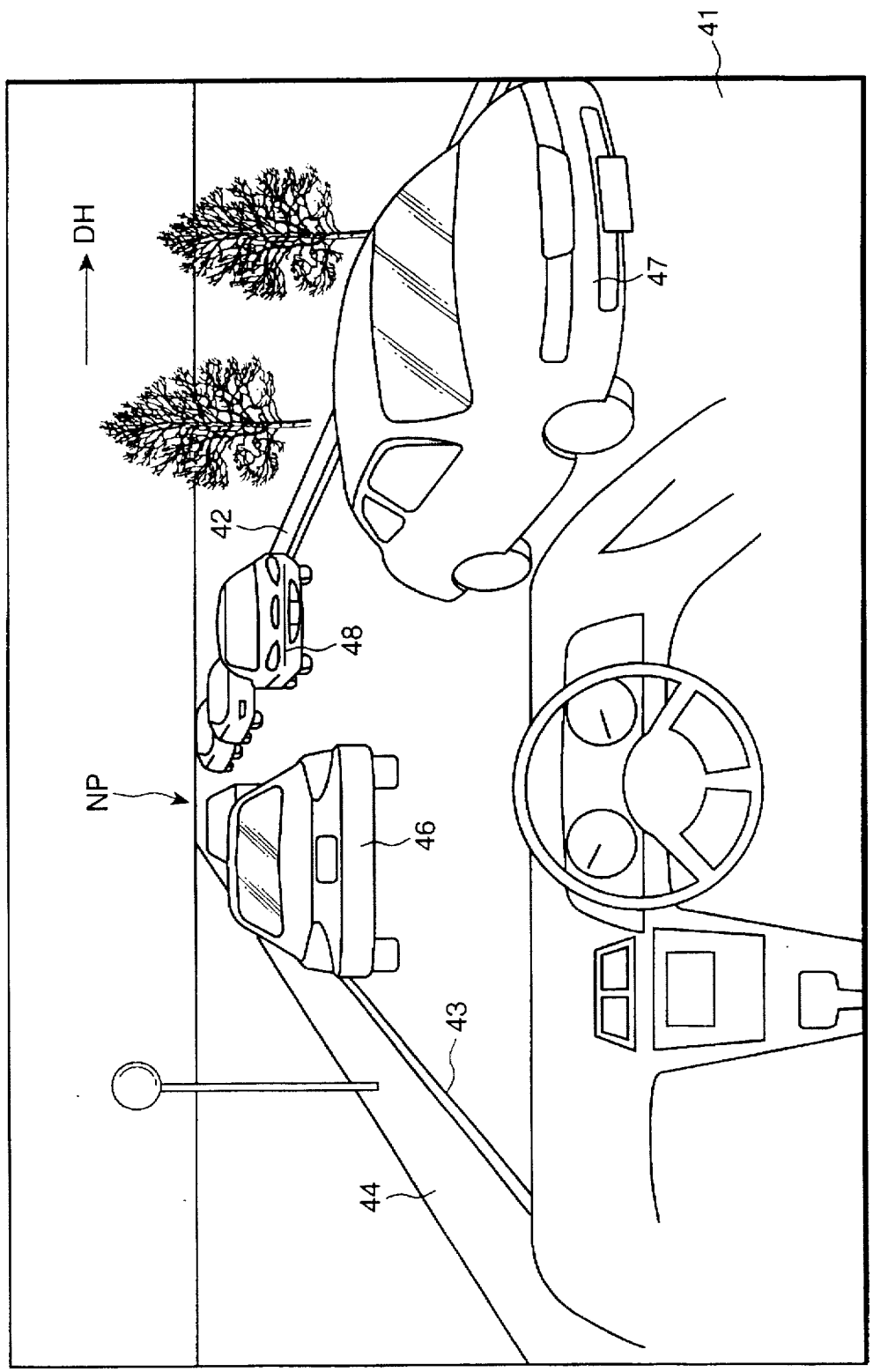

FIGS. 2A and 2B show image examples acquired by the on-vehicle color camera 11. Only the driving seat at the bottom of FIG. 2B is added afterwards to help understanding. A median white line 42 and a side white line 43 are present in the images of a road 41 picked up by the on-vehicle color camera 11 which is pointed ahead of the vehicle. A sidewalk 44 is provided at the side of the road 41. The point at which the road 41 vanishes is referred to as a vanishing point NP. The reference numerals 46, 47 and 48 designate other vehicles traveling ahead or at the sides of the vehicle.

Figure 3B:
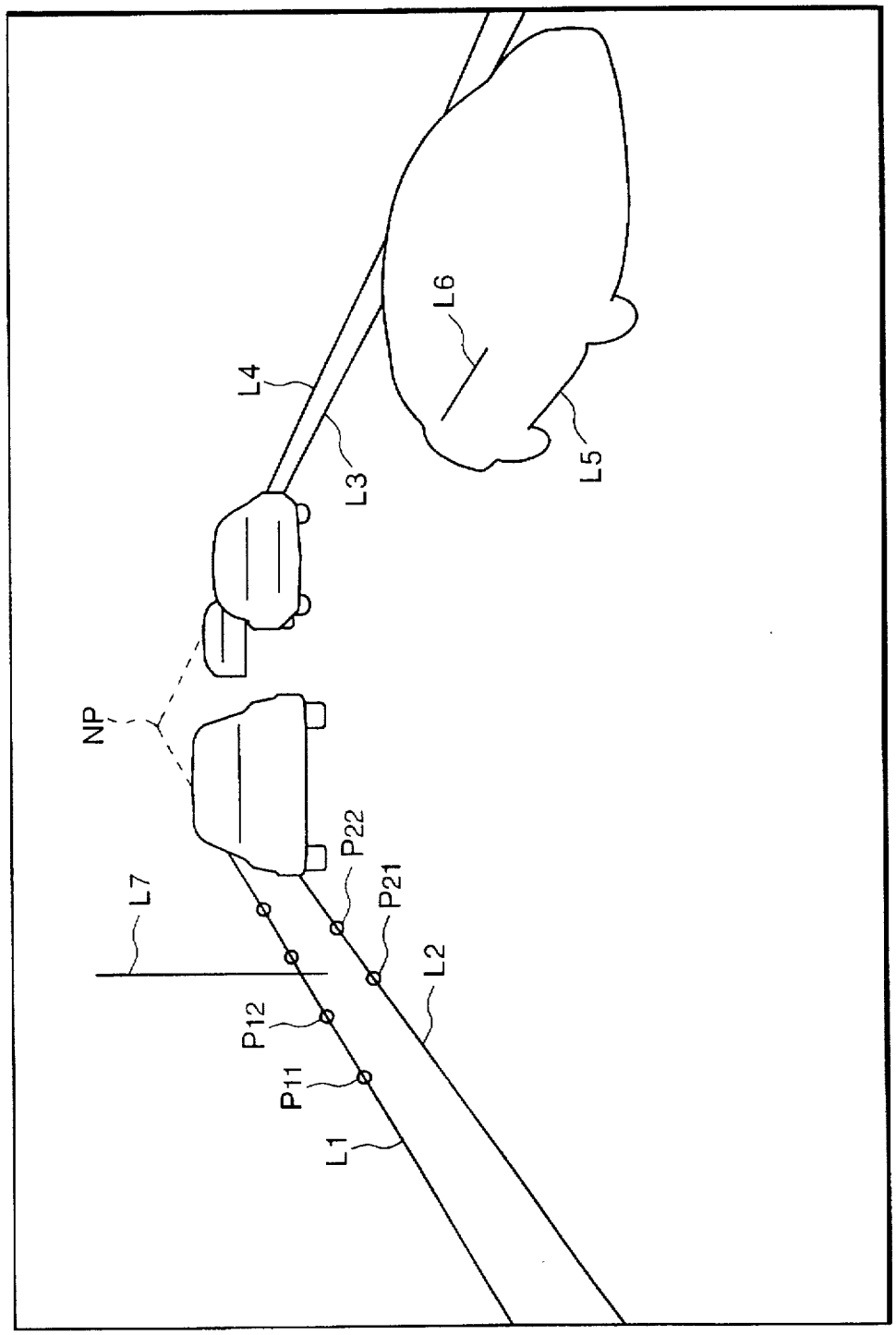

FIGS. 3A and 3B show line segments extracted from the images of FIGS. 2A and 3B, respectively. Specifically, both sides of the road 41, the median line 42, the side white line 43, the edge of the sidewalk 44, and the contours of the other vehicle 46, 47 and 48 are extracted as the line segments. As will be clearly seen from FIGS. 3A and 3B, the road vanishing point NP can be obtained as the intersection of the lines L1 and L2 along the moving direction 50 of the vehicle (see, FIG. 2A). Incidentally, these figures are only imaginary figures for explaining the road vanishing point, and the images, in which the line segments are shown, are not actually prepared.

In the line candidate point extraction processing, an image picked up by the on-vehicle color camera 11 is scanned in the horizontal scanning direction DH from the top down to the bottom of the image. The scanning is performed by sequentially reading out the image data stored in the memory portion 17. In this case, the image data outputted from the on-vehicle color camera 11 have been stored in the memory portion 17 through the image processing circuit 13 and the image recognition processing portion 15.

A line candidate point is detected based on transitions from a stable state to an unstable state, or vice versa, that would occur during the scanning of respective pixels constituting an image along the horizontal scanning direction DH. Here, the stable state is a state wherein both the chromaticity and the luminance of pixels are stable, whereas the unstable state is a state wherein at least one of the chromaticity and the luminance changes greatly. The two states are detected as follows:

Let us assume that the on-vehicle color camera 11 outputs three primary color signals associated with red (R), green (G) and blue (B). The three primary color signals represent a color tone which represents the combination of the chromaticity and the luminance. The three primary color signals are converted into three primary color image data which are stored into the memory portion 17. Let us assume that the image data of R, G and B of a point on the horizontal scanning line are r(t), g(t) and b(t), where t represents a processing period, and is associated with one point on the horizontal scanning line.

In this case, the unstable state is detected if expression (2) holds for a decision value P(t) defined by expression (1).

$$P(t) = j_1|r(t) - r(t-1)| + j_2|g(t) - g(t-1)| + j_3|b(t) - b(t-1)| \quad (1)$$

$$P(t) > m1 \quad (2)$$

where m1 is a constant, $j_1$, $j_2$ and $j_3$ are weighting constants. For example, the constant $j_1$ is set at a rather large value because the change of the R data in response to the change in brightness is large, whereas the constant $j_3$ is set at a rather small value because the change of the B data in response to the change in brightness is small.

Expressions (1) and (2) mean that a sharp change in the color tone is detected if the linear sum of the absolute values of the color tone changes between two adjacent points along the horizontal scanning direction DH is greater than the predetermined constant m1. The two adjacent points are not necessarily two adjacent pixels, but can be set as number of pixels spaced at a predetermined interval Alternatively, a decision value $P_1(t)$ defined by expression (3) can be used instead of the decision value $P(t)$ to detect the unstable state. If the decision value $P_1(t)$ satisfies expression (4), it is decided that the unstable state occurs.

$$P(t) = \qquad (3)$$

$$k_1\{r(t) - r(t-1)\}^2 + k_2\{g(t) - g(t-1)\}^2 + k_3\{b(t) - b(t-1)\}^2$$

$$P_1(t) > m2 \qquad (4)$$

where m2 is a constant, and $k_1$, $k_2$ and $k_3$ are weighting constants.

Expressions (3) and (4) mean that the unstable state is detected if the sum of weighted squares of the color tone changes between two adjacent points along the horizontal scanning direction DH is greater than the predetermined constant m2.

On the other hand, the stable state is detected if expression (5) holds for the decision value $P(t)$ defined by expression (1), for more than a fixed number (ten, for example) of successive points.

$$P(t) < n1 \qquad (5)$$

where n1 is a constant less than m1.

Expression (5) means that the stable state of the color tone is detected if the linear sum of the absolute values of the color tone changes between two adjacent points along the horizontal scanning direction DH is smaller than the predetermined constant n1 for the fixed number of successive points.

Alternatively, the stable state can be detected if the decision value $P_1(t)$ defined by expression (3) satisfies expression (6) for more than a predetermined number (ten, for example) of points.

$$P_1(t) < n2 \qquad (6)$$

where n2 is a constant less than m2.

Expression (6) mean that the stable state is detected if the sum of weighted squares of the color tone changes between two adjacent points along the horizontal scanning direction DH is smaller than the predetermined constant n2 for the predetermined number of points.

Other methods such as an exponential smoothing method can be applied to the detection of the stable state. For example, the stable state can be detected by obtaining a new decision value $Q(t)$ of expression (7) using the decision value $P(t)$ of expression (1), and by testing whether the decision value $Q(t)$ satisfies expression (8). In this case, it is unnecessary to continuously monitor the decision results with the predetermined number of successive points. In addition, the exponential smoothing method has an advantage that a good detection of the stable state can be achieved by suppressing the effect of noise in the image.

$$Q(t) = \alpha \cdot P(t) + (1-\alpha) \cdot Q(t+1) \qquad (7)$$

$$Q(t) < n3 \qquad (8)$$

where $\alpha$ and n3 are constants.

Likewise, the stable state can be detected by obtaining a new decision value $Q_1(t)$ of expression (9) using the decision value $P_1(t)$ of expression (3), and by testing whether the decision value $Q_1(t)$ satisfies expression (10).

$$Q_1(t) = \alpha \cdot P_1(t) + (1-\alpha) \cdot Q_1(t-1) \qquad (9)$$

$$Q_1(t) < n4 \qquad (10)$$

where n4 is a constant.

The detection of the stable state or the unstable state can be performed not only by the RGB digital signals, but also by the HCV (Hue, Chroma, and Value) digital signals or YUV (a piece of luminance information and two pieces of color information). The stable state or the unstable state can also be detected using the luminance signal and one of the chromaticity signals. The hue and chroma correspond to the chromaticity.

The RGB digital signals are convertible to HCV digital signals or the YUV digital signals or vice versa. For example, the RGB digital signal and the YUV digital signal are interconvertible in accordance with expressions (11)–(12) (see, "Interface", December, 1991, Japan).

$$Y = 0.2990 \cdot R + 0.5870 \cdot G + 0.1440 \cdot B \qquad (11)$$

$$U = -0.1684 \cdot R - 0.3316 \cdot G + 0.5000 \cdot B \qquad (12)$$

$$V = 0.5000 \cdot R - 0.4187 \cdot G - 0.0813 \cdot B \qquad (13)$$

$$R = Y + 1.4020 \cdot V \qquad (14)$$

$$G = Y - 0.3441 \cdot U - 0.7139 \cdot V \qquad (15)$$

$$B = Y + 1.7718 \cdot U - 0.0012 \cdot V \qquad (16)$$

Figure 4A:
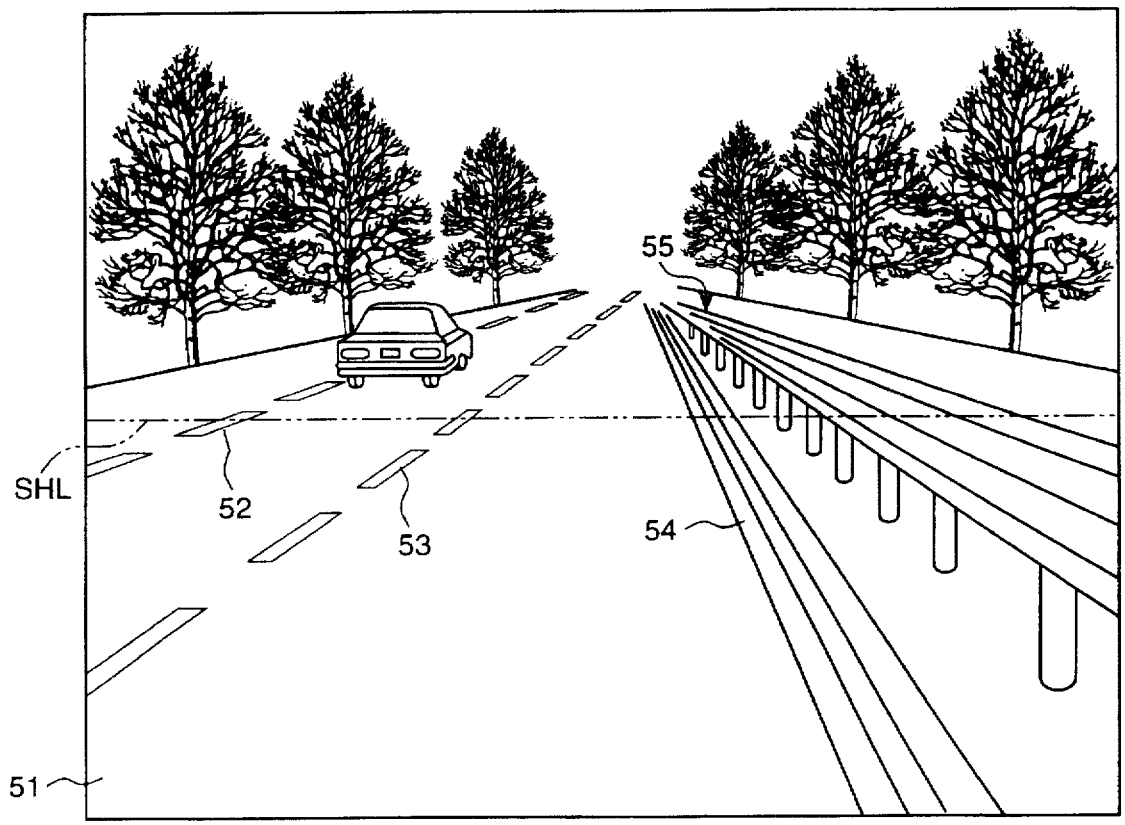
Figure 4B:
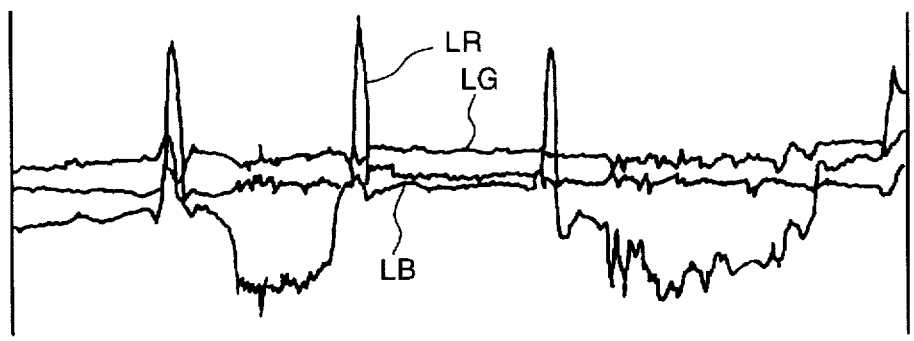

FIGS. 4A and 4B are drawings for explaining the detecting processing of line candidate points. FIG. 4A illustrates an image picked up by the on-vehicle color camera 11, and FIG. 4B illustrates the changes of the R, G and B digital data on a particular scanning line SHL. The changes of the R, G and B data are designated by LR, LG and LB, respectively. It can be seen from FIGS. 4A and 4B that the color tone sharply changes near white lines 52, 53 and 54 marked on a road 51, and a median 55. In contrast, the color tone is stable at image portions associated with road surfaces, on which no mark such as a white line is formed.

Figure 5:
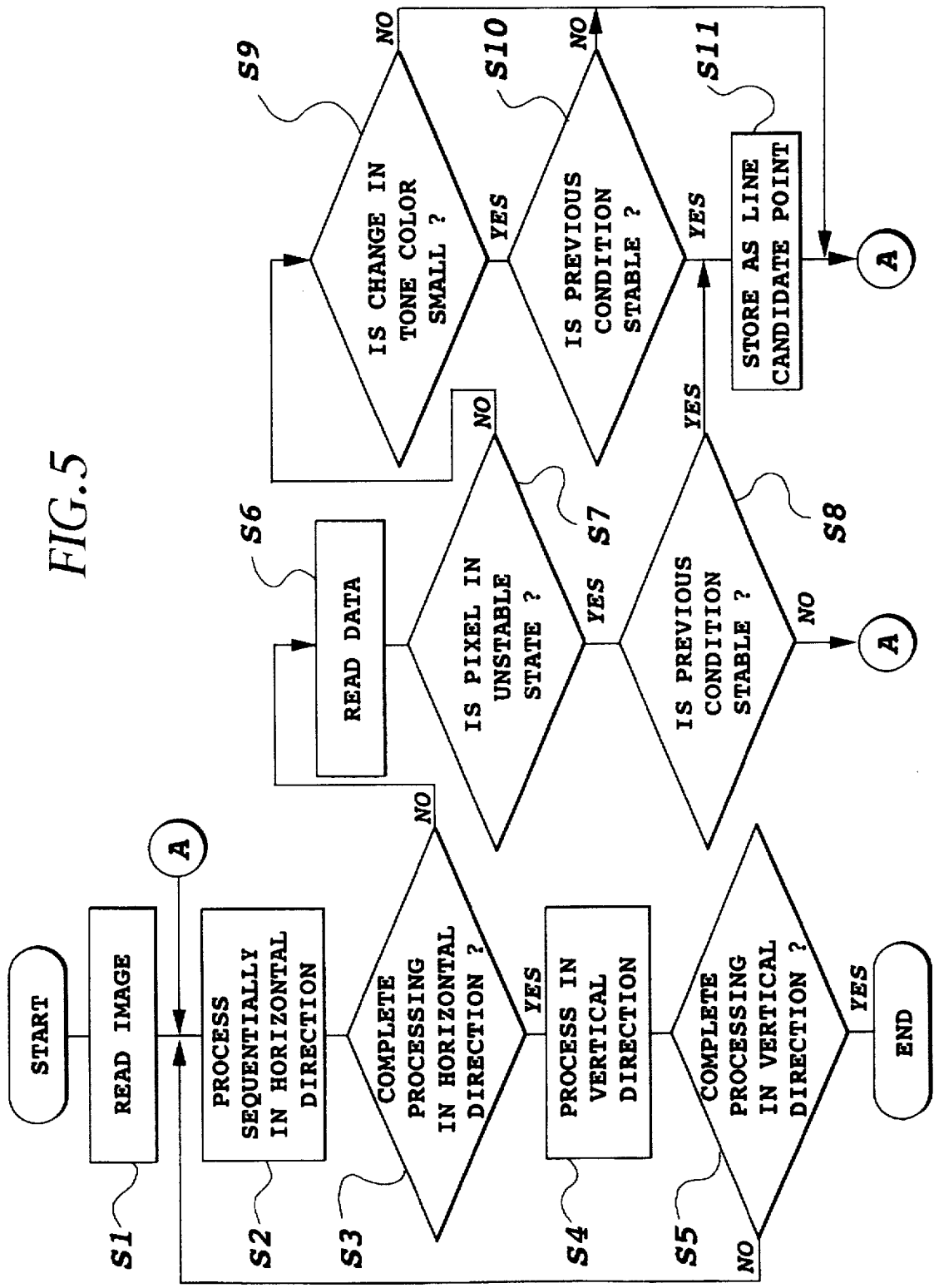
FIG. 5 is a flowchart for explaining the line candidate point extraction processing.

FIG. 5 is a flowchart for explaining the processing for detecting line candidate points, executed by the image recognition processing portion 15. At step S1, the data of a color image acquired by the on-vehicle color camera is stored in the memory portion 17. At step S2, processing of pixels is carried out while scanning the pixels sequentially in the horizontal direction, beginning from the top of the image. When the processing of the entire pixels of a particular scanning line has been completed at step S3, the next line is scanned at step S4 and the processing of steps S2 and S3 are repeated. When the processing in the vertical direction has been completed at step S5, the detection of the line candidate points of this color image has been completed.

If the processing of the entire pixels of a particular horizontal scanning line has not yet been completed, the processing proceeds from step S3 to S6. At step S6, the data required for detecting whether a pixel of interest is in the stable state or the unstable state are read from the memory portion 17. At step S7, it is decided whether the pixel is in the unstable state or not. That is, it is tested whether expression (2) or (4) is satisfied or not. When the unstable state is detected, it is further tested at step S8 whether the previous condition is the stable state. If so, the pixel of interest is the pixel of transition from the stable state to the unstable state. Accordingly, at step S11, the coordinates of that pixel (the coordinates on the screen) are stored in the memory portion 17 as the coordinates of a line candidate point. On the other hand, if it is found at step S8 that the previous condition is also unstable state, the processing returns to step S2 because the unstable state continues, and hence no line candidate point is detected.

If it is decided at step S7 that the pixel is not in the unstable condition, the processing proceeds to step S9. At step 9, the amount of change in the color tone is tested with the predetermined number of (N) previously processed pixels. That is, the consecutive number of pixels that satisfy expression (5) or (6) is tested whether the consecutive number exceeds the predetermined number N. If the result is positive, the (N+1)-th pixel before the current pixel is tested at step S10 whether it has been in the unstable state or not. If the unstable state has been detected, that pixel which has been unstable is determined as a line candidate point, and its coordinates are stored in the memory portion 17 at step S11.

If it is detected at step S9 that the amount of change in the color tone does not keep a small value with the predetermined number (N) of points, the processing returns to step S2. Furthermore, if the unstable state is not detected at the (N+1)-th pixel before the current pixel at step S10, the processing also returns to step S2.

In this way, the image picked up by the on-vehicle color camera 11 is scanned along the horizontal scanning direction, and changes in the color tone on scanning lines are detected. During this process, points in the image, at which the color tone changes between the stable state and the unstable state, are detected as the line candidate points.

When detecting a line, it may be possible to obtain line candidate points in accordance with only changes in the intensity of the luminance. In this case, however, lines other than those of sharp contrast such as white lines on a road might not be detected. In contrast, the present method, in which the line candidate points are detected on the basis of transitions between the stable and unstable states of the chrominance or the luminance, or the both, can detect the line candidate points associated with the sidewalk, the median, and the contours of other vehicles. As a result, more lines included in the image can be extracted. Thus, the road vanishing point calculation processing which will be described next can be carried out satisfactorily.

Moreover, to eliminate the effect of noise contained in an image, the unstable state may be detected under the condition that large amounts of changes in the color tone continue for a predetermined number of points.

Furthermore, the detection of the line candidate points can be achieved by using not only data on a scanning line, but also data on neighboring scanning lines. For example, when a particular point is thought to be a line candidate point, it may be determined as a true line candidate point only if the vertically adjacent points are line candidate points. This will make it possible to reduce the effect of noise in an image, and to achieve a good line candidate point detection.

4. Road Vanishing Point Calculation Processing

The road vanishing point calculation processing is a process for obtaining the road vanishing point NP of FIGS. 3A and 3B by using the line candidate points obtained by the line candidate point extraction processing. As will be clearly seen from FIGS. 3A and 3B, the processing obtaining the road vanishing point NP is one obtaining the intersection of lines linking the line candidate points $P_{11}, P_{12}, \ldots, P_{21}, P_{22}, \ldots$.

The road vanishing point calculation processing can be carried out by repeating the Hough transform twice onto the series of coordinates of the line candidate points. Thus, the Hough transform will be described first. The Hough transform is described in "ROBOTICS" by K. S. Fu, et al., McGraw-Hill Book Company, 1988, pp. 365–368.

Figure 6A:
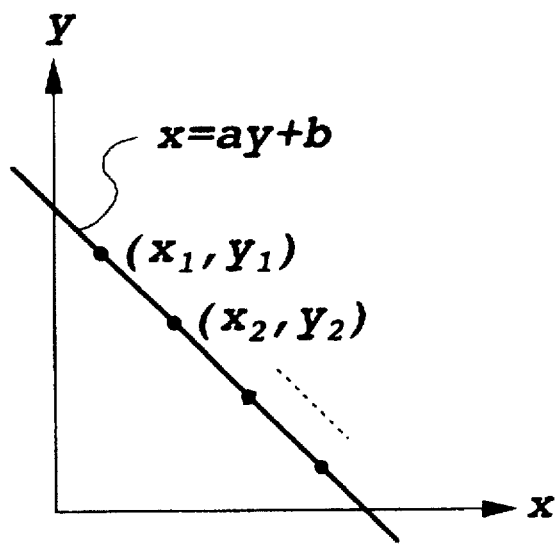
FIGS. 6A and 6B are graphs for explaining the Hough transform.
Figure 6B:
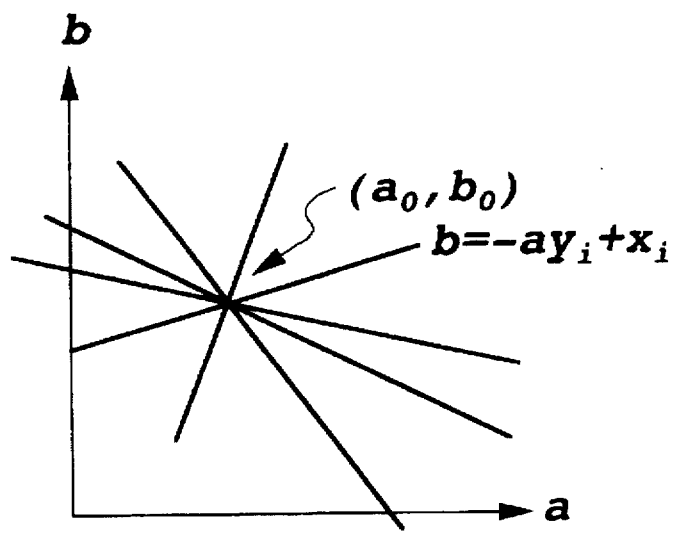

FIGS. 6A and 6B are graphs for explaining the Hough transform. If a plurality of points $(x_i, y_i)$ $(i=1, 2, 3, \ldots)$ lie on the line $x=ay+b$ of FIG. 6A equation $x_i=ay_i+b$ holds for any i. Considering this equation on the ab coordinate plane wherein (a, b) are considered as variables, the equation can be written as $b=-y_i a+x_i$ on this plane. The graph for the entire i on the ab plane is shown in FIG. 6B. All the lines associated with i pass through one point $(a_0, b_0)$. This is a natural result from the fact that all the points $(x_i, y_i)$ lie on a single line.

The ab coordinate plane is subdivided into so-called accumulator cells, and the count of a particular accumulator cell is incremented by one when a line associated with $(x_i, y_i)$ passes through that accumulator cell. This operation is performed on all $(x_i, y_i)$ in the Hough transform. After that, the accumulator cell $(a_0, b_0)$ is obtained as a cell whose count value is the maximum on the ab coordinate plane. Accordingly, the equation of the straight line passing through the plurality of points $(x_i, y_i)$ can be determined as $x=a_0 y+b_0$. Thus, the Hough transform is used to obtain the line passing through a plurality of points $(x_i, y_i)$ in the image processing field.

Figure 7C:
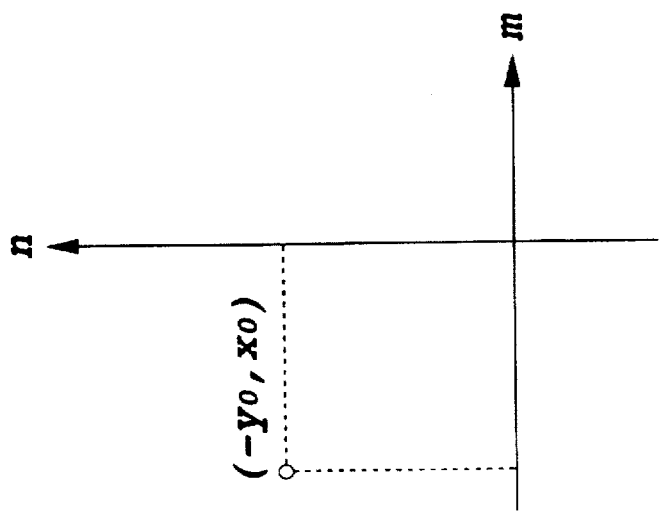
FIGS. 7A–7C are graphs for explaining the processing for obtaining the road vanishing point by repeating the Hough transform twice.
Figure 7B:
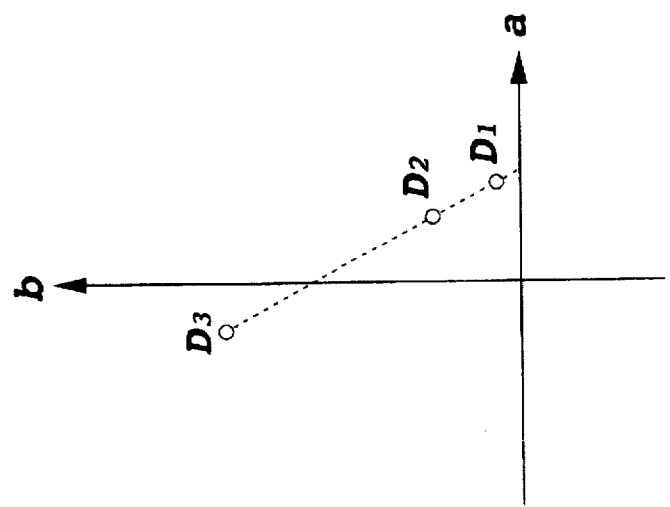
Figure 7A:
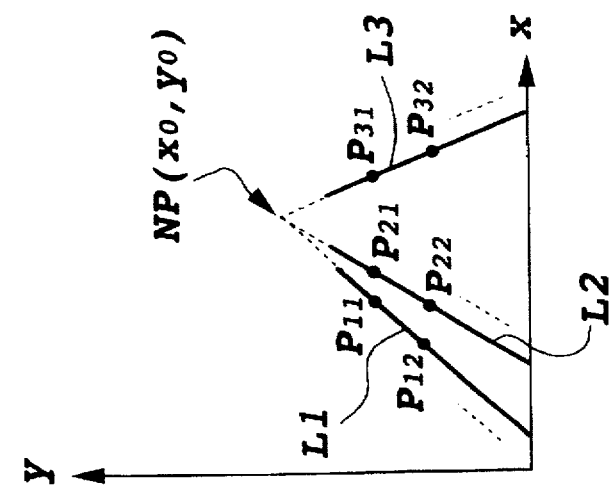
Figure 8B:
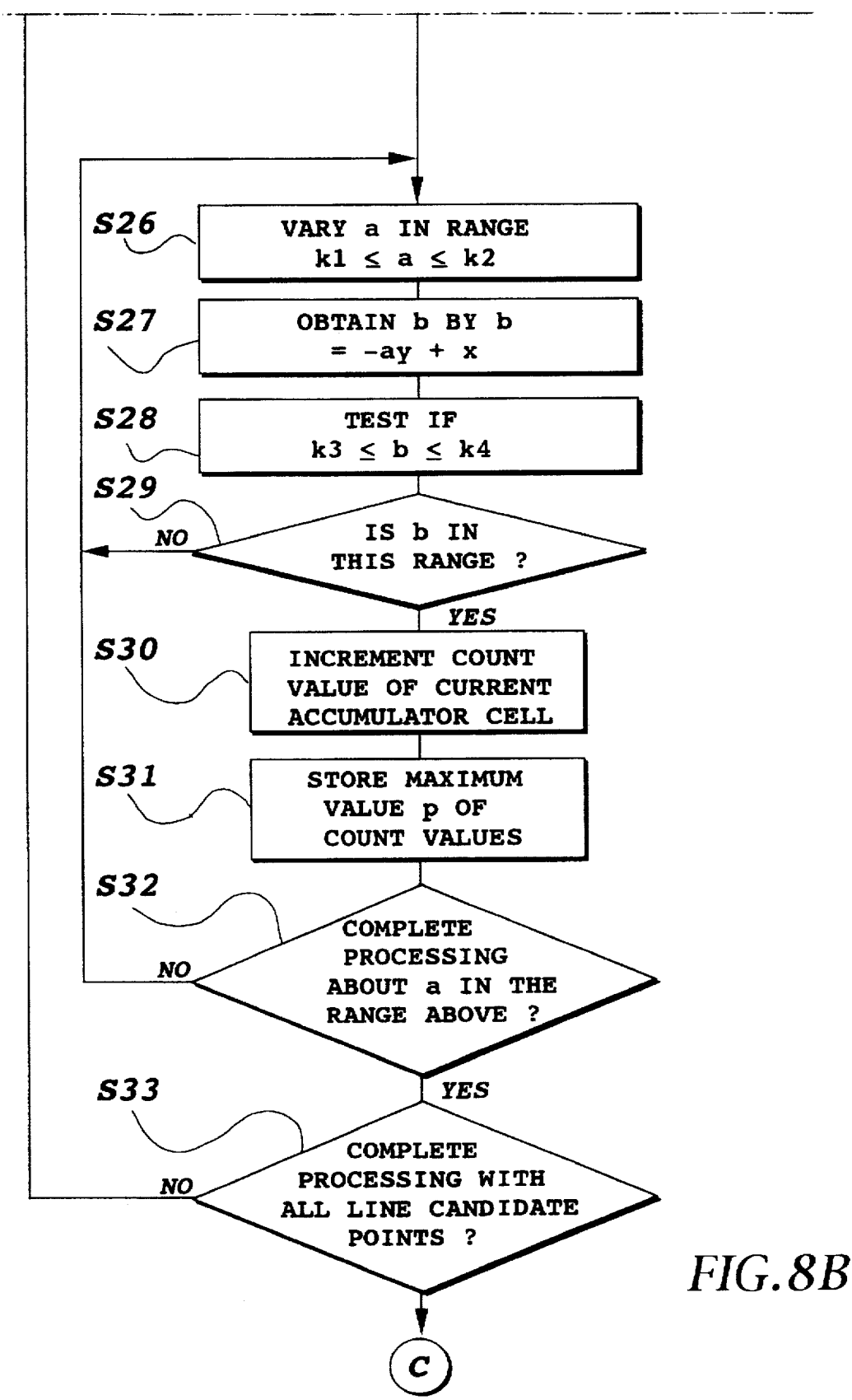
FIGS. 8A–11B are flowcharts for explaining a road vanishing point calculation processing.

FIGS. 7A–7C explain the process for obtaining the road vanishing point by repeating the Hough transform twice. FIG. 7A shows an xy coordinate plane associated with the screen acquired by the on-vehicle color camera 11. FIG. 7B shows an ab coordinate=plane (a first conversion coordinate plane) obtained by the first Hough transform, and FIG. 7C shows an mn coordinate plane (a second conversion coordinate plane) obtained by the second Hough transform.

As shown in FIG. 7A, the straight lines L1, L2 and L3, to which the line candidate points $P_{11}, P_{12}, \ldots; P_{21}, P_{22}, \ldots;$ and $P_{31}, P_{32}, \ldots$ belong are thought to intersect at the road vanishing point $(x_0, y_0)$. The equation of straight lines passing through the coordinates $(x_0, y_0)$ is given by equation (17).

$$x=C(y-y_0)+x_0=Cy+(x_0-Cy_0) \quad (17)$$

wherein C is a constant.

Here, substituting $a=C$, $b=x_0-Cy_0$, a converted equation $x=ay+b$ is obtained, and the relationship between a and b is given by equation (18).

$$b=-ay_0+x_0 \quad (18)$$

When the first Hough transform is performed on the line candidate points $P_{11}, P_{12}, \ldots; P_{21}, P_{22}, \ldots;$ and $P_{31}, P_{32}, \ldots$, accumulator cells $D_1$, $D_2$, and $D_3$ associated with the straight lines L1, L2 and L3 will be obtained on the ab coordinate plane in such a manner that they take local maximum values. Since the lines L1, L2 and L3 intersect at one point $(x_0, y_0)$, the accumulator cells $D_1$, $D_2$ and $D_3$ must lie on the straight line given by equation (18) (see, FIG. 7C).

Thus, the second Hough transform onto the mn coordinate plane is performed on the accumulator cells $D_1$, $D_2$ and $D_3$ using equation (19).

$$b=ma+n \quad (19)$$

Since the accumulator cells $D_1$, $D_2$ and $D_3$, which take local maximum values on the ab coordinate plane, lie on the straight line given by equation (19), the accumulator cell on the mn coordinate plane, which is associated with $m=-y_0$, and $n=x_0$, will take the maximum count value. Accordingly, the coordinates $(x_0, y_0)$ of the road vanishing point NP on the xy coordinate plane can be obtained.

FIGS. 8A–11B are a flowchart for explaining the processes executed by the image recognition processing portion 15 of FIG. 1. First, at step S21, the support information supplied from the position detection processing unit 2 is referred to. Here, the support information includes the road map data, the current bearing data, the current position data, the mileage data, and the bearing changing data. On the basis of the support information, the tests of steps S22–S24 are performed. At step S22, the road ahead of the vehicle is tested whether it is a straight road. At step S23, attributes of the road are tested whether they satisfy predetermined standards. For example, the road is tested whether it is a highway. At step S24, the moving direction of the vehicle is tested whether it is substantially parallel with the road. If any of these conditions is not satisfied, the calculation of the road vanishing point is inhibited, and the processing is completed. This is because unless all of these conditions are satisfied, it is highly probable that the road vanishing point cannot be calculated. For example, when the vehicle is turning it is highly probable that no road vanishing point is present in the image picked up by the on-vehicle color camera 11. Furthermore, since no straight line would be extracted in this case, calculation of the road vanishing point using the Hough transform will be difficult. In addition, if the road, on which the vehicle is traveling, is a narrow one other than highways, it is often impossible to obtain a long straight line, and hence, the road vanishing point will not be found. Moreover, if the vehicle does not travel in parallel with the road as in a lane change, the road vanishing point may not be present in the acquired image.

The decision at step S22 whether the road is straight or not, and the decision of step S23 whether the attributes of the road are standard or not, are made on the basis of the road map data supplied from the position detection processing unit 2. The position detection processing portion 25 in the position detection processing unit 2 reads from the road map memory 27 the road map data associated with the road, on which the vehicle is traveling, and provides the image recognition processing portion 15 with the road map data. The decision at step S24 whether the vehicle is traveling in parallel with the road is made by comparing the direction of the road shown by the road map data supplied from the position detection processing unit 2, and the current bearing data of the vehicle.

If all the conditions of the steps S22–S24 are satisfied, the processing proceeds to step S25. At step S25, coordinates (x, y) of a line candidate point are read out of the memory 17 to undergo the first Hough transform. The conversion equation is x=ay+b, where $1 \leq x \leq 256$, and $1 \leq y \leq 256$ on the screen. Each accumulator cell on the ab coordinate plane has a width $\Delta a$ of 0.01 in the a-axis direction, and a height $\Delta b$ of 1 in the b-axis direction.

At step S26, the value of the coefficient a associated with a slope of the straight line is set at a particular value in the range given by expression (20). The range in expression (20) can practically cover all slopes of lines reaching the vanishing point in an image as long as the vehicle travels along the road.

$$k1 \leq a \leq k2 \text{ (For example, } k1=-2, k2=2)  \quad (20)$$

At step S27, the value of the coefficient b is obtained in accordance with expression (21).

$$b=-ay+x \quad (21)$$

At step S28, the value of b is tested whether it is in the range given by expression (22). The range in expression (22) can practically cover all intercept b of lines reaching the vanishing point in an image as long as the vehicle travels along the road.

$$k3 \leq b \leq k4 \text{ (For example, } k3=-511, k4=768) \quad (22)$$

If the value of b is not within this range (step S29), the processing returns to step S26, at which the value of a is changed by 0.01. Thus, a similar processing is carried out. On the other hand, if the value b is within the range, the count value of the current accumulator cell (a, b) is incremented at step S30. At step S31, the maximum value p of the count values of the accumulator cells in the ranges of a and b is stored in the memory portion 17.

These processings are carried out for all values of a in the range given by expression (20) (step S32). After completing these processings, the process returns from step S33 to S25, where the coordinates (x, y) of the next line candidate point is read out from the memory portion 17. Thus, the processings from step S25 to step S33 are performed for the entire line candidate points. Thus, the first Hough transform processing has been completed.

Figure 9:
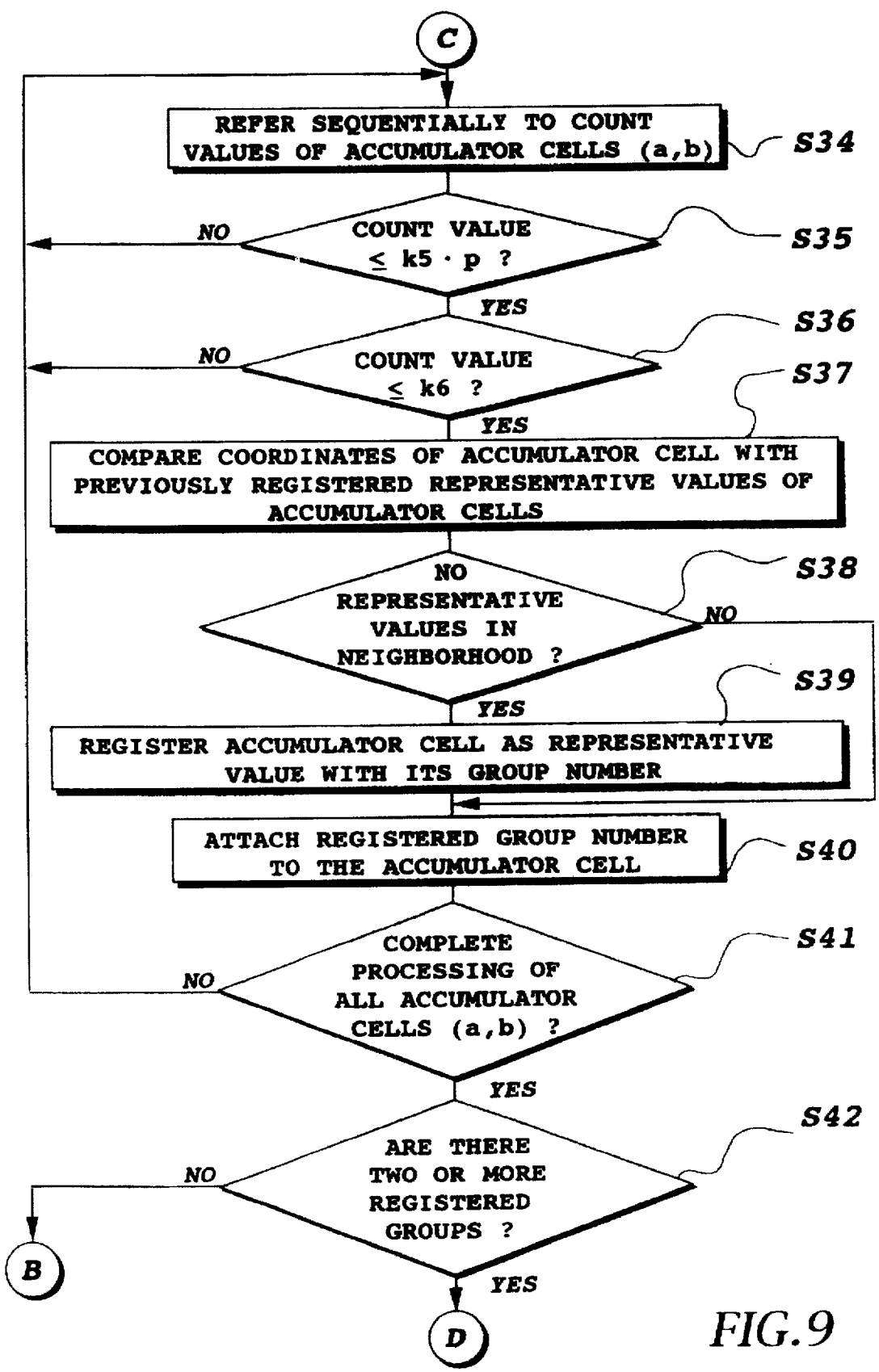

After the first Hough transform processing has been completed, each of the accumulator cells is referred to one by one at step S34 of FIG. 9. At step S35, the referred count value is tested whether it is equal to or greater than $k5 \cdot p$, where $k5$ is a constant whose value is 0.5, for example, and $k5 \cdot p$ becomes half the maximum count value p in this case. If the count value is less than the constant $k5 \cdot p$, the processing returns to step S34, where the count value of the next accumulator cell is tested in the same way. If the count value is equal to or greater than the constant $k5 \cdot p$, it is further tested at step S36 whether it is equal to or greater than a constant $k6$, which is set, for example, at three. This is performed considering the case where the maximum count value p is small. If the count value does not reach the constant $k6$, the processing returns to step S34.

At step S37, the coordinates of the accumulator cell of interest whose count value is considered sufficiently large is compared with the representative values of accumulator cells, which have been stored in the memory portion 17. The representative values of accumulator cells refer to the coordinates of a point representing a group of accumulator cells whose count values are sufficiently large and which are present within a close distance from the accumulator cell of interest (within 50 accumulator cells, for example). In other words, the accumulator cells whose count values are large are subdivided into groups so that these accumulator cells in a neighborhood belong to the same group. The representative values are the coordinates of a particular accumulator cell in the group. For example, the coordinates of a point of the accumulator cell which has been registered last in the group are made representative values. Group numbers are attached to the respective groups.

If no representative values of accumulator cells are found in the neighborhood at step S38, the coordinates of the point of the accumulator cell of interest is registered as the representative values, and a group number is attached thereto at step S39. This step is skipped if the representative values of accumulator cells are present in the neighborhood, and the processing proceeds to step S40.

At step S40, the group number associated with the representative values of accumulator cells is attached to the accumulator cell of interest. Thus, the classification of the accumulator cells whose count values are large is achieved by providing them with a group number.

The processing described above is executed for all accumulator cells defined by a and b in the range given by expressions (20) and (22) (step S41). At step S42, it is tested whether or not there are at least two registered groups of the accumulator cells. Unless there are two or more groups, the calculation of the road vanishing point is inhibited, and the process is completed at step S42. This is because only a single straight line is found in this case, which cannot provide the road vanishing point. If two more groups are registered, the second Hough transform processing is started from step S43 of FIG 10A.

In the second Hough transform processing, the points, to which the group number is provide, are used. In other words, only the accumulator cells whose count values are large are used. Although a group number is attached to accumulator cells whose count values are above a fixed value in the first Hough transform described above, alternative methods can also be applied. For example, a group number may be given to a point associated with a set of accumulator cells within a predetermined neighboring area (an area associated with five neighboring accumulator cells, for example), only if the sum total of the count values of these accumulator cells is greater than a predetermined value. In the second Hough transform, only the points, to which the group numbers are attached, are used. In this case, a particular point in the accumulator cell whose count value is the maximum in the group can be selected as the point which is used in the second Hough transform. Alternatively, a particular point of the set of accumulator cells in the predetermined neighboring area, whose total sum is the maximum in the group, may be selected as the point which is used in the second Hough transform. Thus, load of the second Hough transform processing can be reduced.

Furthermore, the second Hough transform may use only such a group that includes a predetermined number (five, for example) of points, which are associated with the accumulator cells whose count values are each greater than a predetermined value, or which are associated with the accumulator cells in the neighboring area whose total count value exceed a predetermined value. In this way, the line candidate points associated with the contour lines of the vehicle or the like as the lines L5–L10 in FIG. 3A can be obviated, and only line candidate points associated with the parallel lines with the road can be used in the second Hough transform. This makes it possible to improve the calculation accuracy of the road vanishing point.

Figure 10B:
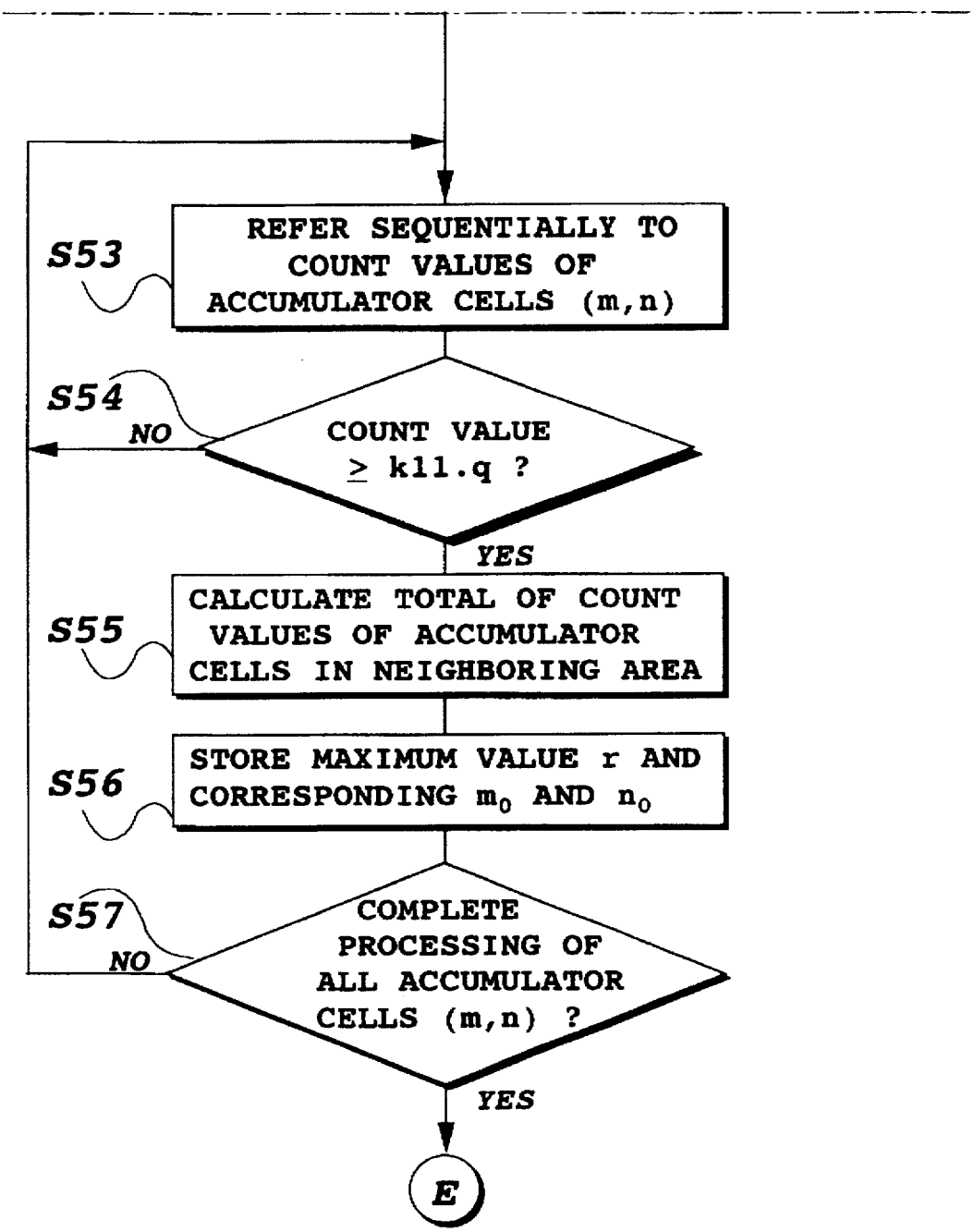

The second Hough transform will be described with reference to FIGS. 10A and 10B. At step S43, the coordinates (a, b) on the ab coordinate plane which are stored in the memory portion 17 are sequentially referred to. Only points to which the group number is attached are subject to the Hough transform (step S44). The conversion equation in this case is b=ma +n. Each accumulator cell on the mn coordinate plane has a width Δm of 1 in the m-axis direction, and a height Δn of 1 in the n-axis direction.

At step S45, the value of m is set at a particular value in the range given by expression (23). The range in expression (23) can practically cover all lines reaching the vanishing point in an image as long as the vehicle travels along the road.

$$k7 \leq m \leq k8 \text{ (For example, } k7=-256, k8=-1) \tag{23}$$

At step S46, the value of n is obtained in accordance with expression (24).

$$n=-ma+b \tag{24}$$

At step S47, the value of n is tested whether it is in the range given by expression (25). The range in expression (25) can practically cover all lines reaching the vanishing point in the image as long as the vehicle travels along the road.

$$k9 \leq n \leq k10 \text{ (For example, } k9=1, k10=256) \tag{25}$$

If the value of n is not within this range (step S48), the processing returns to step S45, at which the value of m is changed, and a similar processing is carried out. On the other hand, if the value n is within the range, the count value of the current accumulator cell (m, n) is incremented at step S49. At step S50, the maximum value q of the count values of the accumulator cells in the ranges of m and n is stored in the memory portion 17.

These processings are carried out for all values of m in the range given by expression (23) (step S51). After completing these processings, the process returns from step S52 to S43, where the coordinates (a, b) of the next accumulator cell is read out from the memory portion 17. Thus, the processings from step S43 to step S52 are performed for the entire accumulator cells. Thus, the second Hough transform processing has been completed.

After the second Hough transform processing has been completed, each of the accumulator cells on the mn coordinate plane is referred to one by one at step S53. At step S54, the referred count value is tested whether it is equal to or greater than k11·q, where k11 is a constant whose value is 0.5, for example, and k11·q becomes half the maximum count value q in this case. If the count value is less than the constant k11·q, the processing returns to step S53, where the count value of the next accumulator cell is tested in the same way. If the count value is equal to or greater than the constant k11·q, the total sum of the count values of the accumulator cells is calculated in the neighboring area of the accumulator cell of interest at step S55. For example, the total sum of the counts of the 100 neighboring accumulator cells is calculated, that is, the total sum of the accumulator cells in the area defined by ±5 cells in the m and n directions.

At step S56, the maximum value r of the total sum, and the coordinates ($m_0$, $n_0$) of the point associated with the maximum value are stored in the memory portion 17.

The processings of steps S53–S56 are carried out for all the accumulator cells in the ranges of m and n of expressions (23) and (24) (step S57). As a result, the total sum of the count values of the accumulator cells in the respective predetermined neighboring areas takes the maximum value at the point ($m_0$, $n_0$) in the ranges of m and n.

Figure 11A:
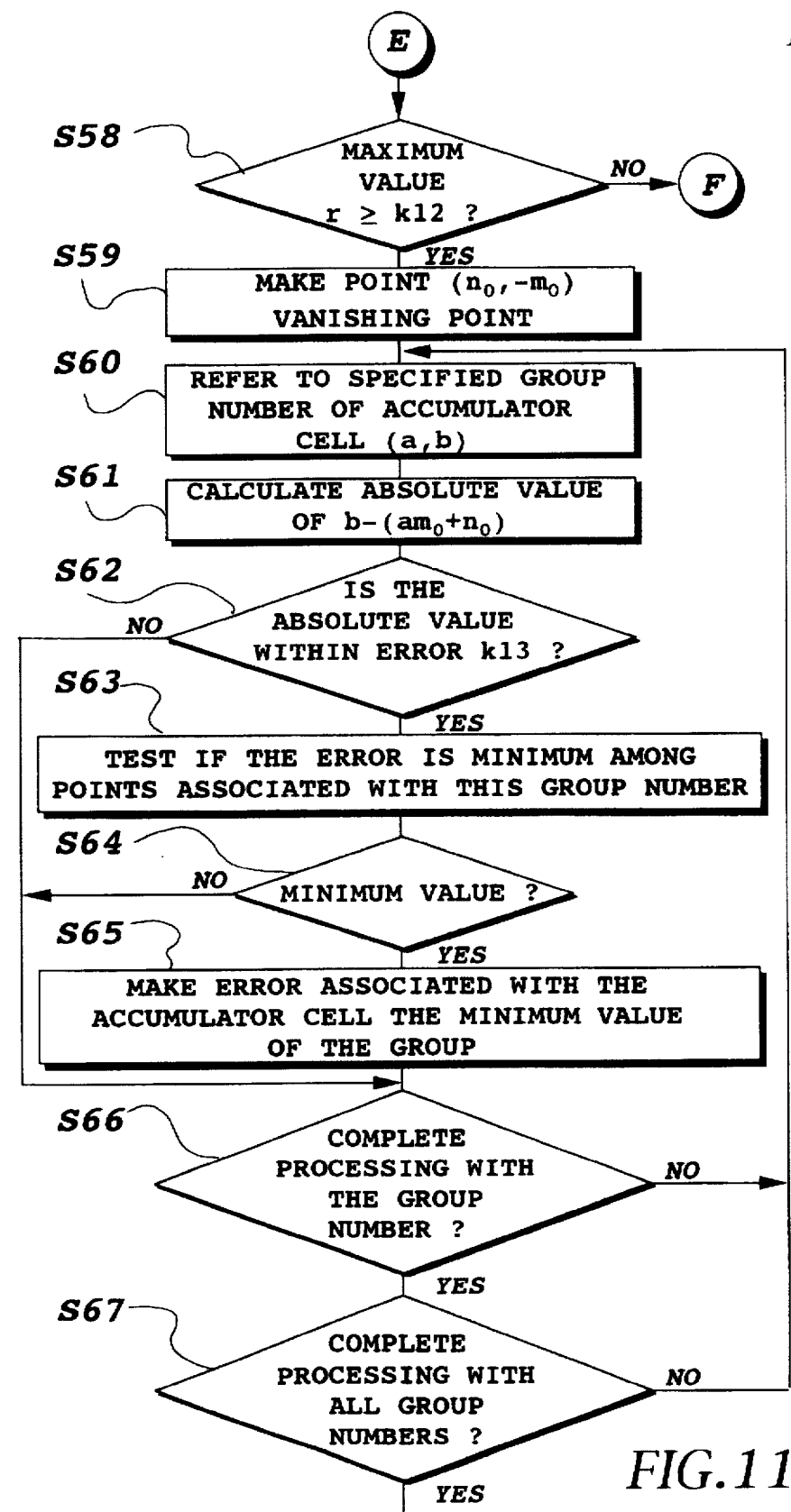
Figure 11B:
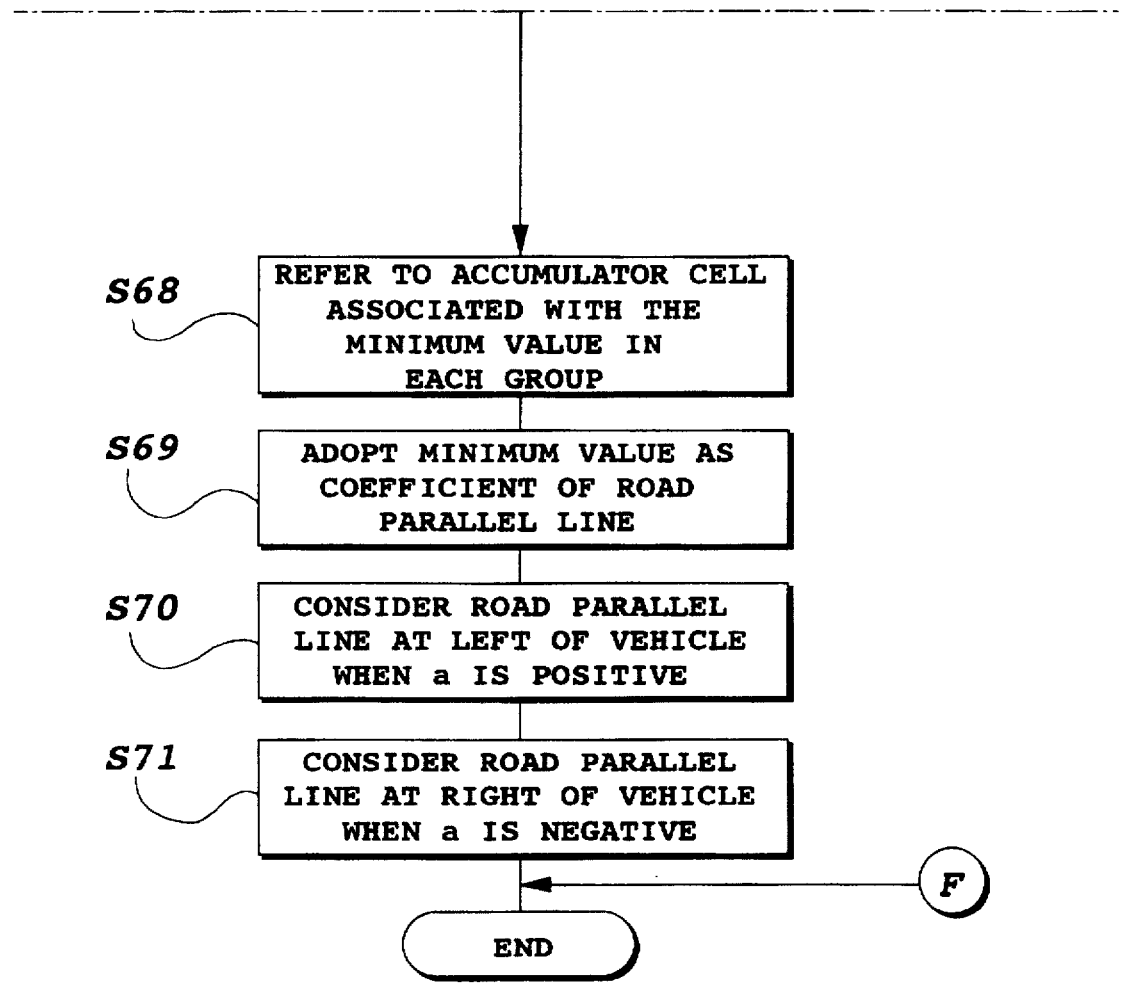

At step S58 of FIG. 11, the maximum value r of the total sum is tested whether it is equal to or greater than a constant k12 (=50, for example). If the maximum value r is less than k12, it is considered unreliable, and the calculation of the road vanishing point is inhibited, thereby ending the processing. On the other hand, if the maximum value r is equal to or greater than k12, the point ($n_0$, $-m_0$) is determined as the road vanishing point at step S59.

Although the road vanishing point is obtained by finding a point, at which the total sum of the count values of the accumulator cells in the predetermined neighboring area becomes maximum, it may be obtained based on the coordinates of the point, at which the count value of the accumulator cell becomes maximum. In this case, if the maximum value of the count value of the accumulator cell does not reach a predetermined value, the calculation of the road vanishing point should be inhibited.

The processings from step S60 are for obtaining road parallel lines which are parallel with the road. First, at step S60, the contents stored in the memory portion 17 are searched, and a particular group number of the accumulator cells on the ab coordinate plane is referred to. At step S61, the absolute value of b–($am_0+n_0$) is calculated as an error. If b=$am_0+n_0$ holds, those (a, b) give the slope and the intercept of a line passing through the road vanishing point ($x_0$, $y_0$). Accordingly, a road parallel line can be obtained by finding (a, b) at which the absolute value of b–($am_0+n_0$) becomes minimum. In other words, the (a, b) of a line that passes closest in the same group to the road vanishing point on the xy coordinate system is obtained as the coefficients of a road parallel line.

At step S62, the error obtained at step S61, that is, the absolute value of $b-(am_0+n_0)$, is tested whether it lies within a predetermined error constant k13 (=5, for example). If it is within the error constant k13, the error is tested at step S63 whether it is the minimum value in the errors associated with points to which the current group number is attached and which have already been processed. If it is minimum (step S64), the error associated with the coordinates of the accumulator cell is considered as the minimum error in the group to which the current group number is attached (step S65).

At step S66, it is tested whether the processings of steps S60–S65 have been completed for all the accumulator cells, to which the current group number is attached. If the answer is positive, it is further tested at step S67 whether the processings of steps S60–S66 have been completed with all the group numbers.

After completing the processings for all the group numbers at step S67, the accumulator cells associated with the minimum errors of respective groups are referred to at step S68, and the coordinates (a, b) of the accumulator cell associated with the minimum error are made the slope and the intercept of a road parallel line at step S69. If the coefficient a is positive, the road parallel line is considered a left-side parallel line of the vehicle at step S70, and if the coefficient a is negative, the road parallel line is considered a right-side parallel line.

In FIG. 3A, coefficients a and b can be obtained for respective road parallel lines L1–L4, and their equations can be given as follows: In this case, the coordinates of the road vanishing point NP are (120, 170).

$$L1: x=1.333y-106.7 \quad (26)$$

$$L2: x=0.863y-26.8 \quad (27)$$

$$L3: x=-0.992y+288.7 \quad (28)$$

$$L4: x=-1.844y+433.5 \quad (29)$$

If the coefficients a obtained for respective groups are all positive or negative, it is preferable that the road vanishing point and the road parallel lines be canceled. This is because the calculation accuracy of the road vanishing point will be low because the road parallel lines are present either the left-hand side or the right-hand side of the vehicle.

The inventors of the present invention experimentally executed the road vanishing point calculation processing for the following four cases.

(1) Using the coordinate data of the line candidate points on the straight lines L2 and L3 of FIG. 3A.

(2) Using the coordinate data of the line candidate points on the straight lines L2, L3, L5–L10 of FIG. 3A.

(3) Using the coordinate data of the line candidate points on the straight lines L1–L3, and L5–L10 of FIG. 3A.

(4) Using the coordinate data of the line candidate points on the straight lines L1–L10 of FIG. 3A.

The correct coordinates of the road vanishing point NP were obtained for each case. In particular, although the contour lines of the foregoing vehicles were included for the cases (2)–(4), it was confirmed that the road vanishing point were correctly obtained in these cases. In addition, the road parallel lines were obtained with little error. Only, the line L4 could not be obtained as a road parallel line in the case (4). This was supposed due to a small number of the line candidate points. Accordingly, the road parallel line associated with the straight line L4 is thought to be obtainable by increasing the number of the sampling data of the image.

The road vanishing point and the road parallel lines are used in the camera attitude parameter calculation processing, which will be described below.

5. The Attitude Parameter Calculation Processing of the On-Vehicle Color Camera

In this processing, the attitude parameters are obtained which represent the attitude of the on-vehicle color camera 11 with respect to the road. The attitude parameters include the yaw angle about the vertical axis of the vehicle, the roll angle about its longitudinal axis, the pitch angle about its traverse axis, and the traverse deviation distance of the on-vehicle camera 11 with respect of a reference line parallel with the road.

Although the on-vehicle camera 11 is mounted on the vehicle accurately with a predetermined attitude, occurrence of mounting error cannot be avoided. Accordingly, the attitude parameter calculation processing calculates the attitude of the on-vehicle camera 11 with respect to the vehicle, as well.

First, coordinate systems will be described. A road-vehicle coordinate system XYZ and an on-vehicle camera coordinate system X'Y'Z' are defined. The origin of the road-vehicle coordinate system XYZ is placed at the vehicle, the Y axis is taken along the traveling direction of the vehicle (the traveling direction is made +Y), and the X axis is set horizontally perpendicular to the Y axis (the right-hand direction is +X). In addition, the Z axis is set in the vertical direction with respect to the road. The road-vehicle coordinate system XYZ is partly attached to the vehicle because the traveling direction of the vehicle is taken as the Y axis, but is partly attached to the road because the Z axis is set in the vertical direction irrespective of the pitch or roll of the vehicle. Thus, this coordinate system is a combined system. The on-vehicle camera coordinate system shares the origin with the road-vehicle coordinate system. The image plane of the on-vehicle camera 11 is assumed to be substantially parallel with the XZ plane, and is set at the distance F from the origin, where F is the focal length of the lens of the on-vehicle camera 11.

The rotation angles about the X, Y and Z axes are the pitch angle θ, the roll angle φ, and the yaw angle ψ, respectively, where the right-hand screw directions are defined as positive. The mounting error of the on-vehicle camera 11 or the transformation of the on-vehicle camera coordinate system involved in turning of the vehicle will be given by equation (30). Here, the Y' axis is set in the axial direction of the lens of the on-vehicle camera 11, and the X' and Z' axes are set parallel with the image plane.

$$\begin{pmatrix} X' \\ Y' \\ Z' \end{pmatrix} = \begin{pmatrix} R_{11} & R_{12} & R_{13} \\ R_{21} & R_{22} & R_{23} \\ R_{31} & R_{32} & R_{33} \end{pmatrix} \begin{pmatrix} X \\ Y \\ Z \end{pmatrix} \quad (30)$$

where, $R_{11}=\cos\phi\cos\psi-\sin\theta\sin\phi\sin\psi$ $R_{12}=\cos\phi\sin\psi+\sin\theta\sin\phi\sin\psi$ $R_{13}=-\cos\theta\sin\phi$ $R_{21}=-\cos\theta\sin\psi$ $R_{22}=\cos\theta\sin\psi$ $R_{23}=\sin\theta$ $R_{31}=\sin\phi\cos\psi+\sin\theta\cos\phi\sin\psi$ $R_{32}=\sin\theta\sin\psi-\sin\theta\cos\phi\cos\psi$ $R_{33} = \cos\theta \cos\phi$ When the rotation angles are very small, equation (30) can be approximated by equation (31)

$$\begin{pmatrix} X' \\ Y' \\ Z' \end{pmatrix} = \begin{pmatrix} 1 & \psi & -\phi \\ -\psi & 1 & \theta \\ \phi & -\theta & 1 \end{pmatrix} \begin{pmatrix} X \\ Y \\ Z \end{pmatrix} \quad (31)$$

When a point P(X,Y,Z) (that is, P(X',Y',Z') on the on-vehicle camera coordinate system) is projected onto a point (x', y') on the image plane, the following equations hold.

$$x' = F \cdot X'/Y' \quad (32)$$

$$y' = F \cdot Z'/Y' \quad (33)$$

where F is the focal length of the lens of the on-vehicle camera, and the x'y' coordinate system is a two-dimensional coordinate system on the image plane, wherein the x'-axis is set in the X'-axis direction of the on-vehicle camera coordinate system, and y'-axis is set in the Z'-axis thereof.

From equations (30), (32) and (33), the following equations (34) and (35) are obtained.

$$x' = F(R_{11}X + R_{12}Y + R_{13}Z)/(R_{21}X + R_{22}Y + R_{23}Z) \quad (34)$$

$$y' = F(R_{31}X + R_{32}Y + R_{33}Z)/(R_{21}X + R_{22}Y + R_{23}Z) \quad (35)$$

In particular, when the approximations of equation (31) hold, the following equations (36) and (37) are obtained.

$$x' = F(X + \psi Y - \phi Z)/(-\psi X + Y + \theta Z) \quad (36)$$

$$y' = F(\phi X - \theta Y + Z)/(-\psi X + Y + \theta Z) \quad (37)$$

The attitude parameters of the on-vehicle camera 11, the pitch angle $\theta$, the roll angle $\phi$, and the yaw angle $\psi$ are divided into the following components, respectively.

Pitch Angle $\theta = \theta_0 + \theta_1$ where $\theta_0$ is the pitch angle of the vehicle with respect to the road, and $\theta_1$ is the pitch angle of the on-vehicle camera 11 with respect to the vehicle.

Roll Angle $\phi = \phi_0 + \phi_1$ where $\phi_0$ is the roll angle of the vehicle with respect to the road, and $\phi_1$ is the roll angle of the on-vehicle camera 11 with respect to the vehicle.

Yaw Angle $\psi = \psi_1$ where $\psi_1$ is the yaw angle of the on-vehicle camera 11 with respect to the vehicle. Since the Y axis of the road-vehicle coordinate system is set in the vehicle traveling direction, the yaw angle $\psi_0$ of the vehicle with respect to the road is not included in the yaw angle $\psi$.

Let us assume that the vehicle is traveling at an angle of $\psi_0$ with respect to the road, and the road goes straight a sufficiently long way. In addition, the bank of the rood is supposed to be negligible, and the road vanishing point $(X_0, Y_0, Z_0)$ is projected onto a point $(x_0, y_0)$ on the image plane. The projected point is the very road vanishing point which has been obtained by the road vanishing point calculation processing described above.

To obtain the relationships between the projected point $(x_0, y_0)$ and the pitch angle $\theta$, roll angle $\phi$ and the yaw angle $\psi$, $Y_0 = \infty$ is substituted into equations (34) and (35).

$x_0 = R_{12}F/R_{22}$ $y_0 = R_{32}F/R_{22}$

Here, since the vehicle travels at an angle $\psi_0$ with respect to the road, $\psi$ is substituted for $\psi_0 + \psi_1$. If the roll angle $\phi_0$ and the pitch angle $\theta_0$ of the vehicle with respect to the road, and the mounting angles $\phi_1$ and $\theta_1$ of the on-vehicle camera are small, the following approximations hold.

$R_{12} \approx \sin(\psi_0 + \psi_1)$ $R_{22} \approx 1$ $R_{32} \approx (\phi_0 + \phi_1)\sin(\psi_0 + \psi_1) - (\theta_0 + \theta_1)\cos(\psi_0 + \psi_1)$ Accordingly, the following expressions can be obtained.

$$x_0 = \sin(\psi_0 + \psi_1)F \quad (38)$$

$$y_0 = \{(\phi_0 + \phi_1)\sin(\psi_0 + \psi_1) - (\theta_0 + \theta_1)\cos(\psi_0 + \psi_1)\}F \quad (39)$$

Furthermore, if $\psi_0$ and $\psi_1$ are very small, the following equations (40) and (41) are obtained.

$$x_0 = (\psi_0 + \psi_1)F = \psi F \quad (40)$$

$$y_0 = -(\theta_0 + \theta_1)F = -\theta F \quad (41)$$

These equations show that the pitch angle $\theta$ $(=\theta_0+\theta_1)$ and the yaw angle $\psi$ $(=\psi_0+\psi_1)$ of the attitude parameters of the on-vehicle camera 11 with respect to the road can be obtained from the coordinates $(x_0, y_0)$ of the road vanishing point on the image plane.

The attitude parameters includes, in addition to the pitch angle $\theta$ and the yaw angle $\psi$, the roll angle $\phi$ and the traverse deviation distance A of the on-vehicle camera from a reference line parallel to the road. Hence, the roll angle $\phi$ and the traverse deviation distance A must be obtained.

To achieve this, equations of two road parallel lines on the image plane and the space between them are utilized.

When the height of the on-vehicle camera from the surface of the road is h, the height Z of the road parallel lines are $-h$. In addition, the traverse deviation distance A of the on-vehicle camera and the angle $\psi_0$ between the vehicle and the road are related by the following equation (42).

$$X = A/\cos\psi_0 + Y\tan\psi_0 \approx A + Y\psi_0 \quad (42)$$

Consequently, equations (34) and (35) are rewritten as follows:

$$x' = \frac{F\{A + (\psi_0 + \psi_1)Y + \phi h\}}{-\psi_1 A + (1 - \psi_0\psi_1)Y - \theta h} \quad (43)$$

$$y' = \frac{F\{\phi A + (\phi\psi_0 - \theta)Y - h\}}{-\psi_1 A + (1 - \psi_0\psi_1)Y - \theta h} \quad (44)$$

where $\psi$ in equations (34) and (35) are replaced with $\psi_1$. By eliminating Y from these equations, the following equations (45) expressing a road parallel line on the image plane can be obtained.

$$x' = ay' + b \quad (45)$$

$$a = \frac{\psi_1^2 A + (\theta h - \phi h \psi_0)\psi_1 + A + \phi h + \theta h \psi_0}{\phi A - h(1 - \psi_0\psi_1) - \theta \psi_1 A - \theta^2 h + \theta h \phi \psi_0}$$

$$b = \frac{(\phi A \psi_1 - \psi_1 h + \theta A + \theta \phi h - \psi_0 h - \phi^2 \psi_0 h)F}{\phi A - h(1 - \psi_0\psi_1) - \theta \psi_1 A - \theta^2 h + \theta h \phi \psi_1}$$

If two road parallel lines are obtained and their space B is known, equations (46)–(48) similar to equation (45) are obtained. Here, suffixes 1 and 2 attached to the coefficients a and b and A represent those of the two road parallel lines.

$$x' = a_1 y' + b \quad (46)$$

$$a_1 = \frac{\psi_1^2 A_1 + (\theta h - \phi h \psi_0)\psi_1 + A_1 + \phi h + \theta h \psi_0}{\phi A_1 - h(1 - \psi_0 \psi_1) - \theta \psi_1 A_1 - \theta \psi_1 A_1 - \theta^2 h + \theta h \phi \psi_0}$$

$$b_1 = \frac{(\phi A_1 \psi_1 - \psi_1 h + \theta A_1 + \theta \phi h - \psi_0 h - \phi^2 \psi_0 h)F}{\phi A_1 - h(1 - \psi_0 \psi_1) - \theta \psi_1 A_1 - \theta^2 h + \theta h \phi \psi_0}$$

$$x' = a_2 y' + b_2 \quad (47)$$

$$a_2 = \frac{\psi_1^2 A_2 + (\theta h - \phi h \psi_0)\psi_1 + A_2 + \phi h + \theta h \psi_0}{\phi A_2 - h(1 - \psi_0 \psi_1) - \theta \psi_1 A_2 - \theta^2 h + \theta h \phi \psi_0}$$

$$b_2 = \frac{(\phi A_2 \psi_1 - \psi_1 h + \theta A_2 + \theta \phi h - \psi_0 h - \phi^2 \psi_0 h)F}{\phi A_2 - h(1 - \psi_0 \psi_1) - \theta \psi_1 A_2 - \theta^2 h + \theta h \phi \psi_0}$$

$$B = A_2 - A_1 \text{(when } A_2 > A_1\text{)} \quad (48)$$

$A_1$, $A_0$ and $\phi$ are obtained by solving the following equations (49)–(51), which are obtained from equations associated with $a_1$ and $a_2$ of equations (46) and (47).

$$(a_1 - a_2)(1 + \psi_1^2)A_1^2 + \quad (49)$$

$$(a_1 - a_2)\{B(1 + \psi_1^2) + 2\theta h(\psi_0 + \psi_1)\}A_1 -$$

$$Bh(1 + \theta^2)(1 - \psi_0\psi_1)a_1 a_2 +$$

$$[h^2\{\theta^2(1 + \psi_0^2) + (1 - \psi_0\psi_1)^2\} + \theta\psi_0 Bh(1 + \psi_1^2)]a_1 +$$

$$[-h^2\{\theta^2(1 + \psi_0^2) + (1 - \psi_0\psi_1)^2\} +$$

$$\theta Bh(\psi_0\psi_1^2 - 2\psi_1 - \psi_0)]a_2 -$$

$$Bh(1 + \psi_1^2)(1 - \psi_0\psi_1) = 0$$

$$A_2 = A_1 + B \quad (50)$$

$$(1 + \psi_1^2 + \theta\psi_1 a_1)A_1 + \quad (51)$$

$$\phi = \frac{h(1 - \psi_0\psi_1 + \theta^2)a_1 + \theta h(\psi_0 + \psi_1)}{(A_1 + \theta h\psi_0)a_1 - h(1 - \psi_0\psi_1)}$$

Since it is assumed in equations (46) and (47) that $\theta$, $\phi$, $\psi_0$ and $\psi_1$ are very small, their quadratic components (such as $\theta^2$, $\theta\phi$) are negligible, and hence, $$a_1 = (A_1 + \phi h)/(\phi A_1 - h)$$

$$a_2 = (A_2 + \phi h)/(\phi A_2 - h)$$

are obtained. Solving these equations gives $A_1$ and $A_2$.

$$A_1 = -(a_1 + \phi)h/(1 - \phi a_1)$$

$$A_2 = -(a_2 + \phi)h/(1 - \phi a_2)$$

These equations show that the traverse deviation distances A1 and A2 can be approximately obtained if the roll angle $\phi$ is known.

When the vehicle travels straight, and hence, the roll angle $\phi_0$ is negligible, the following equations (52) and (53) are obtained.

$$A_1 = -(a_1 + \psi_1)h/(1\psi_1 a_1) \quad (52)$$

$$A_2 = -(a_2 + \psi_1)h/(1\psi_1 a_2) \quad (53)$$

Data about the road vanishing point $(x_0, y_0)$ is obtained by actually running the vehicle on a straight road, and then, substituting the data into equations (40) and (41) yields the yaw angle $\psi_1$ and the pitch angle $\theta_1$ of the on-vehicle camera with respect to the vehicle.

Although the roll angle $\phi_0$ or pitch angle $\theta_0$ themselves of the vehicle with respect to the road cannot be obtained, they can be understood as noise varying about the mean value of zero. In other words, if long term mean values of the roll angle $\phi$ and the pitch angle $\theta$ are calculated, the roll angle $\phi_0$ and the pitch angle $\theta_0$ of the vehicle with respect to the road are thought to become zero. The yaw angle $\psi_0$ with respect to the road may also be considered as noise that varies about the mean value of zero as long as the vehicle travels in parallel with the road. Its accurate value, however, can be obtained from the current bearing data of the vehicle and the road map data provided by the position detection processing unit 2. More specifically, the actual traveling direction of the vehicle is obtained from the current bearing data, and the direction of the road, on which the vehicle is running, is obtained from the road map data. Thus, the difference of the actual traveling direction against the road direction is determined as the yaw angle $\psi_0$ of the vehicle with respect to the road.

Consequently, averaging many data of the road vanishing pint $(x_0, y_0)$ will give the yaw angle $\psi_1$ and the pitch angle $\theta_1$ of the on-vehicle camera 11 with respect to the vehicle, because $\theta_0$ is considered to be zero, and $\psi_0$ is considered to be zero or a fixed value. In addition, the standard deviations of the yaw angle $\psi_0$ and the pitch angle $\theta_0$ can also be obtained.

Next, coefficients a and b of the road parallel lines on the image plane are obtained while the vehicle is running.

If the space B between two road parallel lines is known, the traverse deviation distance $A_1$ of the on-vehicle camera 11 can be obtained by solving quadratic equation (49) of $A_1$. In addition, the traverse deviation distance $A_2$ can be obtained from equation (50), and the roll angle $\phi$ can be obtained from equation (51).

The space B may be a road width or the space between two white lines oh the-road, which can be obtained from the road map data if these data have been stored in the road map in advance.

As described above, the mean value of the roll angle $\phi_0$ is thought to be zero because many data are averaged. Accordingly, the roll angle $\phi_1$ of the on-vehicle camera 11 with respect to the vehicle can be obtained. In addition, the standard deviation of the roll angle $\phi_0$, which represents the deviation from the mean value, can also be obtained.

Thus, the yaw angle $\psi_1$, the pitch angle $\theta_1$ and the roll angle $\phi_1$ of the camera with respect to the vehicle, and the standard deviations which indicate the reliability of the yaw angle $\psi_0$, the pitch angle $\theta_0$ and the roll angle $\phi_0$ of the vehicle with respect to the road can be obtained. Once the angle values of the on-vehicle camera with respect to the vehicle have been obtained, they can be used in later travels. These processings are referred to as an initial processing, which obtains the yaw angle $\psi_1$, the pitch angle $\theta_1$ and the roll angle $\phi_1$ of the camera with respect to the vehicle, and the standard deviations of the yaw angle $\psi_0$, the pitch angle $\theta_0$ and the roll angle $\phi_0$ of the vehicle with respect to the road while running the vehicle.

Figure 12A:
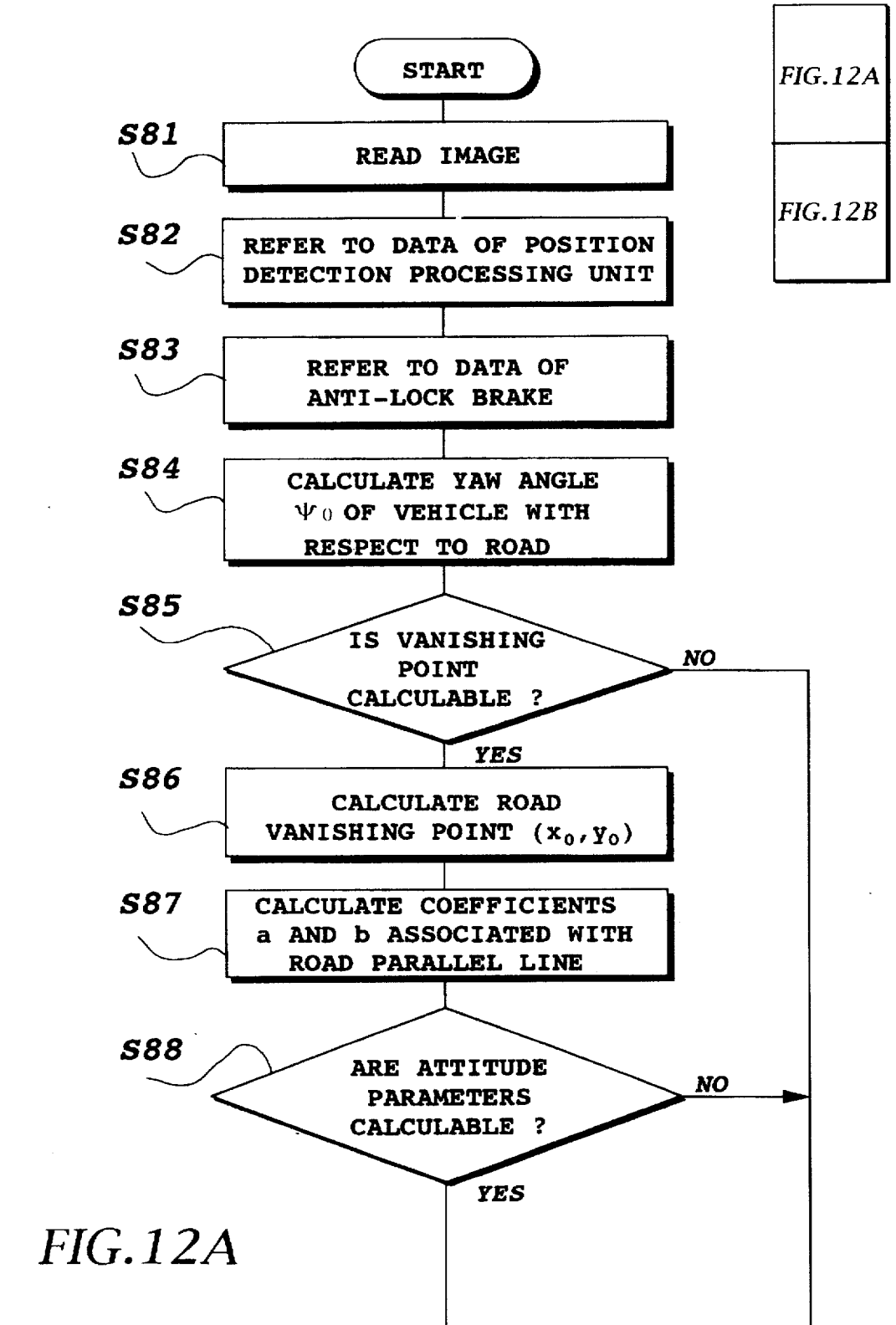
FIGS. 12A and 12B are flowcharts for explaining the camera attitude parameter calculation processing.
Figure 12B:
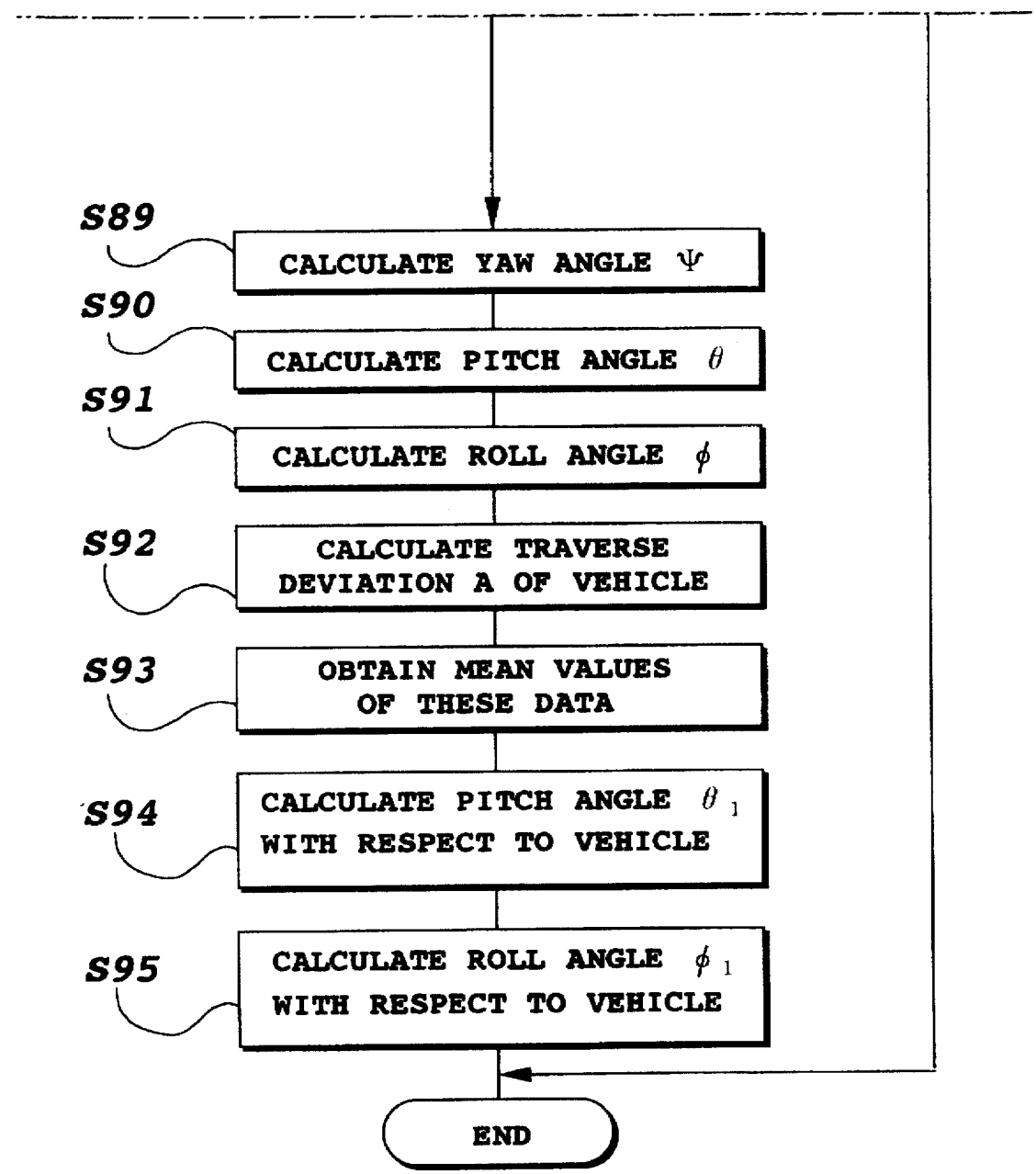

FIGS. 12A and 12B are flowcharts for explaining the camera attitude parameter calculation processing performed in the image recognition processing portion 15. At step S81, the image data associated with an image acquired by the on-vehicle camera 11 is stored into the memory portion 17. At steps S82 and S83, the support information are read from the position detection processing unit 2, and the anti-lock brake unit 3, respectively. At step S84, the yaw angle $\psi_0$ of the vehicle with respect to the road is calculated on the basis of the data provided from the position detection processing unit 2.

At step S85, it is tested whether the calculation of the road vanishing point is possible or not. If the calculation is impossible, the processing is ended, and if it is possible, the road vanishing point $(x_0, y_0)$ is calculated at step S86 by carrying out the road vanishing point calculation processing described above. At step 87, the coefficients a and b of the road parallel lines are calculated.

The test at step S85, which decides whether the road vanishing point can be calculated or not, is carried out based on the condition whether the value of the yaw angle $\psi_0$ of the vehicle with respect to the road is less than a predetermined value. Other conditions such as whether the road is straight, or the attributes of the road satisfy predetermined conditions are also considered as described above in the explanation of the road vanishing point calculation processing.

After the road vanishing point and the coefficients of the road parallel lines have been calculated, it is tested whether the calculation of the attitude parameters are possible or not at step S88. The decision rules in this case are as follows:

(1) If the angle between the traveling direction of the vehicle and the road parallel lines are negligibly small, decision is made that the calculation of the attitude parameters is possible. This rule is applied because when the yaw angle $\psi_0$ of the vehicle with respect to the road is not negligible, errors of the calculation are expected to be large. In this case, if the error between the change in the traveling bearing of the vehicle and the change in the bearing of the road (which is obtained from the road map data) after the vehicle travels a predetermined distance is within a predetermined value (0.1 degree, for example), the angle between the traveling direction and the road parallel lines is considered to be negligible, and the vehicle is running in parallel with the road. Alternatively, when the change in the traveling bearing of the vehicle is kept less than a predetermined value (less than 0.1 degree, for example) over a predetermined distance, it may be considered that the road is straight, and the vehicle is running in parallel with the vehicle, and hence, the angle between the traveling direction and the road parallel lines is negligible.

(2) When the vehicle speed is within a predetermined value (100 km/h, for example), decision is made that the attitude parameters can be calculated. The vehicle speed can be estimated from the current position data or the mileage data of the vehicle. If the vehicle speed is not within the predetermined value, the attitude parameters of the on-vehicle camera with respect to the road may be large owing to oscillation of the vehicle body, and hence, the calculation of the attitude parameters may be erroneous.

(3) When the acceleration (or deceleration) of the vehicle is less than a predetermined value (0.1 g, for example), decision is made that the attitude parameters are calculable. The acceleration can be estimated from the current position data or the mileage data, or from the g-sensor data or the brake data. Alternatively, if the operation of the brake is detected from the brake data, the calculation of the attitude parameters may be inhibited. This is because the deceleration greater than the predetermined value will result in an abnormally large pitch angle $\theta_0$ of the vehicle with respect to the road, and hence, the calculation of the attitude parameters may become erroneous.

(4) When the change in the bearing of the vehicle after traveling a predetermined distance is less than a predetermined value (0.1 degree, for example), decision is made that the attitude parameters are calculable. When the change in the bearing is greater than the predetermined value, it is thought that the vehicle is curving, and hence, the roll angle $\phi_0$ of the vehicle with respect to the road will become abnormally large owing to the centrifugal force.

If the decision is made that the attitude parameters are calculable, the yaw angle $\psi$ of the on-vehicle camera with respect to the road is obtained in accordance with equation (40) at step S89. In addition, the pitch angle $\theta$ and the roll angle $\phi$ are obtained by equations (41) and (51), at steps S90 and S91, respectively. Moreover, at step S92, the traverse deviation distance A is obtained by equations (49) and (50).

At steps S93, the mean values of the yaw angle $\psi$, the pitch angle $\theta$, and the roll angle $\phi$ are obtained. If the attitude parameter calculation processing as shown in FIGS. 12A and 12B is performed at every predetermined mileage (100 km, for example), the mean values of the parameters obtained at respective mileages are calculated. Alternatively, if the attitude parameter calculation processing is performed at every predetermined time interval (two hours, for example), the mean values of the parameters obtained at the respective time intervals are calculated. By the averaging processings, likelihood values of the yaw angle $\psi$, the pitch angle $\theta$ and the roll angle $\phi$ are obtained.

Furthermore, the mean value of the pitch angle $\theta$ is adopted as the pitch angle $\theta_1$ of the on-vehicle camera 11 with respect to the vehicle at step S94, and the mean value of the roll angle $\phi$ is adopted as the roll angle $\phi_1$ of the on-vehicle camera 11 with respect to the vehicle at step S95. The reasonableness of this is clear from the fact that the pitch angle $\theta_0$ and the roll angle $\phi_0$ of the vehicle with respect to the road become negligibly small by averaging over a sufficiently long time interval.

Thus, the attitude parameters $\theta$, $\phi$ and $\psi$, and the traverse deviation distance A can be obtained by the processing described above. These attitude parameter are utilized in the object tracking recognition processing describe below.

6. Tracking Recognition Processing of Objects

The tracking recognition processing of objects is one for trace recognizing predetermined types of objects (called "objects" below) such as road signs, marks on a road, pedestrians, and other vehicles in an image acquired by the on-vehicle camera 11. The image recognition uses the attitude parameters of the on-vehicle camera 11, and the support information provided by the position detection processing unit 2 and the anti-lock brake unit 3.

In the following description, the tracking recognition of still objects such as road signs and marks on the road will be explained first, and then, the tracking recognition of moving objects such as other vehicles will be described. In tracing objects, one or more points specified in advance with the objects (referred to as "specified points") will be attended to.

6-1. Tracking Recognition of Still Objects

Modifying equations (36) and (37) used in the explanations of the camera attitude parameter calculation processing, and solving them with respects to X and Y under the assumptions that a point (x', y') on the image plane, the camera attitude parameters $\psi$, $\phi$, and $\theta$, and the variable Z are known, the following equation (54) is obtained.

$$\begin{bmatrix} X \\ Y \end{bmatrix} = \begin{bmatrix} F + \psi x' & F\psi - x' \\ F\phi + \psi y' & -F\theta - y' \end{bmatrix}^{-1} \begin{bmatrix} (F\phi + \theta x')Z \\ (-F + \theta y')Z \end{bmatrix} \quad (54)$$

Accordingly, if the coordinates $(x_t', y_t')$ of a specified point on the image plane is obtained at a processing period t, and the camera attitude parameters and the height Z of the specified point seen from the vehicle are known, the position $(X_r, Y_r)$ of the specified point seen from the road can be obtained by equation (54). Here, the height Z of a specified point seen from the vehicle is a fixed value, and becomes –h when the specified point is on the ground.

The parameters and variables will change as the time elapses. Assuming that the mileage data of the vehicle from the processing period t to the next processing time period t+1 is $L_{t+1}$, and the bearing changing data is $\Delta\psi_{t+1}$, the position $(X_{t+1}, Y_{t+1})$ of the specified point at the processing period t+1 is given by the following equation. If the bearing changing data from the position detection processing unit 2 is available, it can be used without modification.

$$\begin{bmatrix} X_{t+1} \\ Y_{t+1} \end{bmatrix} = \begin{bmatrix} \cos\Delta\psi_{t+1} & \sin\Delta\psi_{t+1} \\ -\sin\Delta\psi_{t+1} & \cos\Delta\psi_{t+1} \end{bmatrix} \begin{bmatrix} X_t + L_{t+1}\cdot\sin\Delta\psi_{t+1} \\ Y_t - L_{t+1}\cdot\cos\Delta\psi_{t+1} \end{bmatrix}$$

$$\approx \begin{bmatrix} 1 & \Delta\psi_{t+1} \\ -\Delta\psi_{t+1} & 1 \end{bmatrix} \begin{bmatrix} X_t + L_{t+1}\cdot\Delta\psi_{t+1} \\ Y_t - L_{t+1} \end{bmatrix}$$ (55)

The vector components $L_{t+1}\cdot\sin\Delta\psi_{t+1}$ and $-L_{t+1}\cdot\cos\Delta\psi_{t+1}$ of the right-hand side of equation (55) represent shortened amounts of distance between objects and the camera by the movement of the vehicle, and the 2×2 matrix of the right-hand side represents the rotation of the field of the camera due to the change in the yaw angle of the camera.

Substituting $(X_{t+1}, Y_{t+1})$ of equation (55) and the camera attitude parameters $\psi t+1$, $\phi t+1$ and $\theta t+1$ into equations (36) and (37) makes it possible to estimate the position $(x_{t+1}', y_{t+1}')$ of the specified position on the image plane at processing period t+1.

$$x_{t+1}' = F(X_{t+1} + \psi_{t+1}Y_{t+1} - \phi_{t+1}Z)/ \qquad (56)$$
$$(-\psi_{t+1}X_{t+1} + Y_{t+1} + \theta_{t+1}Z)$$

$$y_{t+1}' = F(\phi_{t+1}X_{t+1} - \theta_{t+1}Y_{t+1} + Z)/ \qquad (57)$$
$$(-\psi_{t+1}X_{t+1} + Y_{t+1} + \theta_{t+1}Z)$$

In other words, if the position of the specified point at processing period t is known, the position of that specified position on the image plane at time period t+1 can be estimated on the basis of the camera attitude parameters, the mileage data, and bearing data. Accordingly, tracking of a particular object in successively acquired images can be achieved by separating a portion around the estimated position, searching for the specified point in the portion, and recognizing the object associated with the specified point if the specified point is present in the portion. This will save a recognition processing time.

The range of the portion around the estimated position is determined considering the error between the estimated position and the actual position of the specified point on the image plane. More specifically, assuming that the estimated position and the actual position at processing period t are $(^E x_t', {}^E y_t')$ and $(^M x_t', {}^M y_t')$, respectively, and that the operations for obtaining the average value, the variance, the standard deviation, and the square root are represented by ave, var, std, and sqrt, respectively, the following expressions are obtained.

$$\text{var}(x) = ave(x - ave(x))^2$$

$$std(x) = sqrt(\text{var}(x))$$

-continued $$x = {}^E x_t' - {}^M x_t'$$

$$\text{var}(y) = ave(y - ave(y))^2$$

$$std(y) = sqrt(\text{var}(y))$$

$$y = {}^E y_t' - {}^M y_t'$$

Hence, errors of a position in the x and y directions on the image plane can be obtained as k·std(x) and k·std(y), where k is a fixed value. Thus, a range determined by these errors (referred to as an error range σ) can be separated as a portion including the specified point.

The error range σ can be more appropriately set if the value k is made variable in accordance with the speed, the bearing change, the reliability of the attitude parameters of the vehicle, or the like. Specifically, k may be kept constant when the speed of the vehicle is equal to or less than a predetermined value (100 km/h, for example), whereas k may be made substantially proportional to the speed of the vehicles when the speed is greater than the predetermined value. Alternatively, k may be made substantially proportional to the magnitude of the bearing change when the change in the bearing of the vehicle per unit time or per unit mileage is equal to or greater than a predetermined value (0.1 degree, for example). In addition, the error range σ may be changed in accordance with the kinds of objects to be recognized, or a common error range σ may be used in common independently of the kinds of the objects.

The position (X, Y, Z) of a specified point can successively estimated by a filter such as a Kalman filter under an assumption that equation (54) includes errors. In this case, the position (X, Y, Z) is estimated using filtering and on the basis of the mileage, the error of the bearing change, the estimation error of the attitude parameters, the difference between the estimated and actual values of the position (x', y') on the image plane.

Figure 13:
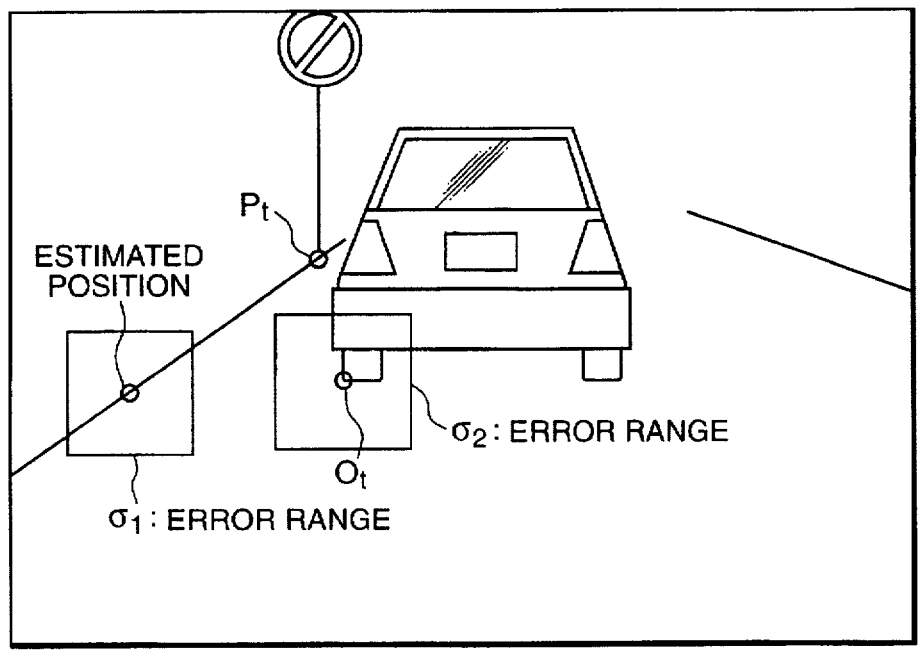
FIG. 13 is a diagram illustrating specified points defined in connection with foregoing objects and error ranges σ near the estimated positions of the specified points.
Figure 14:
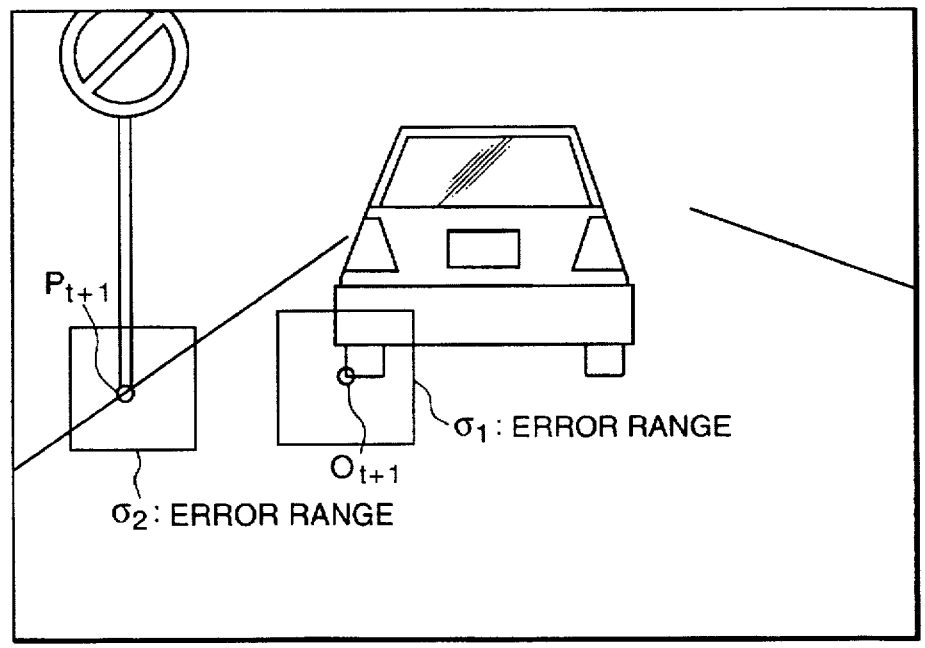
FIG. 14 is a diagram illustrating the fact that the specified points are actually found in the error ranges σ at the next processing period.

FIG. 13 shows, in addition to a foregoing vehicle a specified point $P_t$ $(x_t, y_t)$, at time period t, of a road sign to be recognized, that is, a still object ahead of the present vehicle, and an error range $\sigma_1$ in a neighborhood of the estimated position at the next processing period t+1. At the next processing period, the specified point $P_{t+1}(x_{t+1}', y_{t+1}')$ can be found in the error range $\sigma_1$ as shown in FIG. 14.

Thus, limiting a search range by the method described above while successively tracking and recognizing still objects such as road signs and traffic signals makes it possible to quickly perform tracking processing of the objects.

6-2. Tracking Recognition of Moving Objects

Tracking and recognizing a moving object cannot use the transform of equation (55). Instead of equation (55), the following equation (58) is used which considers the temporal changes in the positions of moving objects.

$$\begin{bmatrix} X_{t+1} \\ Y_{t+1} \end{bmatrix} = \begin{bmatrix} \cos\Delta\psi_{t+1} & \sin\Delta\psi_{t+1} \\ -\sin\Delta\psi_{t+1} & \cos\Delta\psi_{t+1} \end{bmatrix} \times$$

$$\begin{bmatrix} X_t + (X_t - X_{t-1}) + L_{t+1} \cdot \sin\Delta\psi_{t+1} - L_t \cdot \sin\Delta\psi_t \\ Y_t + (Y_t - Y_{t-1}) - L_{t+1} \cdot \cos\Delta\psi_{t+1} + L_t \cdot \cos\Delta\psi_t \end{bmatrix}$$

$$= \begin{bmatrix} 1 & \Delta\psi_{t+1} \\ -\Delta\psi_{t+1} & 1 \end{bmatrix} \begin{bmatrix} X_t + (X_t - X_{t-1}) + L_{t+1}\Delta\psi_{t+1} - L_t\Delta\psi_t \\ Y_t + (Y_t - Y_{t-1}) - L_{t+1} + L_t \end{bmatrix}$$

(58)

Comparing equation (58) with equation (55), it is seen that the following terms are added to the right-hand vector of equation (55).

$$(X_t - X_{t-1}) - L_t \sin\Delta\psi_t, \tag{59}$$

$$(Y_t - Y_{t-1}) + L_t \cos\Delta\psi_t, \tag{60}$$

where $(X_t - X_{t-1})$ and $(Y_t - Y_{t-1})$ are associated with the apparent moving distance of an object from the preceding processing period t−1 to the present processing period t, and $$L_t \sin\Delta\psi_t,$$

$$-L_t \cos\Delta\psi_t,$$

are associated with the moving distance of the vehicle from the processing period t−1 to the present processing period t. Accordingly, equations (59) and (60) representing the differences of these terms express the net moving distance of the object from the preceding processing period t−1 to the present processing period t.

In obtaining the position of an object at the next processing period t+1 by using equation (58), it is assumed that the moving distance of the object from the preceding processing period t−1 to the present processing period t is equal to that from the present processing period t to the next processing period t+1. As a result, if the temporal change in the position of the object from the preceding processing period t−1 to the present processing time period t is known, the object can be tracked and recognized using equation (58). The assumption that the moving distance of object from the preceding processing period t−1 to the present processing period t is equal to that from the present processing period t to the next processing period t+1 requires that the speed of the object be not change quickly. This prerequisite holds sufficiently if the moving object is a vehicle.

FIG. 13 shows a specified point $O_t(x_t, y_t)$, at the processing period t, of the foregoing vehicle as a moving object, and an error range $\sigma_2$ at the processing period t+1. The specified point $O_{t+1}$ is actually found in the error range $\sigma_2$ as shown in FIG. 14.

According to the type of the road on which the vehicle is running, objects to be recognized can be changed to accomplish the purpose of the recognition. For example, when the vehicle is traveling on an expressway, other vehicles may be selected as an object to be recognized to ensure safe movement of the vehicle, and when the vehicle is traveling on another highway, road signs and traffic signals may be selected as objects to be recognized. The results of recognizing other foregoing vehicles can be used to give an alarm for preventing a collision, or to automatically control the brake. Furthermore, when directing the course of the vehicle to its destination by displaying the course information on the display unit 29 of the position detection processing unit 2, a course direction that would violate the traffic rules can be prevented by recognizing road signs. In addition, recognition of a traffic signal makes it possible to decide whether the road, on which the vehicle is running, is a common road or an expressway.

6-3. Recognition of Object

A method for recognizing an object from image data will be described. Many methods have been conventionally designed to recognize objects based on the image data. For example, with the data from a black and white camera (luminance data), contours of an object is extracted by detecting edge points, at which gray levels greatly change, and by joining the edge points. An object in an image is recognized by checking the form of the contour, or by performing pattern matching with reference patterns of objects which have been registered in advance. Use of color data can increase the probability of achieving recognition because chromaticity data can be available in addition to the gray level.

Features of respective objects to be extracted from image data will be shown below. Normal values of the following features are stored, for example, in the memory portion 17 of the image recognition processing unit 1. The image recognition processing portion 15 extracts the following features from the image data, and recognizes an object by matching the extracted features with reference features stored in the memory portion 17.

Figure 15A:
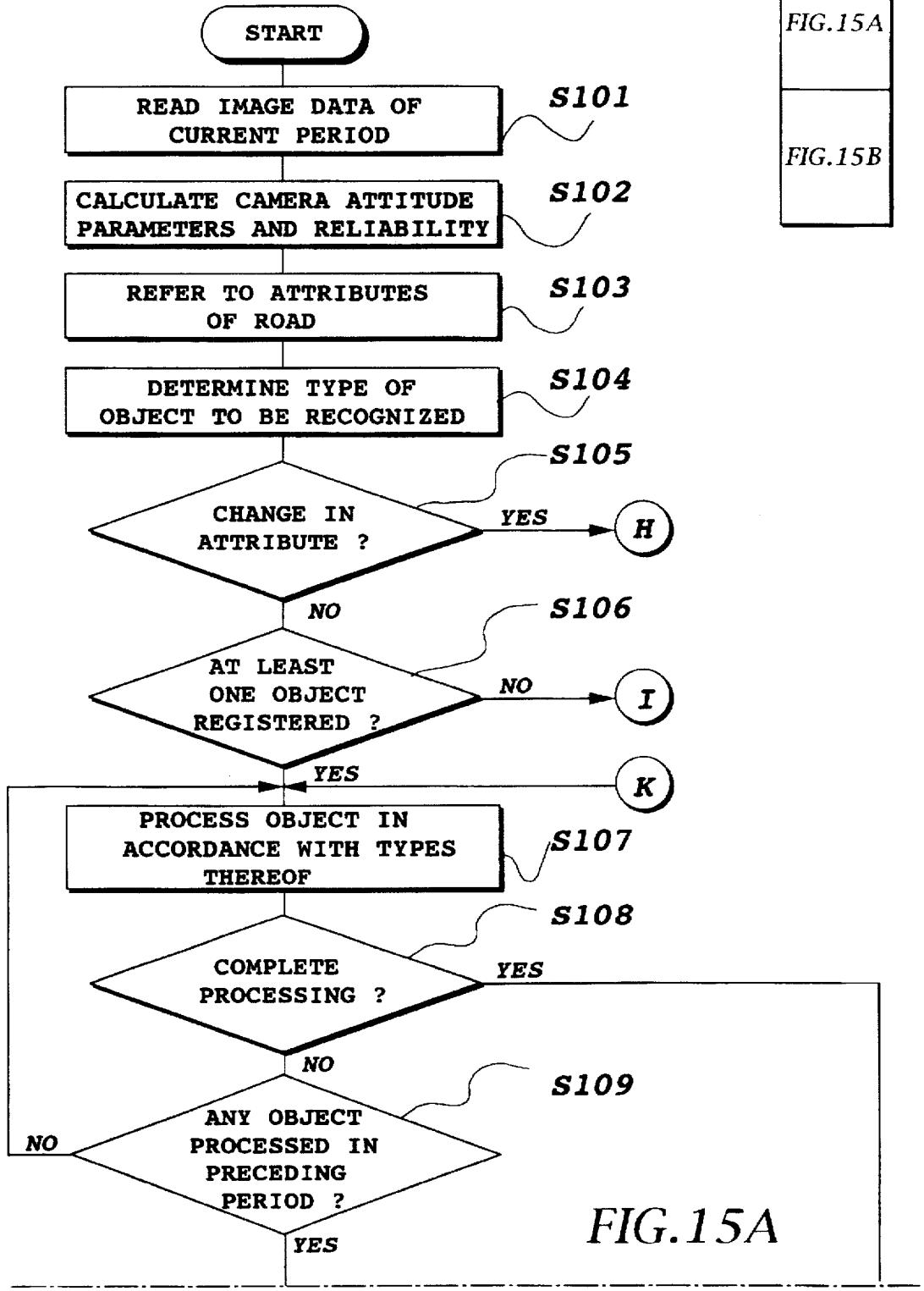
FIGS. 15A, 15B and 16 are flowcharts for explaining the object recognition processing.
Figure 15B:
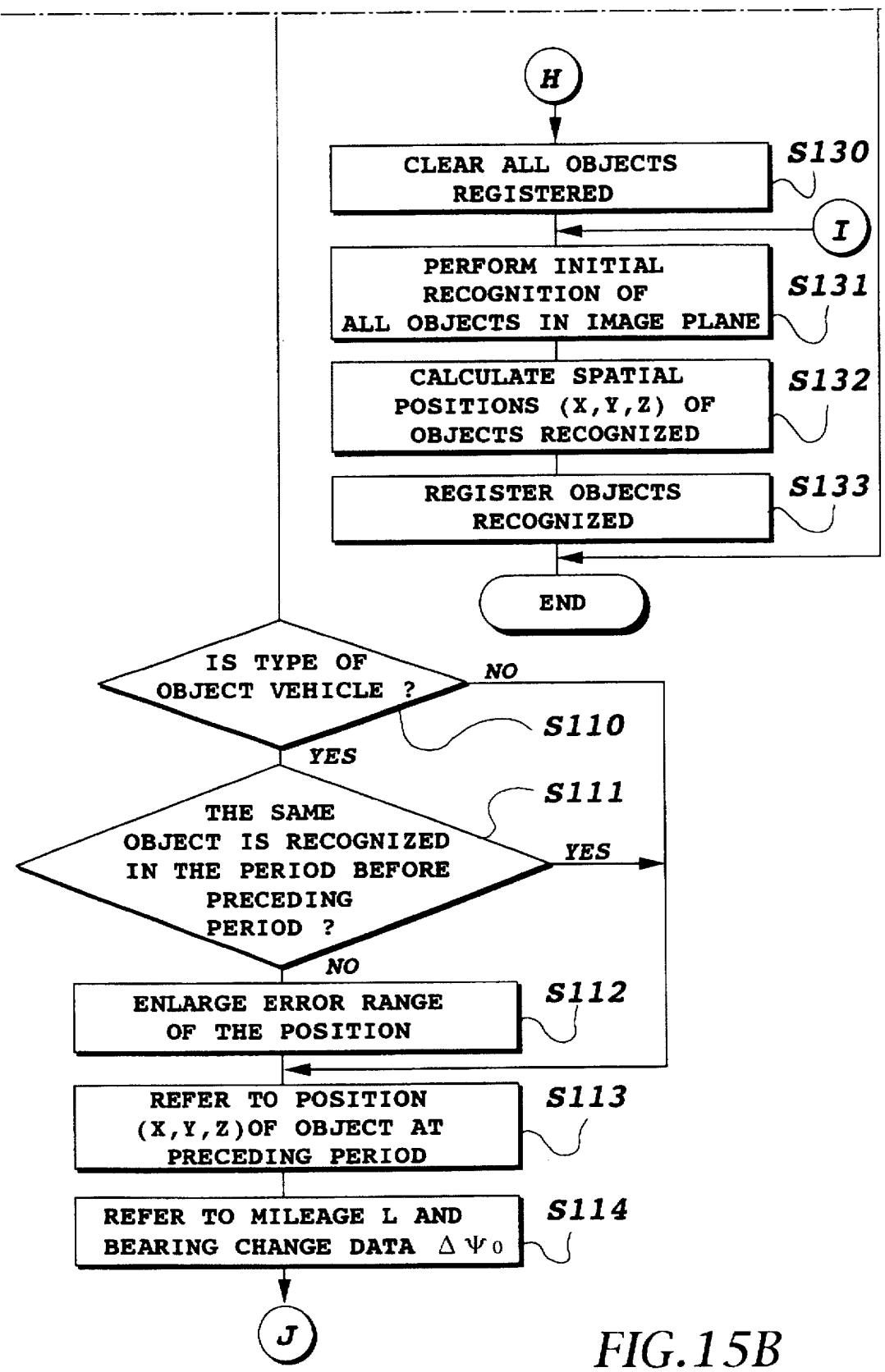

1. Road Signs
   (1) circle
   (2) radius of the circle
   (3) chromaticity of the circumference
   (4) data in the circle
2. Traffic Signals
   (1) rectangle
   (2) length and width of the rectangle
   (3) three circles
   (4) radius of the circles
   (5) color of lights
3. Motor Vehicles
   (1) shapes of front and rear portions
   (2) shape of side portions
   (3) height, width and length of the vehicle 6-4. Processing of Image Recognition Processing Portion Next, object recognition processing executed by the image recognition processing portion 15 will be described with reference to the flowchart shown in FIGS. 15A, 15B and 16. This processing is carried out at a fixed interval.

First, at step S101, an image acquired by the on-vehicle camera is written into the memory portion 17. At step S102, the reliability of the camera attitude parameters is calculated. The reliability is calculated on the basis of the circumstances, in which the attitude parameters have been obtained. For example, when the attitude parameters of the present period cannot be calculated, and hence, the mean values of the attitude parameters of previous periods are substituted for the attitude parameters of the present period, the reliability is reduced. If the acceleration (or deceleration)

of the vehicle is equal to or greater than a predetermined value (0.1 g, for example), the reliability of the attitude parameters is reduced. The acceleration can be obtained from the current position data, the mileage data, the brake data, or the g-sensor data. When the operation of the brake is detected based on the brake data, the reliability is also reduced.

When the reliability of the attitude parameters is calculated, the attributes (an expressway, a common road, or the like) of the road, on which the vehicle is traveling, is referred to at step S103. The attributes of the road are included in the road map data. According to the attributes of the road, kinds of objects to be recognized are determined at step S104. That is, when the vehicle is running on an expressway, other foregoing vehicles are selected as objects to be recognized, whereas when the vehicle is traveling on a common road, traffic signals or road signs are selected as objects to be recognized.

Subsequently, at step S105, it is tested whether the attributes of the road are changed from those of the preceding period. When the attributes of the road are identical to those of the preceding period, it is tested whether one or more objects are stored in the memory portion 17. If the attributes of the road differ from those of the preceding period, all the objects registered in the memory portion 17 are cleared at step S130.

If it is decided that no object is registered in the memory portion 17 at step S106, or all the objects registered in the memory portion 17 are cleared at step S130, the processing proceeds to step S131, where the initial recognition, whose recognizing area is the entire image plane, is carried out. Then, the positions (X, Y, Z) of recognized objects are calculated at step S132. The objects, and their positions (X, Y, Z) are registered in the memory portion 17 at step S133, thereby completing the processing of the current period.

At step S107, the processing is performed in accordance with the kinds of the objects to be recognized. More specifically, the memory portion 17 stores the objects to be recognized in accordance with the kinds of the objects, and information associated with the individual kinds is referred to. If an unprocessed kind is found in the kinds of the objects at step S108, it is tested at step S109 whether any objects of the unprocessed kind are recognized in the preceding period. If the answer is negative the processing returns to step S107. If the answer is positive, the kind of the object is tested whether it is a motor vehicle at step S110. If the answer is positive, the object (motor vehicle) is tested whether it is recognized in the period before preceding period at step S111. If the answer is negative, the error range is set at a sufficiently large fixed value at step S112 when determining a portion separated from the image. This is because accurate estimation of the position of the moving object on the image plane at the present period requires the positions of the moving object at the preceding period and at the period before preceding period. Therefore, when the moving object is not recognized at the period before preceding period, a portion which would surely include the moving object can be separated by setting a sufficiently large error range.

At step S113, the position (X, Y, Z) of the object at the preceding period is referred to. At step S114, the mileage L between the preceding period and the present period, and the bearing changing data $\Delta\psi_0$ are obtained based on the support information provided from the position detection processing unit 2.

Figure 16:
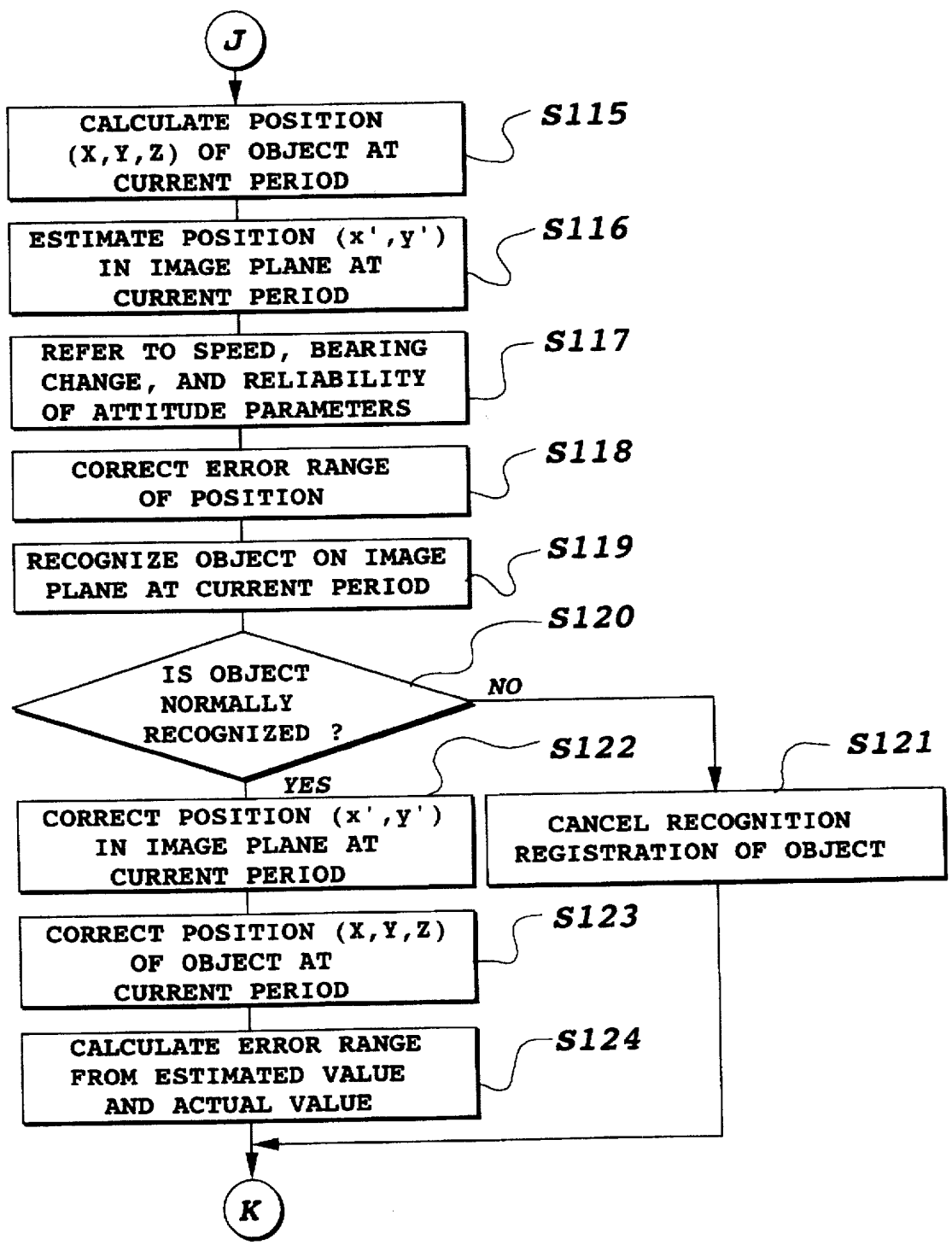

Next, the processing moves to step S115 of FIG. 16, at which the position (X, Y, Z) of the object at the present period is calculated in accordance with equation (55). On the basis of the result, the position (x', y') of the object on the image plane at the present period is estimated in accordance with equations (56) and (57) at step S116.

At step S117, the speed, the change in the: traveling direction, and the reliability of the attitude parameters of the vehicle are referred to, and the size of the error range of the estimated position is corrected based on these data at step S118. In other words, the constant k for defining the error range is updated.

At step S119, the portion defined on the basis of the error range is separated from the image of the present period, and the object recognition processing is performed in the portion (image cut-off portion). If the object is not correctly recognized at step S120, the registration of the object is eliminated at step S121, and the processing returns to step S107 of FIG. 15A. On the other hand, if the object is correctly recognized, the accurate position (x', y') of the object on the image plane is obtained at step S122, and on the basis of the result, the accurate position (X, Y, Z) of the object in the space is obtained in accordance with equation (54) at step S123. After that, at step S124, the error range is determined from the estimated values and actual values obtained until that time, and the processing returns to step S107 of FIG. 15A.

Thus, the position of an object in an image plane at the present processing period is estimated on recognition results of the previous processing periods, and an image cut-off portion to be separated from the image plane is defined by the estimated position and an error range. The object recognition processing is performed only within the image cut-off portion. In other words, it is unnecessary to perform the object recognition processing on the entire image plane. Thus, an effective, quick object recognition processing becomes possible. This is highly beneficial for successively recognizing an object changing in the image plane of the on-vehicle camera 11.

According to the first embodiment of the on-vehicle image recognition processing system, since road parallel lines other than a white line can be recognized in the line detection processing, the calculation of a road vanishing point can be positively achieved based on those road parallel lines. Furthermore, the camera attitude parameters can be obtained from the calculated road vanishing point. This makes it possible to correctly recognizing objects successively moving in the image plane. In these processings, the support information from the position detection processing unit 2 and/or the anti-lock brake unit 3 are used as needed.

With the arrangement of the first embodiment, since objects ahead of the vehicle can be recognized correctly, it becomes possible to carry out automatic drive of a vehicle by using the recognition results, and to prepare support information for directing a course by the position detection processing unit 2.

Although the recognition of objects ahead of the vehicle is chiefly described in the first embodiment, the recognition of objects behind the vehicle are also possible by providing an on-vehicle camera acquiring images behind the vehicle.

Moreover, although the image recognition processing unit 1, the position detection processing unit 2, and the anti-lock brake unit 3 are separately arranged in the first embodiment, they may be combined into one or two units.

EMBODIMENT 2

In the first embodiment, the road vanishing point and road parallel lines are obtained by repeating the Hough transform twice. The Hough transform, however, takes a long processing time, and hence, it is unpractical to carry out the Hough transform at each processing period during traveling.

Accordingly, in the second embodiment, a method for obtaining the road vanishing point and road parallel lines simply and rapidly at the cost of accuracy to some extent is used after the second time.

Figure 17:
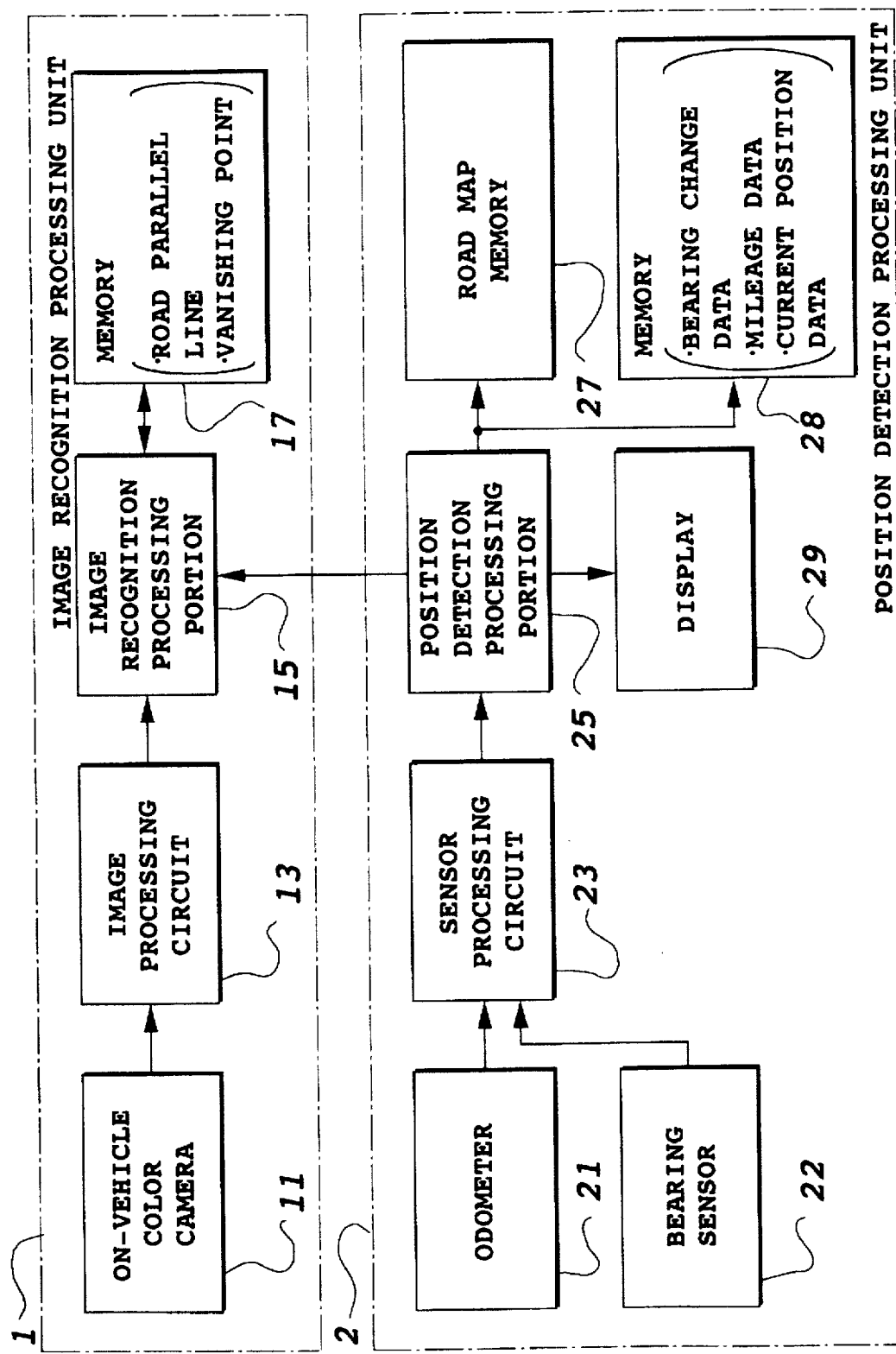
FIG. 17 is a block diagram showing an example of an image recognition processing system in accordance with the present invention.

The second embodiment employs an image recognition processing system as shown in FIG. 17, which corresponds to the system of FIG. 1 without the anti-lock brake unit 3.

Figure 18A:
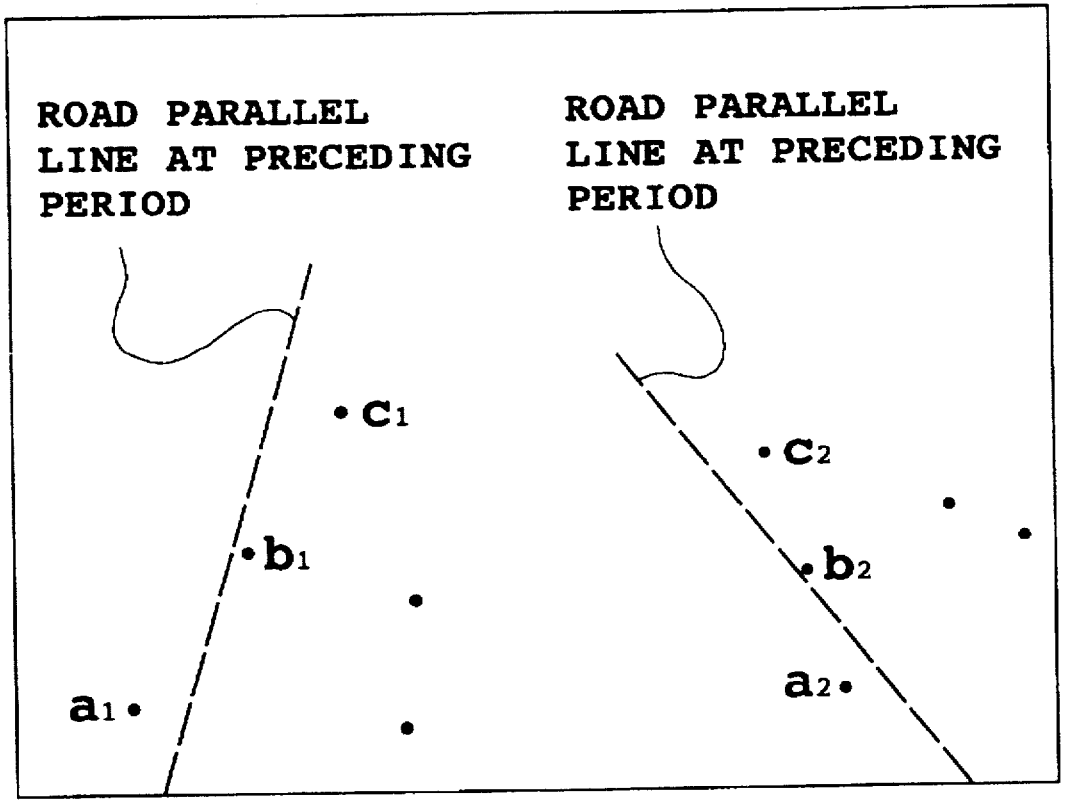
FIGS. 18A and 18B are diagrams for explaining a simplified calculation method of a road vanishing point.
Figure 18B:
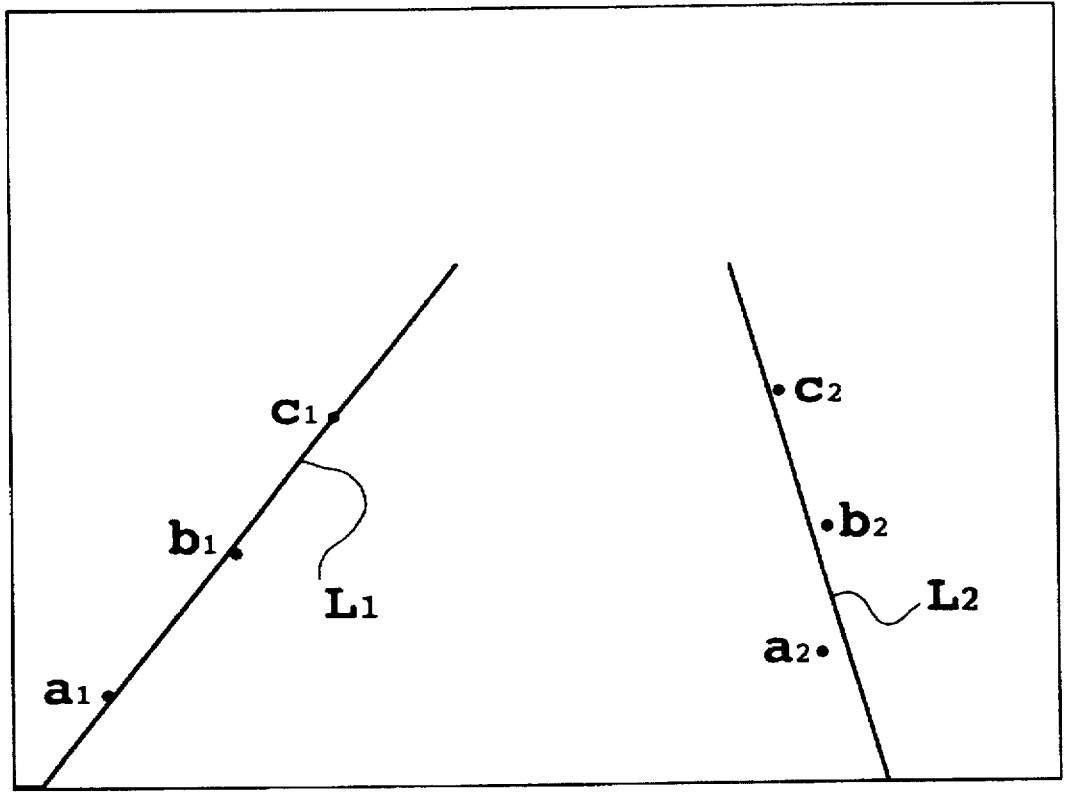
Figure 19:
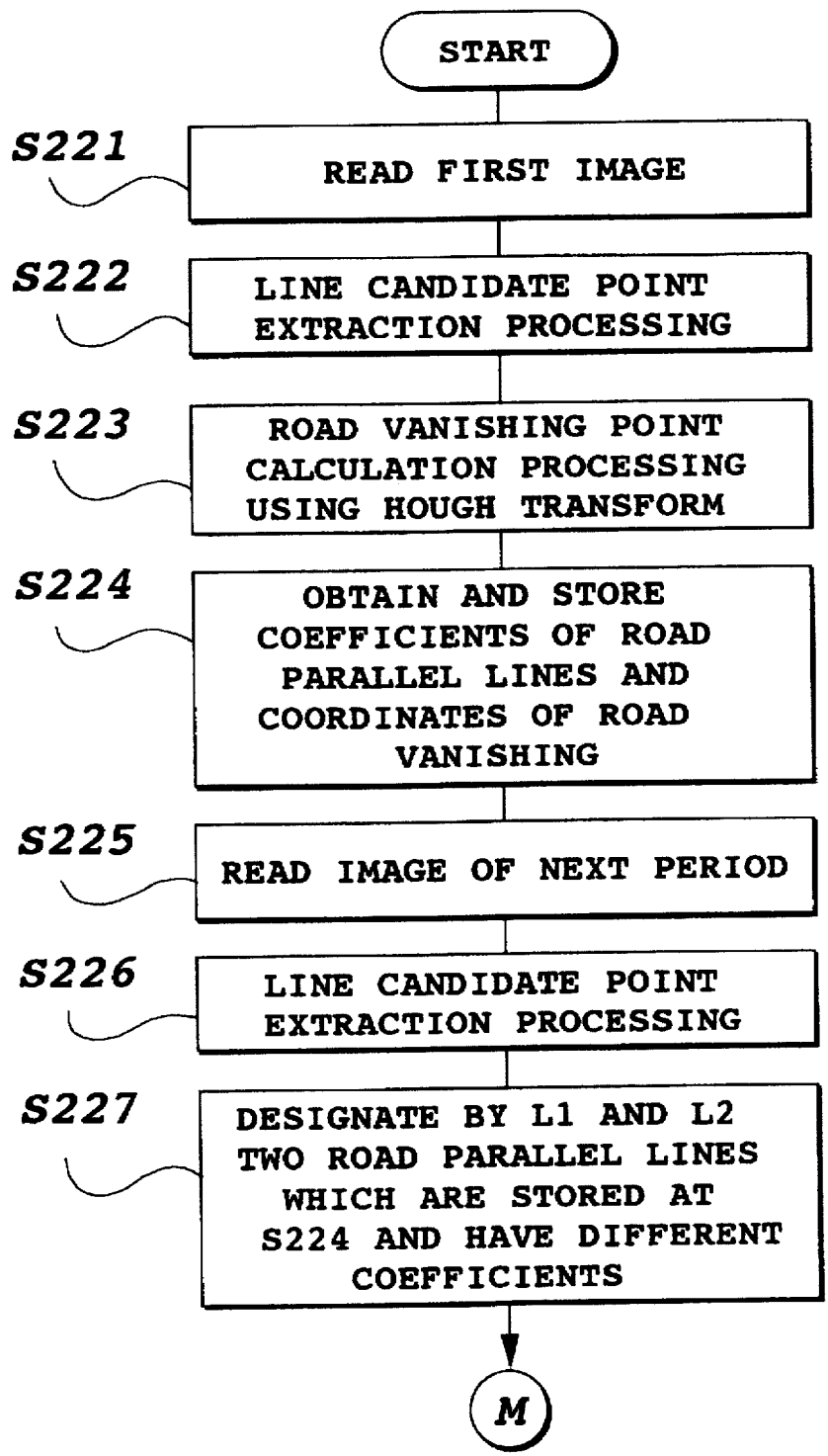
FIGS. 19–22 are flowcharts for explaining the simplified calculation method of a road vanishing point.
Figure 20:
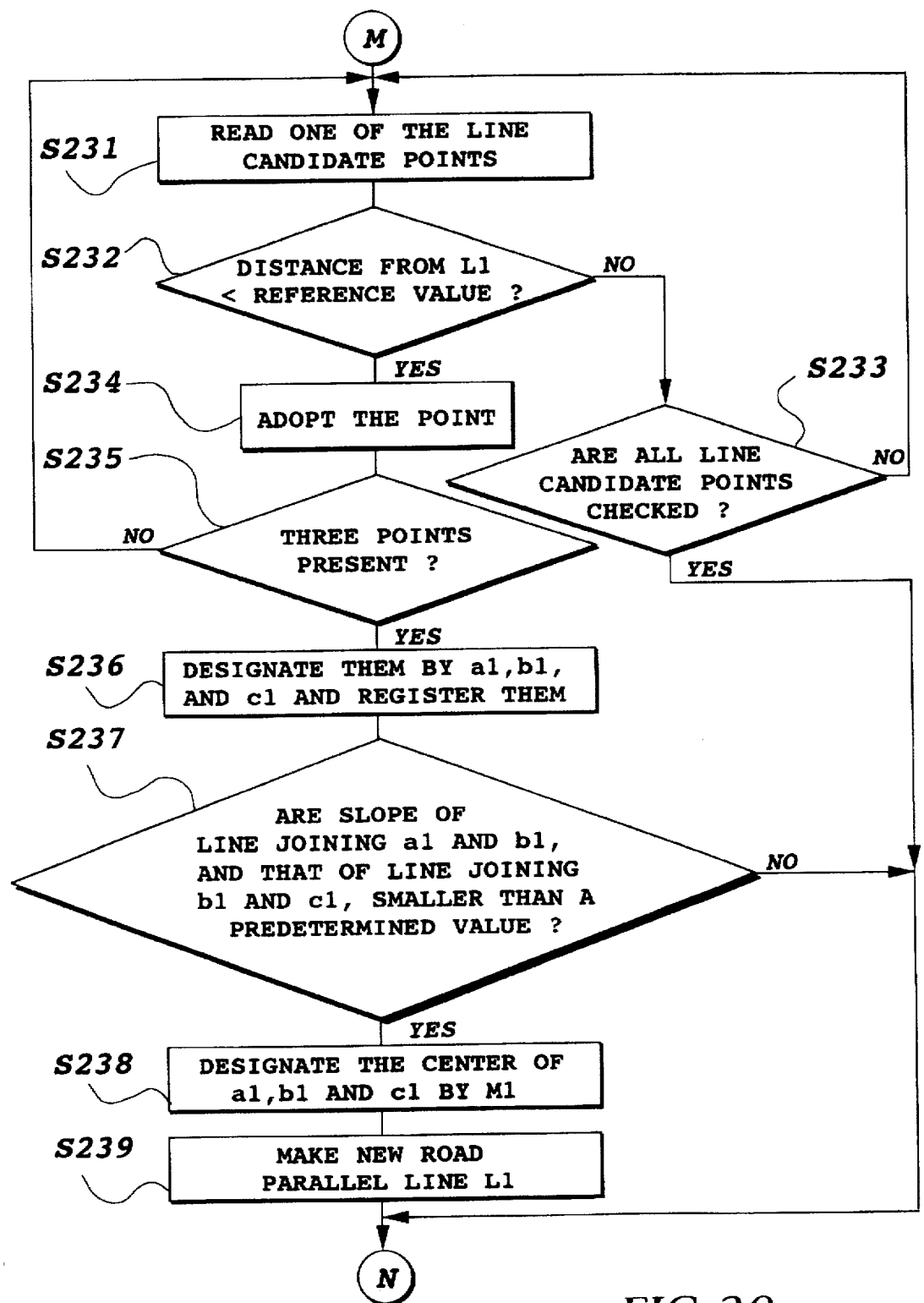
Figure 21:
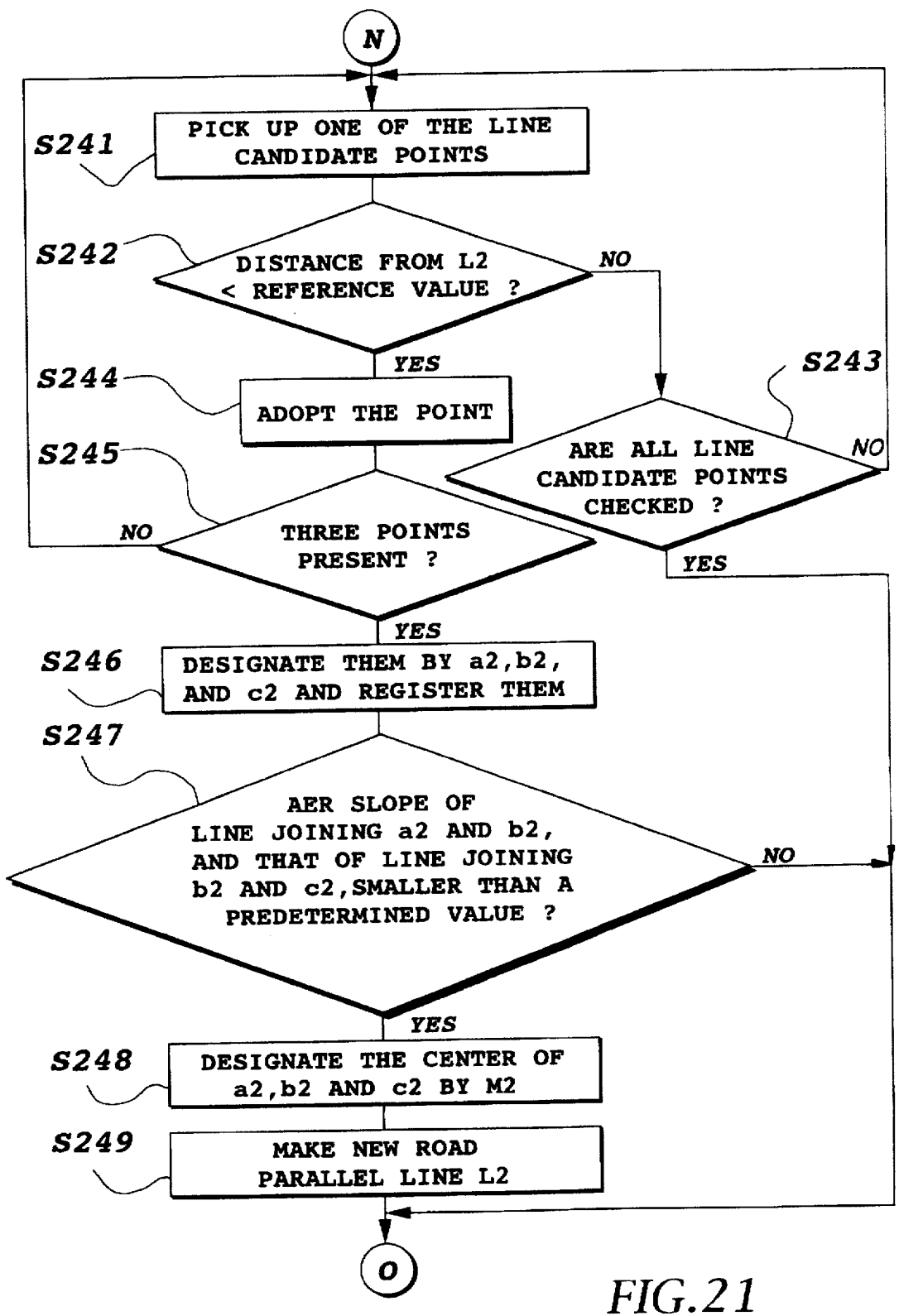
Figure 22:
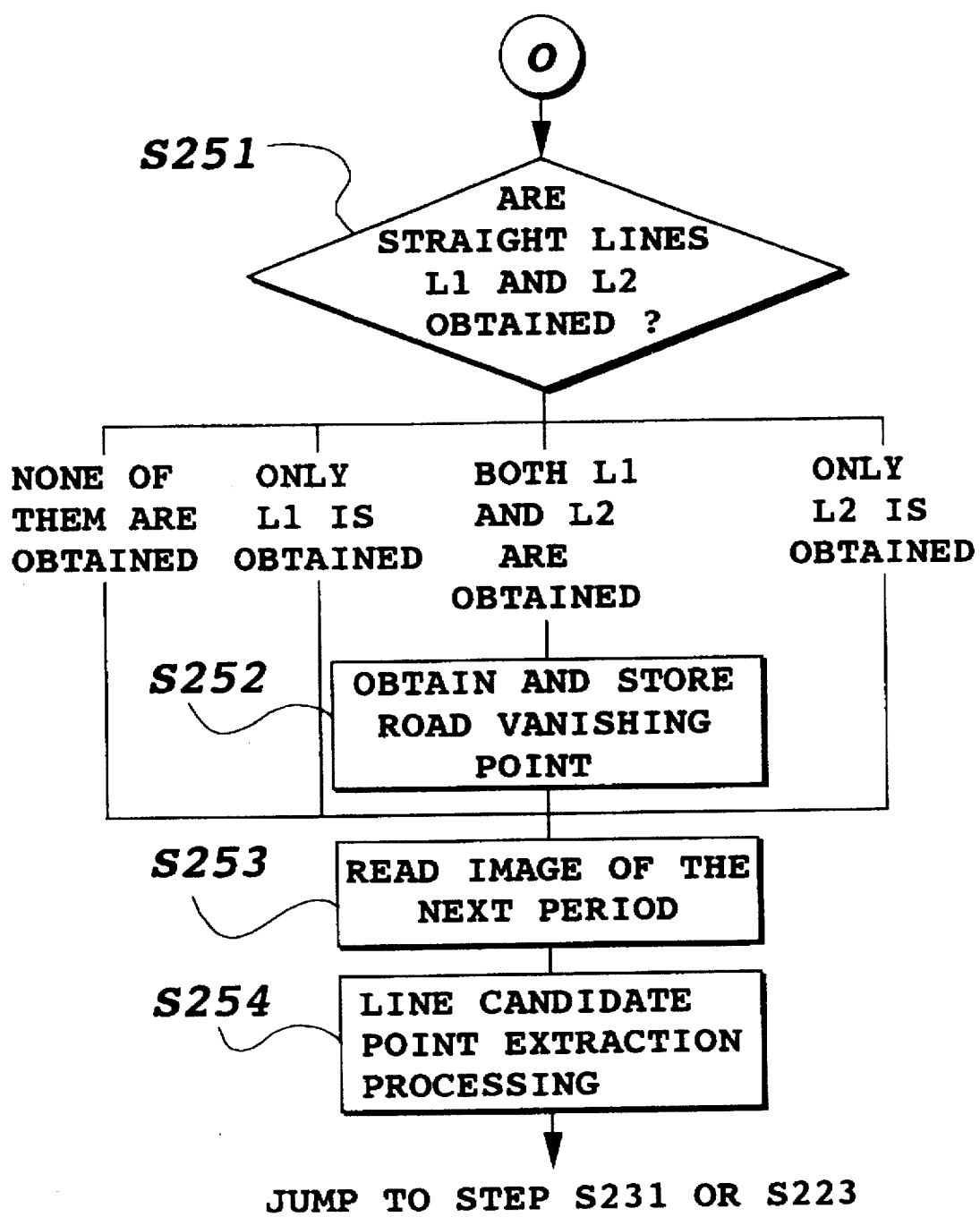

FIGS. 18A and 18B are diagrams for explaining the principle of the simplified road vanishing point calculation method. The method extracts line candidate points from an image acquired by the on-vehicle color camera 11, imaginarily assigns road parallel lines obtained at the preceding period as shown in FIG. 18A, and specifies several line candidate points near the road parallel lines. New road parallel lines $L_1$ and $L_2$ passing close to the specified points $a_1, b_1, c_1, a_2, b_2,$ and $c_2$ are calculated as shown in FIG. 18B. The two lines $L_1$ and $L_2$ are adopted as the road parallel lines of the present period, and their intersection is obtained as the road vanishing point.

FIGS. 19–22 are a flowchart explaining the simplified road vanishing point calculation method executed by the image recognition processing portion 15 shown in FIG. 17.

First, the data of a first color image acquired by the on-vehicle color camera is read at step S221, and line candidate points are extracted at step S222 as described with reference to FIG. 5. Subsequently, the Hough transform is performed twice on the line candidate points at step S223. Then, road parallel lines and the coefficients thereof (slopes and intercepts), and the coordinates of the road vanishing point are obtained and stored at step S224.

When the slope of a road parallel line is positive, the road parallel line is considered to be a left-hand side road of the vehicle, and when it is negative, the road parallel line is considered to be right-hand side road of the vehicle (see, FIG. 7A).

At step S225, the next image is read. The image read here need not be the whole image in the field of the on-vehicle camera 11, but may be, for example, the lower half of the image for saving processing time. This is because it is highly probable that the upper half of the image will include no line candidate point. The line candidate points are extracted from the read image at step S226. At step S227, two road parallel lines of opposite signs are selected from the road parallel lines stored in the first period (step S224), and referred to as $L_1$ and $L_2$. It will be reasonable to assume that two road parallel lines of opposite signs can be selected because it is highly probable that several road parallel lines have been extracted owing to the Hough transform.

Next, the simplified road vanishing point calculation method is executed.

First, one of the line candidate points which have been extracted at step S226 is selected at step S231. Then, the distance between the selected point and the road parallel line L1 is obtained, and the distance is tested at step S232 whether it is within a reference value. If it is beyond the reference value, the processing returns to step S231 via step S233, and a similar processing is continued for another line candidate point. If the distance is within the reference value, the line candidate point is selected at step S234. When three points have been selected (step S235), the three points are registered as $a_1, b_1,$ and $c_1$ at step S236.

If three points within the reference value are not obtained, a decision is made that the road parallel line $L_1$ is lost because the image of the present period greatly changes from that of the preceding period. Therefore, the simplified road vanishing point calculation method is not applied to the road parallel line $L_1$, but applied to the other road parallel line $L_2$ after step S241.

After registering the three points, the processing proceeds to step S237, at which the slope of the line segment connecting two points al and $b_1$, and the slope of the line segment connecting two points $b_1$ and $c_1$ are obtained, and the difference of the two slopes are tested whether it is within a predetermined range. If the answer is positive, the center $M_1$ of the triangle $a_1, b_1$ and $c_1$ is obtained at step S238. Then, the line, which passes through the center $M_1$, and whose slope is equal to the mean value of the abovementioned two slopes, is obtained and stored as a new road parallel line $L_1$ at step S239.

Next, a similar processing is repeated with the road parallel line $L_2$ after step S241. More specifically, line candidate points near the road parallel line $L_2$ are searched for, and if three points are obtained at step S245, they are registered as $a_2, b_2,$ and $c_2$ at step S246. Then, the line, which passes through the center M2 of the three points and has a slope equal to the mean value of the slopes of two line segments connecting $a_2$ and $b_2$, and $b_2$ and $c_2$, is stored as a new road parallel line $L_2$ at step S249.

Subsequently, it is tested whether the new road parallel lines $L_1$ and $L_2$ have been obtained at step S251. In this case, the following four cases are expected.

(1) Both the road parallel lines $L_1$ and $L_2$ are obtained.

(2) Only the road parallel line $L_1$ is obtained.

(3) Only the road parallel line $L_2$ is obtained.

(4) Neither the road parallel line $L_1$ nor $L_2$ is obtained.

In the case (1), where both the road parallel lines $L_1$ and $L_2$ are obtained, the intersection of the road parallel lines $L_1$ and $L_2$ is obtained, and stored as a new road vanishing point at step S252. The road parallel lines and the road vanishing point thus obtained are used in the attitude parameter calculation processing of the on-vehicle camera 11 described above.

Subsequently, the image of the next period is read at step S253, and line candidate points are extracted from the image at step S254. After that, the processings after step S231 are repeated on the basis of the newly obtained road parallel lines $L_1$ and $L_2$.

In the cases (2)–(4), since the road vanishing point cannot be obtained, the processing returns to step S223 via step S254, and the Hough transform is performed to try again to obtain road parallel lines $L_1$ and $L_2$. However, in the cases (2) and (3), since at least one road parallel line has been obtained, the calculation of the attitude parameters of the on-vehicle camera is performed on the basis of the road parallel line obtained and the information obtained at the preceding period. This will be described in a third embodiment below.

In summary, the second embodiment specifies several line candidate points (three points in the above-described processings) near each of the two road parallel lines on either side of the vehicle, which have been obtained at the previous period, obtains road parallel lines passing through the neighborhoods of the line candidate points as the new road parallel lines of the present period, and obtains the intersection of the new road parallel lines as the new road vanishing point of the present period. The same procedures are repeated to update the road parallel lines and the road vanishing point.

According to the second embodiment, the road vanishing point can be obtained by carrying out simple calculations considering the processing results of the preceding period, without repeating the Hough transform as described in the first embodiment. Therefore, the vanishing point can be updated quickly and positively at respective processing periods.

The calculation method of the road parallel lines in the simplified road vanishing point calculation processing is not restricted to that of steps S237–S239 and S247–249. The road parallel lines can be simply obtained by the least squares method which is formed into a program routine.

Furthermore, although three line candidate points are selected from the neighborhood of each road parallel line at steps S236 and S246, the number of points is not limited to three, but may be two or four. However, if the number of points are too small, accuracy of the road parallel line will be reduced, and if they are too large, a probability that road parallel lines cannot be obtained increases.

EMBODIMENT 3

FIGS. 23A–27 are flowcharts explaining the attitude parameter calculation processing of the on-vehicle camera executed by the image recognition portion 15 after completing the initial processing.

This processing is executed, for example, at every fixed mileage interval of the vehicle after the initial processing. The parameter that represents the number of execution will be referred to as a processing period t (t=1, 2, 3, ... ).

Figure 23B:
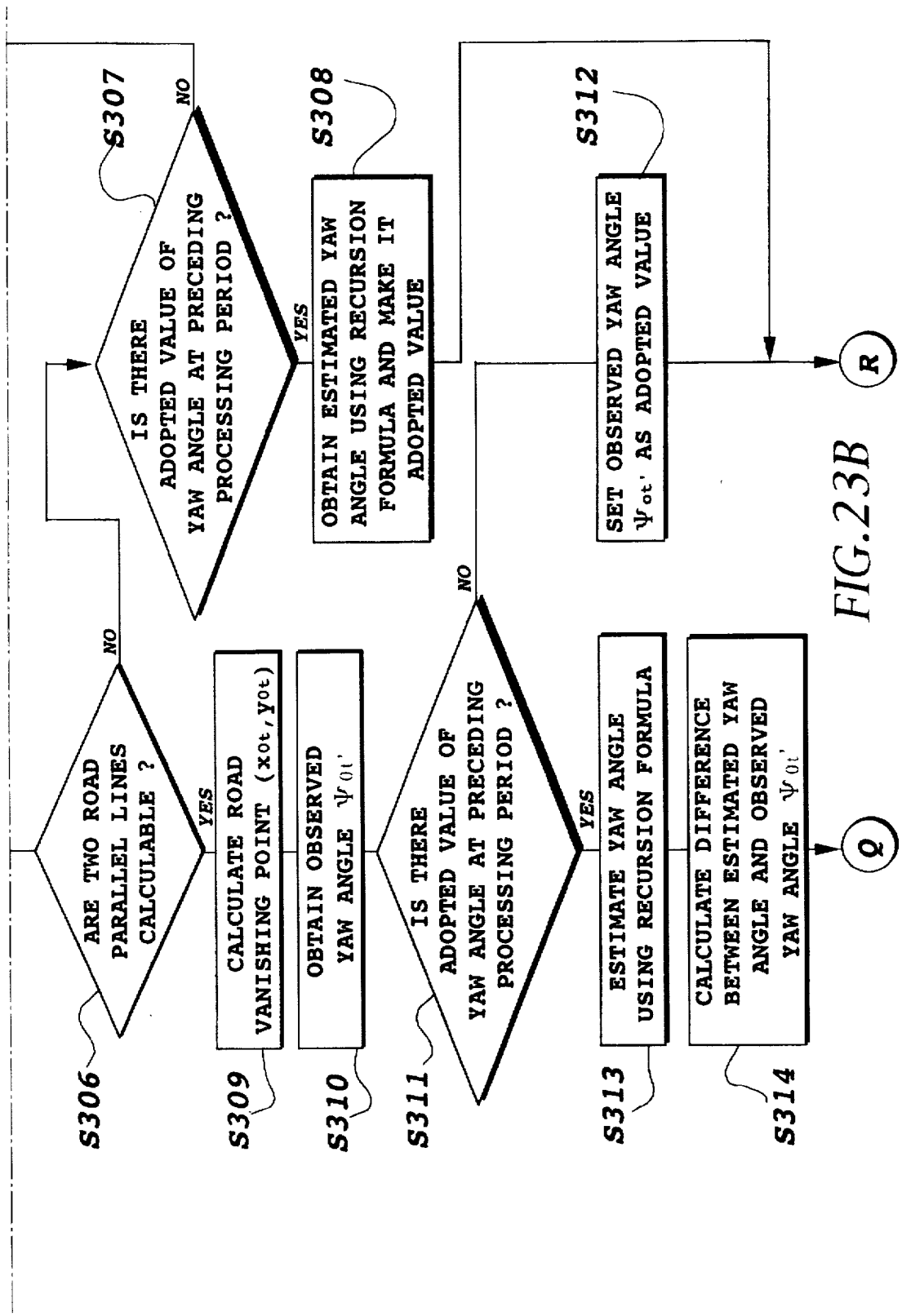

FIGS. 23A and 23B are flowcharts explaining the yaw angle calculation processing of the on-vehicle camera.

At step S301, after starting the system, the image data of an image acquired by the on-vehicle camera 11 is stored into the memory portion 17. At step S302, the support data are read from the position detection processing unit 2. As step S303, decision is made whether the vehicle is curving at a crossroads. This decision is made by testing whether the changing ratio of the bearing data of the vehicle read from the position detection processing unit 2 exceeds a predetermined value (for example, 0.1 degree per processing period). If the vehicle is curving, the processing jumps to step S322 without performing attitude parameter calculation. This is because the roll angle $\phi_0$ of the vehicle with respect to the road grows abnormally large owing to the centrifugal force in this case, and the calculation of the attitude parameter is inappropriate.

Other conditions may be considered for calculating the attitude parameters. For example, the calculation is allowed if the speed of the vehicle is within a predetermined range (within 100 km/h, for example), or if the acceleration and deceleration of the vehicle is less than a predetermined value (less than 0.1 g, for example). This is because the attitude parameters of the vehicle with respect to the road will greatly oscillate when the speed of the vehicle is not within the predetermined range, or the pitch angle $\theta_0$ of the vehicle with respect to the road grows abnormally large when the acceleration or the deceleration is greater than the predetermined value.

When the decision is made that the vehicle is not curving, the simplified calculation method of the road vanishing point described in the second embodiment is applied in order to obtain two road parallel lines, one at the right side and the other at the left side of the vehicle, at steps S304 and S305. If two road parallel lines are obtained, the coordinates $(x_{0t}, y_{0t})$ of the road vanishing point at the processing period t can be obtained as the intersection of the two lines at step S309.

Then, at step S310, the yaw angle $\psi$ of the on-vehicle camera with respect to the road is obtained using the foregoing equation (40). As described before, since the yaw angle $\psi_1$ of the on-vehicle camera with respect to the vehicle body has been obtained in the initial processing, the yaw angle $\psi_0$ of the vehicle with respect to the road can be obtained from the yaw angle $\psi$. The yaw angle $\psi_0$ is referred to as an observed value $\psi_{0t}'$ hereafter because it is the yaw angle observed in the image plane at the processing period t.

At step S311, a decision is made whether an adopted value $\psi_{0t-1}$ of the yaw angle at the preceding processing period has been obtained or not. Here, the "adopted value" means the following. It is preferable that the yaw angle $\psi_0$, which is accepted as one of the attitude parameters of the on-vehicle camera, include as little error as possible. However, the observed value, which is obtained from the image plane, may not be obtained if foregoing vehicles are present immediately ahead of the vehicle because of a traffic jam, or if the road parallel lines consist of a dot-dash line, and hence, the road parallel lines or the road vanishing point cannot be obtained. In view of this, an "estimated value" of the yaw angle $\psi_0$ is obtained using a recursion formula such as the following equation (61), which considers the history of the yaw angle $\psi_0$, and a more reliable one of the observed value and the estimated value, or the weighted average of the two values when they are fairly reliable, is adopted as the "adopted value".

At step S311, if the adopted value $\psi_{0t-1}$ of the yaw angle has not been obtained at the preceding processing period, the observed value $\psi_{0t}'$ is accepted as the adopted value $\psi_{0t}$ at step S312.

On the other hand, if the adopted value $\psi_{0t-1}$ of the yaw angle has been obtained at the preceding processing period, the adopted value $\psi_{0t}$ at the current processing period is obtained by using a recursion formula at step S313. This will be described below in more detail.

First, when the road is straight and hence the road bearing does not change (this decision can be made on the basis of the road map data, for example), the changing amount of the yaw angle of the vehicle with respect to the road from the processing period t−1 to t equals the changing amount $\Delta\psi_{0t}$ of the vehicle bearing from the processing period t−1 to t, which is obtained from the position detection processing unit 2. In other words, using the adopted value $\psi_{0t-1}$ at the preceding processing period t−1 makes it possible to obtain the estimated value $\psi_{0t}''$ of the current processing period t in accordance with the following recursion formula.

$$\psi_{0t}''=\psi_{0t-1}+\Delta\psi_{0t} \tag{61}$$

If the adopted value $\psi_{0t-1}$ at the preceding processing period t−1 has not been obtained, the adopted value $\psi_{0t-a}$ at the processing period t−a, at which the adopted value has been obtained, and the changing amount $\Delta\psi_{0t}$ of the vehicle bearing from the processing period t−a to t are used to obtain the estimated value $\psi_{0t}''$ at the current processing period in accordance with the following formula.

$$\psi_{0t}''=\psi_{0t-a}+\Delta\psi_{0t}(a=2, 3, 4, \ldots) \tag{62}$$

If the road bearing varies, the foregoing formulae do not hold. Thus, instead of these formulae, one of the following recursion formulae is used which are corrected using the difference between the adopted value and observed value obtained at the previous processing period.

$$\psi_{0t}''=\psi_{0t-1}+\Delta\psi_{0t}-(\psi_{0t-1}'-\psi_{0t-1}) \tag{63}$$

$$\psi_{0t}''=\psi_{0t-a}+\Delta\psi_{0t}-(\psi_{0t-a}''-\psi_{0t-a}) \tag{64}$$

These formulae mean that the estimated error of the previous processing period is corrected by considering the difference between the adopted value and the observed value at the previous processing period. This is because the estimated error of the previous processing period is due to the change in the road bearing.

Alternatively, one of the following formulae can be used instead, which take account of the changing amount $\Delta\psi_{Mt}$ of the road bearing obtained from the road map data stored in the road map memory 27.

$$\psi_{0t}" = \psi_{0t-1} + \Delta\psi_{0t} - \Delta\psi_{Mt} \tag{65}$$

$$\psi_{0t}' = \psi_{0t-a} + \Delta\psi_{0t} - \Delta\psi_{Mt} \tag{66}$$

where M of $\Delta\psi_{Mt}$ designates the road map data.

Figure 24:
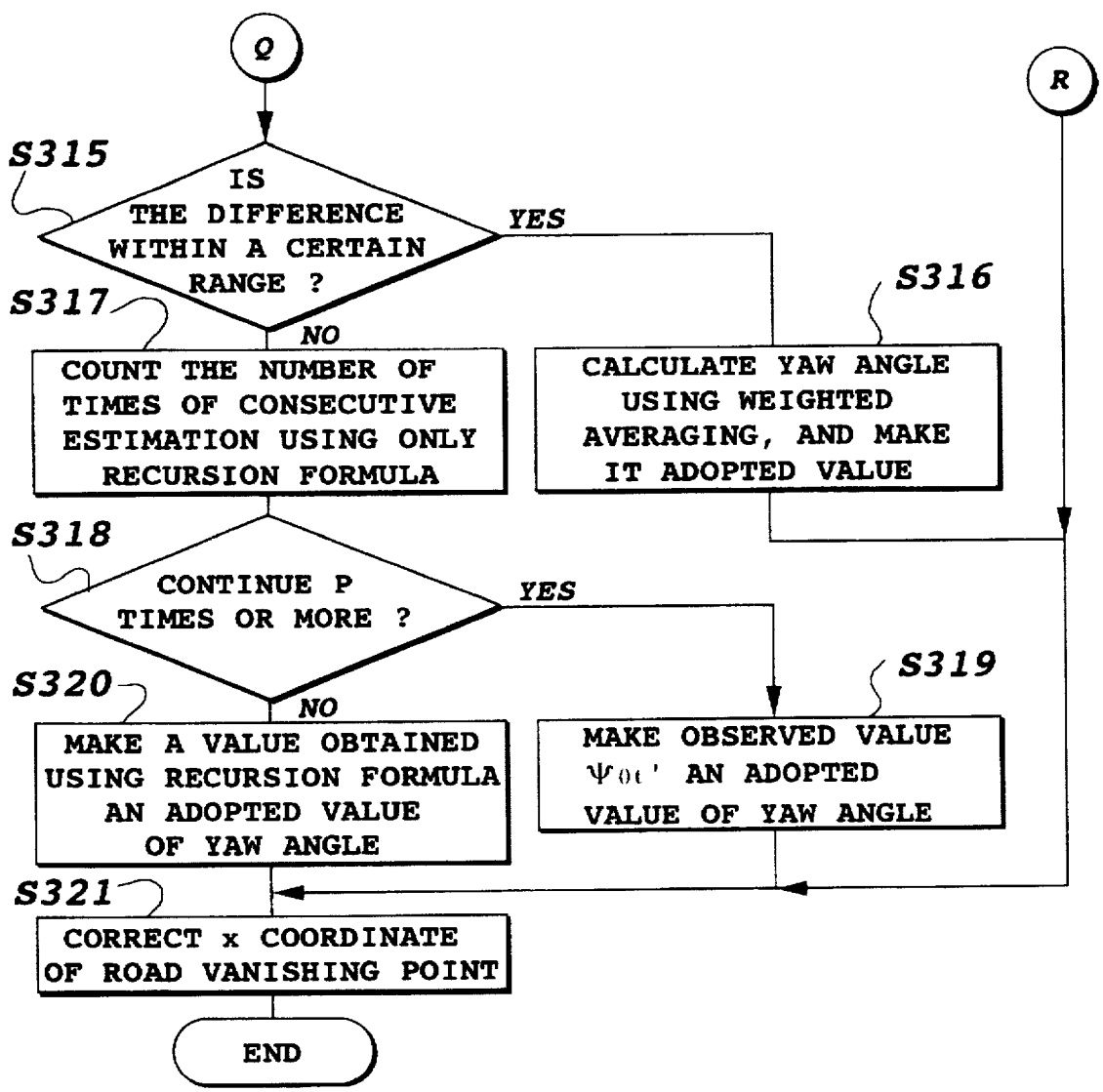

Then, the difference between the estimated value $\psi_{0t}"$ and the observed value $\psi_{0t}'$ is calculated at step S314, and a decision is made whether the difference is within a predetermined range or not at step S315 of FIG. 24. The predetermined range is selected at 0.3 degree per processing period, for example.

If the difference is within the predetermined range, both the estimated value $\psi_{0t}'$ and the observed value $\psi_{0t}'$ are considered to be reliable to some extent, and the weighted average of the two values is calculated as the adopted value $\psi_{0t}$ at the processing period at step S316.

$$\alpha\psi_{0t}' + (1-\alpha)\psi_{0t}" \rightarrow \psi_{0t} \tag{67}$$

where $\alpha$ is a constant determined by experience.

If the difference is not within the predetermined range, the consecutive number of decisions that the difference is not within the range is counted at step S317 by examining the previous decisions at step S315. If the consecutive number reaches a predetermined number P at step S318, the processing moves from step S318 to S319, at which the observed value $\psi_{0t}'$ is accepted as the adopted value $\psi_{0t}$ of the yaw angle at the processing period t. This is because when the consecutive number reaches the predetermined number P, it would be reasonable to judge that the adopted value deviates greatly from a true value owing to a cumulative error, and hence, is not reliable.

If the consecutive number is less than P, the processing proceeds to step S320, where the estimated value $\psi_{0t}"$ is accepted as the adopted value $\psi_{0t}$ at the processing period t considering that the adopted value $\psi_{0t-1}$ obtained at the preceding period t-1 is reliable.

In summary, at the first processing period t=1, the observed value $\psi_{0t}'$ is made the adopted value $\psi_{0t}$ of the yaw angle. At the succeeding processing periods, the difference between the observed value $\psi_{0t}'$ and the estimated value $\psi_{0t}"$ obtained by using the recursion formula is tested whether it is within the predetermined range. If the difference is within the predetermined range, the weighted average of the observed value $\psi_{0t}'$ and the estimated value $\psi_{0t}"$ is made the adopted value $\psi_{0t}$ of the yaw angle. On the other hand, if the difference is not within the predetermined range, and this state continues over the predetermined number P of processing periods, the observed value $\psi_{0t}'$ is made the adopted value $\psi_{0t}$ of the yaw angle. Furthermore, if the difference is not within the predetermined range, and this state does not continue over the predetermined number P of processing periods, the estimated value $\psi_{0t}"$ is made the adopted value $\psi_{0t}$ of the yaw angle.

At step S321, the x-coordinate of the road vanishing point $x_0$ is corrected by the following equation (68) using the adopted value $\psi_{0t}$ of the yaw angle obtained above.

$$x_0 = (\psi_{0t} + \psi_1)F \tag{68}$$

If two road parallel lines, one at the right side and the other at the left side of the vehicle, cannot be obtained in the foregoing simplified vanishing point calculation processing, the observed value $\psi_{0t}'$ of the yaw angle cannot be obtained. Thus, when two parallel lines cannot be obtained, a decision is made whether the adopted value $\psi_{0t-1}$ of the yaw angle at the preceding processing period t-1 is present at step S307, and if it is present, the adopted value $\psi_{0t}$ at the current processing period t is obtained by the following recursion formula at step S308.

$$\psi_{0t} = \psi_{0t-1} + \Delta\psi_{0t} \tag{69}$$

When the road bearing changes, equation (69) does not hold. Thus, one of the following recursion formulae (70) and (71), which are corrected by using the difference between the adopted value and the observed value obtained at the previous period is used as in the foregoing case.

$$\psi_{0t} = \psi_{0t-1} + \Delta\psi_{0t} - (\psi_{0t-1}' - \psi_{0t-1}) \tag{70}$$

$$\psi_{0t} = \psi_{0t-a} + \Delta\psi_{0t} - (\psi_{0t-a}' - \psi_{0t-a}) \tag{71}$$

If it is decided at step S307 that the adopted value $\psi_{0t-1}$ of the yaw angle has not been obtained at the preceding period t-1, the processing proceeds to step S322, at which the processing is terminated without carrying out the calculation of the adopted value $\psi_{0t}$ of the yaw angle.

Figure 25:
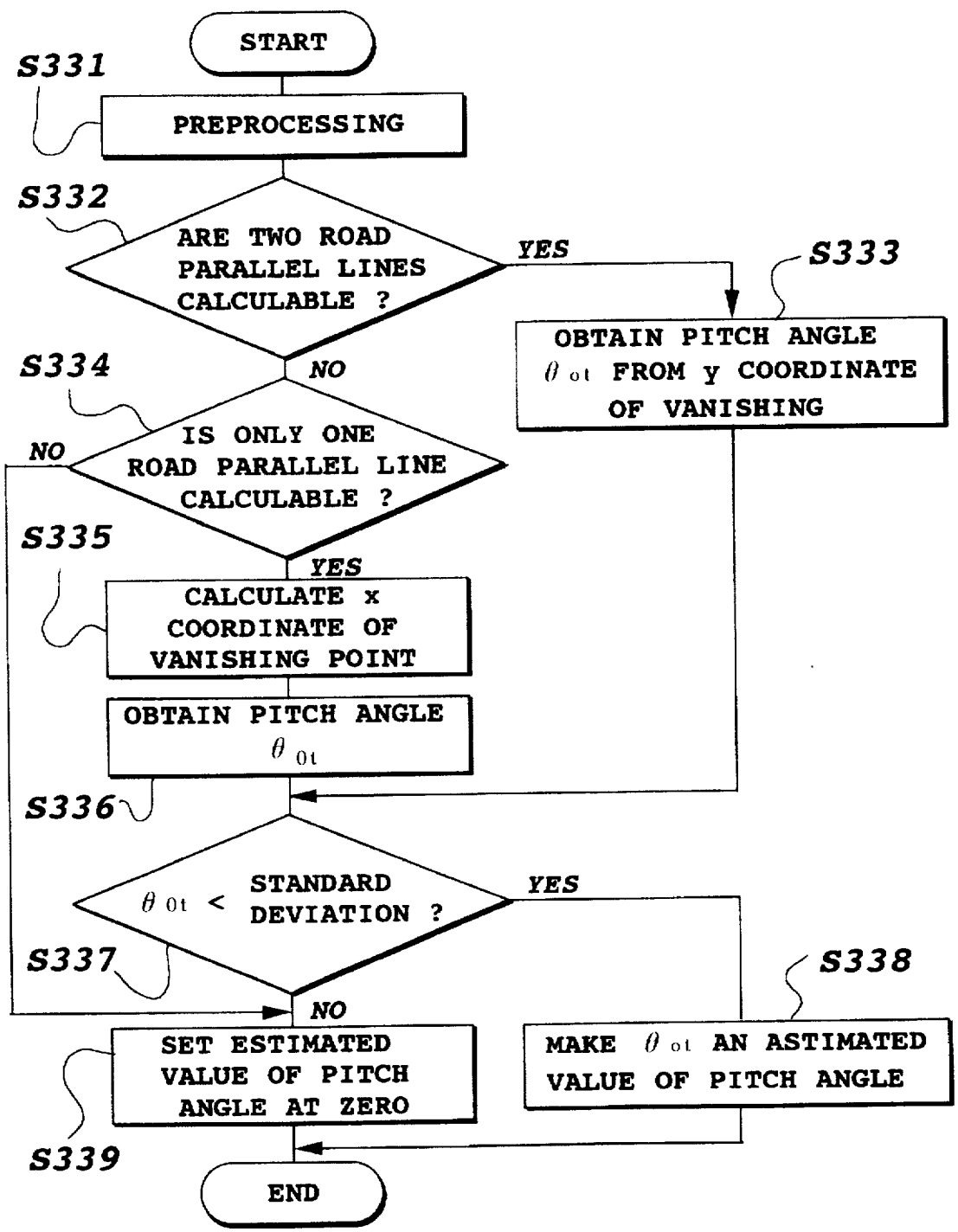
FIG. 25 is a flowchart for explaining a pitch angle calculation processing of the on-vehicle camera.

Next, the calculation processing of the pitch angle of the on-vehicle camera will be described with reference to the flowchart of FIG. 25.

This processing starts with a preprocessing at step S331, in which the system is started, a decision is made whether the vehicle is not curving, and line candidate points of right and left side road parallel lines are obtained by the simplified calculation processing of the vanishing point based on the image data of an image acquired by the on-vehicle camera when a decision is made that the vehicle is not curving. Subsequently, at step S332 a decision is made whether two road parallel lines at the right and left sides of the vehicle can be obtained by testing their slopes. When the two road parallel lines are obtained, the coordinates $(x_0, y_0)$ of the road vanishing point is obtained as the intersection of the two lines. Then, the pitch angle $\theta$ of the on-vehicle camera with respect to the road is obtained at step S333 using the following equation (72).

$$y_0 = -(\theta_0 + \theta_1)F = -\theta F \tag{72}$$

In this case, since the pitch angle $\theta_1$ of the on-vehicle camera with respect to the vehicle body has already been obtained in the above-mentioned initial processing, the pitch angle $\theta_0$ of the vehicle with respect to the road can be obtained from the pitch angle $\theta$. The pitch angle $\theta_0$ is designated by $\theta_{0t}$ hereafter, which means that it is the pitch angle observed in the acquired image plane at the processing period t.

If it is decided at step S334 that only one road parallel line is obtained, the coordinates $(x_0, y_0)$ of the road vanishing point cannot be obtained. In this case, the x-coordinate of the road vanishing point is calculated at step S335 by using the adopted value $\psi_{0t}$ of the yaw angle of the vehicle obtained by the processing of FIGS. 23A–27. Then, the y-coordinate of the road vanishing point is estimated from the obtained x-coordinate $x_0$ and the one road parallel line, and the pitch angle $\psi_{0t}$ is obtained at step S336.

More specifically, the pitch angle $\psi_{0t}$ is calculated as follows: First, a straight line which is parallel with the y-axis and passes through the x-coordinate $x_{0t}$ given by the following equation is obtained by using the adopted value $\psi_{0t}$ of the yaw angle of the vehicle obtained by the processing shown in FIGS. 23A–27.

$$x_{0r} = (\psi_{0r} + \psi_1)F \quad (73)$$

Then, the road vanishing point $(x_{0r}, y_{0r})$ is obtained as the intersection of this straight line and the road parallel line. Finally, the pitch angle $\theta_{0r}$ is obtained by substituting the y-coordinate $y_{0r}$ into the following equation.

$$y_{0r} = -(\theta_{0r} + \theta_1)F \quad (74)$$

At step S337, a decision is made whether the pitch angle $\theta_{0r}$ obtained at step S333 or S336 is within the standard deviation with respect to the mean value ($=0$) of the pitch angle $\theta_0$ which has been obtained in the initial processing.

If the answer is positive, the pitch angle $\theta_{0r}$ is determined as the adopted value of the pitch angle at step S338. If the answer is negative, the pitch angle $\theta_{0r}$ is considered to be unreliable, and the adopted value of the pitch angle is made zero at step S339. This is because the mean value of the pitch angle can normally be considered zero, because it is unthinkable that only acceleration or deceleration, which causes pitching movement of the vehicle, will appear continuously.

When the decision result at step S334 is negative, that is, no road parallel line is obtained, the adopted value of the pitch angle is made zero.

Figures 26, 26A:
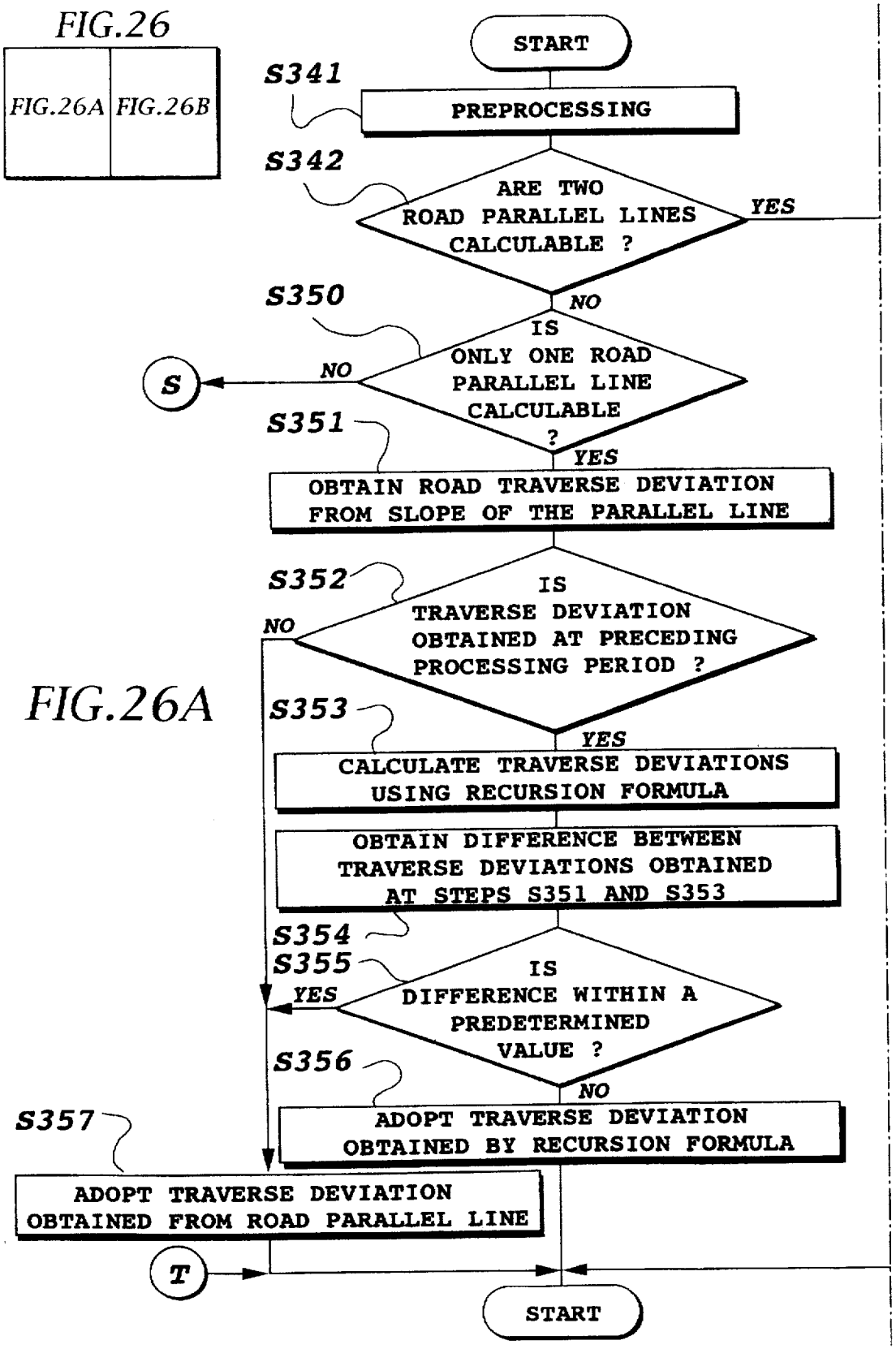
FIGS. 26A, 26B and 27 are flowcharts for explaining a traverse deviation distance calculation processing of the on-vehicle camera.
Figure 26B:
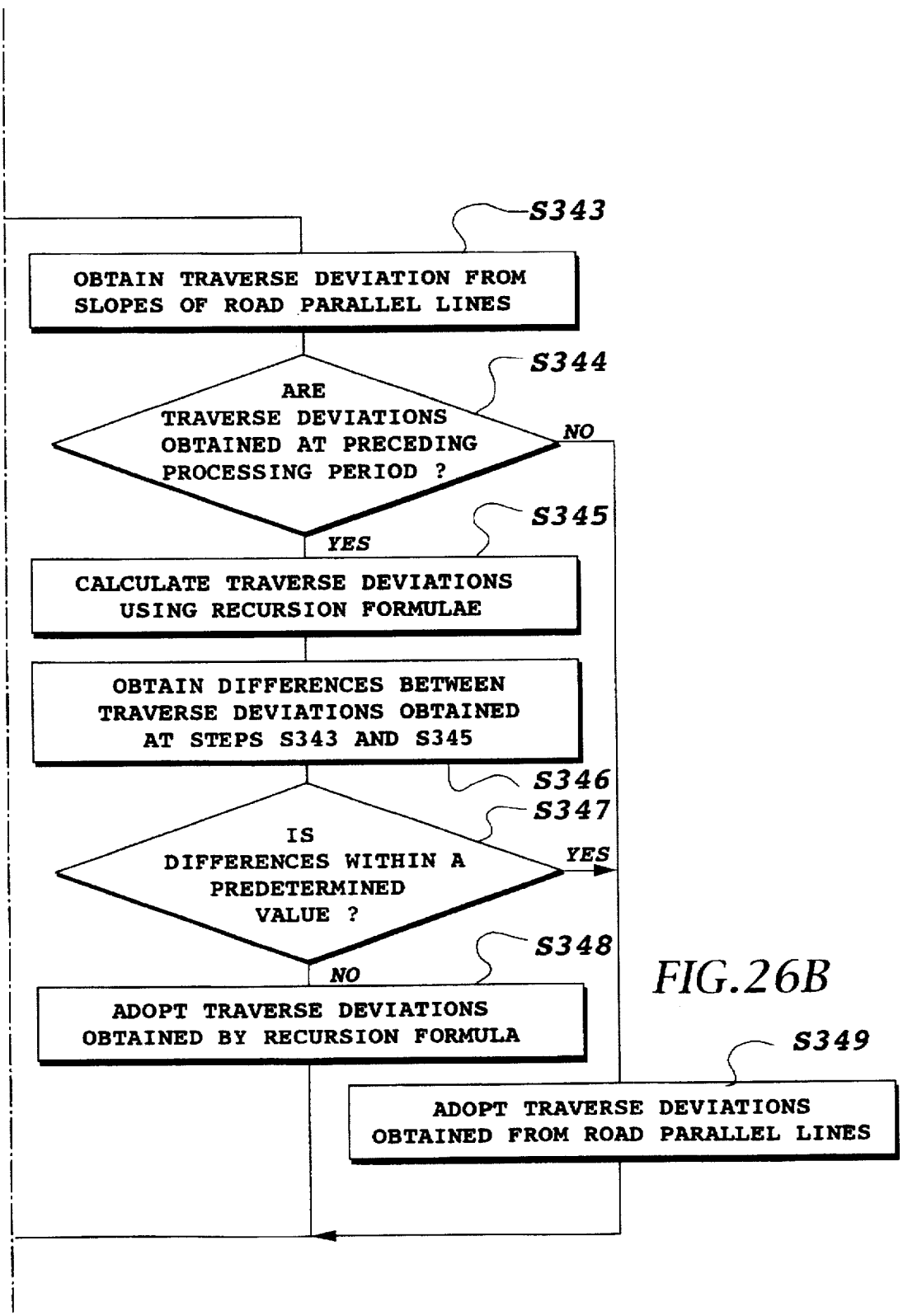

Next, the calculation processing of the traverse deviation distance of the on-vehicle camera 11 will be described. FIGS. 26A and 26B are flowcharts explaining the calculation processing of the traverse deviation distance of the on-vehicle camera 11.

This processing starts with a preprocessing at step S341, in which the system is started, a decision is made whether the vehicle is not curving, and line candidate points of the right and left side road parallel lines are obtained by the simplified calculation processing of the vanishing point based on the image data of an image acquired by the on-vehicle camera 11 when a decision is made that the vehicle is not curving. Subsequently, at step S342, a decision is made whether two road parallel lines, one at the right and the other at the left of the vehicle, can be obtained by testing their slopes. When the two road parallel lines are obtained, the traverse deviation distances A of the on-vehicle camera 11 from the two parallel lines which selected as reference lines parallel to the road can be obtained in accordance with the following equations, which correspond to foregoing equations (52) and (53), and use the slopes $a_{1r}$ and $a_{2r}$ of the road parallel lines and the roll angle $\phi_1$ of the on-vehicle camera with respect to the vehicle.

$$A_{1r} = -(a_{1r} + \phi_1)h/(1 - \phi_1 a_{1r}) \quad (75)$$

$$A_{2r} = -(a_{2r} + \phi_1)h/(1 - \phi_1 a_{2r}) \quad (76)$$

Here, the roll angle $\phi_0$ of the vehicle with respect to the road is neglected because the vehicle is traveling straight.

At step S344, a decision is made whether the traverse deviation distances $A_{r-1}$ of the two road parallel lines have been obtained at the preceding processing period. If they have been obtained, the traverse deviation distances $A_r$ of the current processing period are calculated at step S345 in accordance with the following recursion formulae using the traverse deviation distances $A_{r-1}$ of the preceding processing period.

$$A_{1r} = A_{1,r-1} + L\psi_{0r} \quad (77)$$

$$A_{2r} = A_{2,r-1} + L\psi_{0r} \quad (78)$$

where L is the mileage of the vehicle per processing period, which is determined on the basis of the support information from the position detection processing unit 2, and $\psi_{0r}$ is the adopted value of the yaw angle of the vehicle with respect to the road.

At step S346, the differences are obtained between the traverse deviation distances $A_{1r}$ and $A_{2r}$ which have been obtained at step S345 and those which have been obtained from the road parallel lines at step S343, and a decision is made at step S347 whether the differences are within a predetermined range. If they are within the predetermined range, the traverse deviation distances $A_{1r}$ and $A_{2r}$ obtained from the road parallel lines at step S343 are adopted at step S349, whereas if they are out of the predetermined range, the traverse deviation distances $A_{1r}$ and $A_{2r}$ obtained from the recursion formulae at step S345 are adopted at step S348.

If the number of road parallel lines calculated is only one (step S350), the traverse deviation distance At of the current processing period is calculated at step S351 in accordance with the following recursion formula using the slope $a_{1r}$ of the road parallel line and the roll angle $a_{1r}$ of the on-vehicle camera with respect to the vehicle.

$$A_{1r} = -(a_{1r} + \phi_1)h/(1 - \phi_1 a_{1r}) \quad (79)$$

Subsequently, a decision is made at step S352 whether the traverse deviation distance $A_{r-1}$ of the single road parallel line has been obtained at the preceding processing period. If it has been obtained, the traverse deviation distance $A_r$ of the current processing period is calculated at step S353 in accordance with the following recursion formula using the traverse deviation distance $A_{r-1}$ of the preceding processing period.

$$A_{1r} = A_{1,r-1} + L\psi_{0r} \quad (80)$$

At step S354, the difference is obtained between the traverse deviation distance $A_{1r}$ which has been obtained at step S353 and the traverse deviation distance $A_{1r}$ which has been obtained from the road parallel line at step S351, and a decision is made at step S355 whether the difference is within a predetermined range. If it is within the predetermined range, the traverse deviation distance $A_{1r}$ obtained from the road parallel line at step S351 is adopted at step S357, whereas if it is out of the predetermined range, the traverse deviation distance $A_{1r}$ obtained from the recursion formula at step S353 is adopted at step S356.

The traverse deviation distance A of the other road parallel line, on the other hand, cannot be obtained directly. In this case, though not shown in the flowchart, a decision is made whether the traverse deviation distance $A_{r-1}$ at the preceding processing period has been obtained, and if it has been obtained, the traverse deviation distance $A_r$ at the current processing period is obtained in accordance with the following recursion formula using the traverse deviation distance $A_{r-1}$ at the preceding processing period.

$$A_r = A_{r-1} + L\psi_{0r} \quad (81)$$

If the traverse deviation distance $A_{r-1}$ has not been obtained at the preceding period, calculation of the traverse deviation distance $A_r$ of the other road parallel line is resigned, thereby ending the processing.

Figure 27:
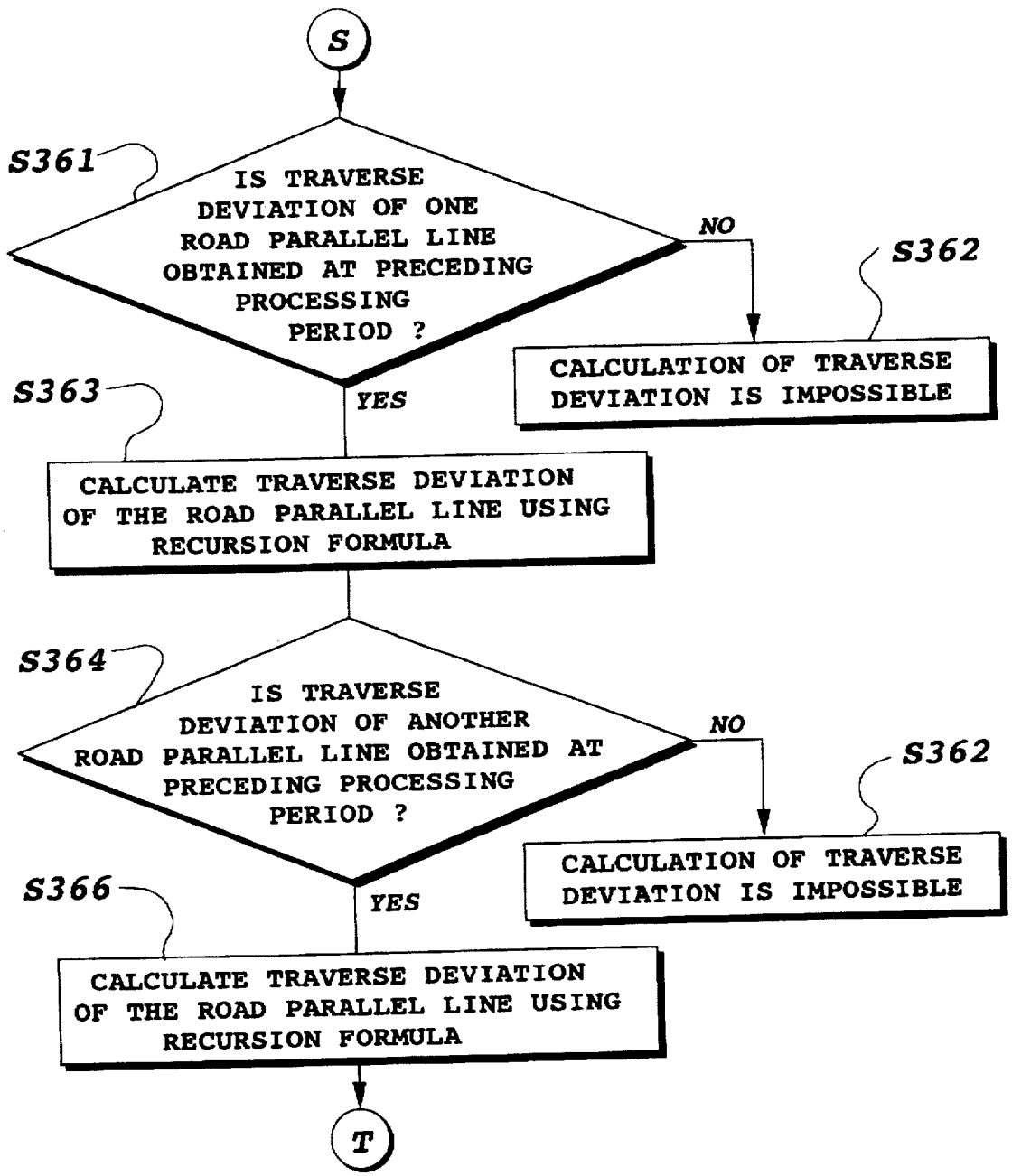

If no road parallel line is obtained at step S350, the processing proceeds to step S361 of FIG. 27, at which a decision is made whether the traverse deviation distance $A_{1,r-1}$ of one road parallel line has been obtained at the preceding processing period. If it has been obtained, the traverse deviation distance $A_{1,t}$ is calculated using the foregoing recursion formula at step S363, whereas if it has not been obtained, the calculation of the traverse deviation distance A1,t is resigned at step S362.

Likewise, a decision is made whether the traverse deviation distance $A_{2,r-1}$ of the other road parallel line has been obtained at the preceding processing period at step S364. If it has been obtained, the traverse deviation distance $A_{2,t}$ is calculated using the foregoing recursion formula at step S366, whereas if it has not been obtained, the calculation of the traverse deviation distance $A_{2,t-1}$ is resigned at step S365.

Thus, the attitude parameters θ, φ, and ψ, and the traverse deviation distance A of the on-vehicle camera 11 can be obtained.

6-3. tracking Recognition of an Object

Next, the processing of the recognition processing portion 15 for tracking recognition of an object will be described.

The recognition processing portion 15 includes an object registration table and a specified point registration table established in the memory portion 17. These table are used for the tracking recognition processing, and are shown in FIGS. 36A and 36B.

The object registration table shown in FIG. 36A is provided for registering one or more objects to be recognized in an image plane which is obtained by picking up a scene ahead of or behind the vehicle by the on-vehicle camera 11, and by converting the acquired scene into image data at respective processing periods. The objects are recognized on the basis of the converted image data. The object registration table has columns for object numbers, indication of the presence or absence of registration, pattern information, still/moving information indicating whether objects are at rest or moving, the number of specified points, and pointers to specified points.

The object numbers are sequential numbers 1, 2, 3, . . . attached to individual objects. Thus, each number is associated with each one of the objects.

The pattern information column includes a type column, a size column, and a color tone column. The type column indicates the types of objects such as passenger cars, buses, road signs, pedestrians, or the like, and the size column records sizes of objects such as width, length, height, or the like. The color tone column records the color tones of objects, such as three primary color data r, g and b of all the pixels in an object or representative pixels determined based on the geometric relation such as the center and contour of an object. Alternatively, the mean value of the color data r, g and b, or the value of equation (1) may be used as the color tone information. Thus, the patterns information represents characteristics of objects to be recognized, and these characteristics can be obtained by pattern recognition of the objects. The pattern recognition can be achieved by the template matching, which is carried out by preparing templates used as reference, by shrinking each of the templates to match an object in the image plane on the basis of the position information of specified points of the object or the like, by imaginary overlapping the template on the contour of the object in the image plane, and by quantitatively measuring the conformity of the template to the object, thereby determining the best matched one. Using color data will improve the recognition probability because chromaticity data can be available in addition to the grey level.

The still/moving information indicates the following three cases: an object is at rest, is moving, and is unknown which of the two.

The number of specified point column indicates the number of specified points set with respective objects.

Figure 28:
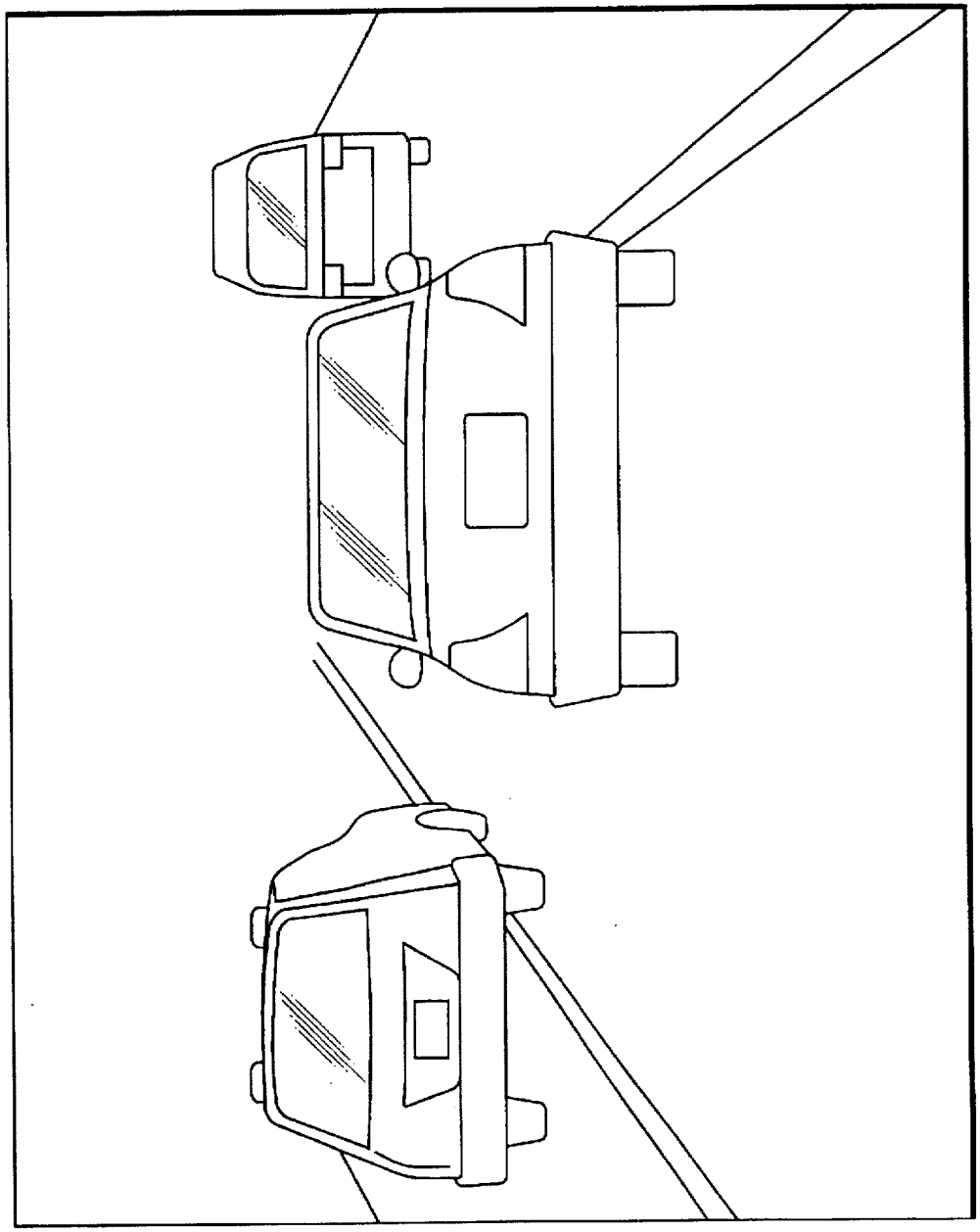
FIG. 28 illustrates a foregoing image acquired by the on-vehicle camera.

The specified points are selected as follows: First, a foregoing image as illustrated in FIG. 28 is obtained. Second, contours matching the size of the objects are extracted by processing the image as shown in FIG. 29. Finally, some points on the contour are set as the specified points. For example, vertices of the contours are selected as the specified points. As contours, interfaces between objects and the outside, and internal boundaries of objects such as those between glass and body of a vehicle can be selected. In addition, the contours of shadows of objects can also be selected as the contours. More specifically, the contours are extracted by detecting changing points of the color tones (such as the mean value of the RGB signals) for individual scan lines on the image as shown in FIG. 28, and by joining the changing points with each other. Then some vertices of the contours are set as the specified points.

The specified points are not restricted to the vertices of contours. They may be set at the center of the contour such as the center of a lamp or the number plate of a vehicle, the center of a road sign, or the like. When the object to be recognized is a foregoing vehicle, it is convenient to set the specified points at two corner vertices at the bottom of the contours of rear wheels as shown in FIG. 29 because the height of the specified points becomes a known value –h, where h is the height of the on-vehicle camera above the ground.

The pointer column to the specified points includes pointers to the specified point registration table.

The specified point registration table as shown in FIG. 36B stores details of specified points preset with objects to be recognized. Specifically, it includes blocks for storing for each specified point the presence or absence of the specified point, spatial position (X, Y, Z) of the specified point, change in the spatial position, and characteristics of an image near the specified point.

The spatial position (X, Y, Z) of the specified point refers to a spatial position coordinates (X, Y, Z) of the specified point in the road-vehicle coordinate system XYZ obtained by equation (54).

The change in the spatial position refers to the change of a specified point, seen from the road, from the spatial position associated with the image plane at the preceding processing period. It is obtained by subtracting the moving distance of the vehicle during the processing period from the changes (ΔX, ΔY, ΔZ) in the spatial position coordinates (X, Y, Z). If the change in the spatial change is not known, all bits are made 1 to represent this.

Figure 30A:
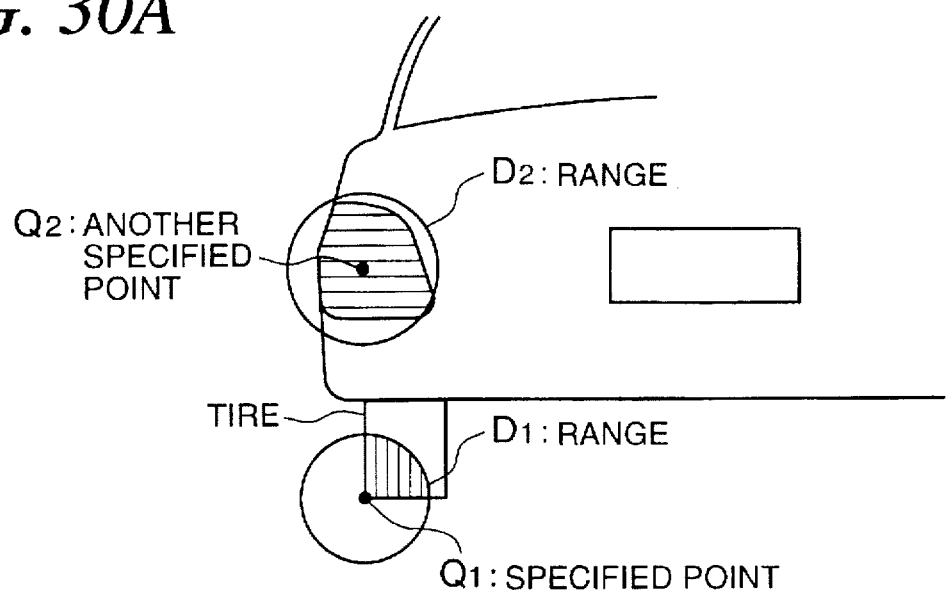
FIG. 30A illustrates a specified point $Q_1$ at the end of the left-rear wheel of a foregoing vehicle, a predetermined range D1, a specified point $Q_2$ in the left reverse light, and a predetermined range $D_2$.
Figure 30B:
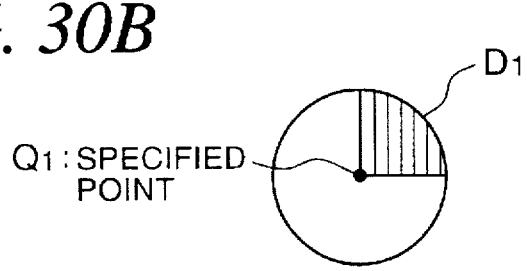
FIG. 30B illustrates the predetermined range $D_1$ and the specified point $Q_1$ therein cut off from FIG. 30A.
Figure 30C:
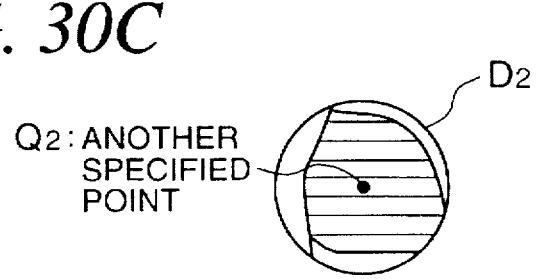
FIG. 30C illustrates the predetermined range $D_2$ and the specified point $Q_2$ therein cut off from FIG. 30A.

The characteristics of an image near a specified point is information used for identifying the specified point in the image plane at the current processing period with that at the preceding processing period. FIG. 30A shows a specified point $Q_1$ at a bottom end of the left-rear wheel of a foregoing vehicle, and a predetermined range $D_1$ associated with $Q_1$, and a specified point $Q_2$ in the left reverse light and a predetermined range $D_2$ associated with $Q_2$. FIG. 30B shows the predetermined range $D_1$ and the specified point $Q_1$ therein cut off from FIG. 30A, and FIG. 30C shows the predetermined range $D_2$ and the specified point $Q_2$ therein cut off from FIG. 30A. Comparing FIG. 30B with FIG. 30C, since the characteristics of image near the specified points differ from each other in color tones or form, the specified points $Q_1$ and $Q_2$ can be readily distinguished.

Thus, three primary color image data r, g and b of all pixels in a predetermined range around a specified point, or those of representative pixels determined from geometric relationships such as the center of a contour image is adopted as information for identifying the specified point. Alternatively, the surface integral values of the three primary color image data r, g and b of those pixels may be adopted. Still alternatively, the linear sum P of the surface integral values given by the following equation may be used.

$$P = j_1 \left| \int_D r_1 dS \right| + j_2 \left| \int_D g_1 dS \right| + j_3 \left| \int_D db S \right| \quad (80A)$$

where ∫dS represents a surface integral value. When a specified point is on the contour, the information may be represented by the three primary color image data r, g and b of the pixels constituting the contour. The line integral value of these primary color image data r, g and b, or the linear sum of these data can also be adopted. When an internal point of a contour is selected as a specified point, three primary color image data r, g and b, which are associated with pixels within a predetermined range from the specified point and inside the contour, may be selected, or the surface integral values of the three primary color image data r, g and b of these pixels, or the linear sum of these integral values may be used as the identification information. If the identification information at the preceding processing period agrees with that at the current processing periods, or their difference is in an allowable range, the specified point in the image plane at the current processing period can be considered identical to that at the preceding processing period.

Next, the procedure of the tracking recognition of an object will be described with reference to a flowchart of FIGS. 31–35. The processing is executed at every predetermined mileage interval or at every predetermined time interval during the traveling of the vehicle, after the initial processing has been completed.

Figure 31:
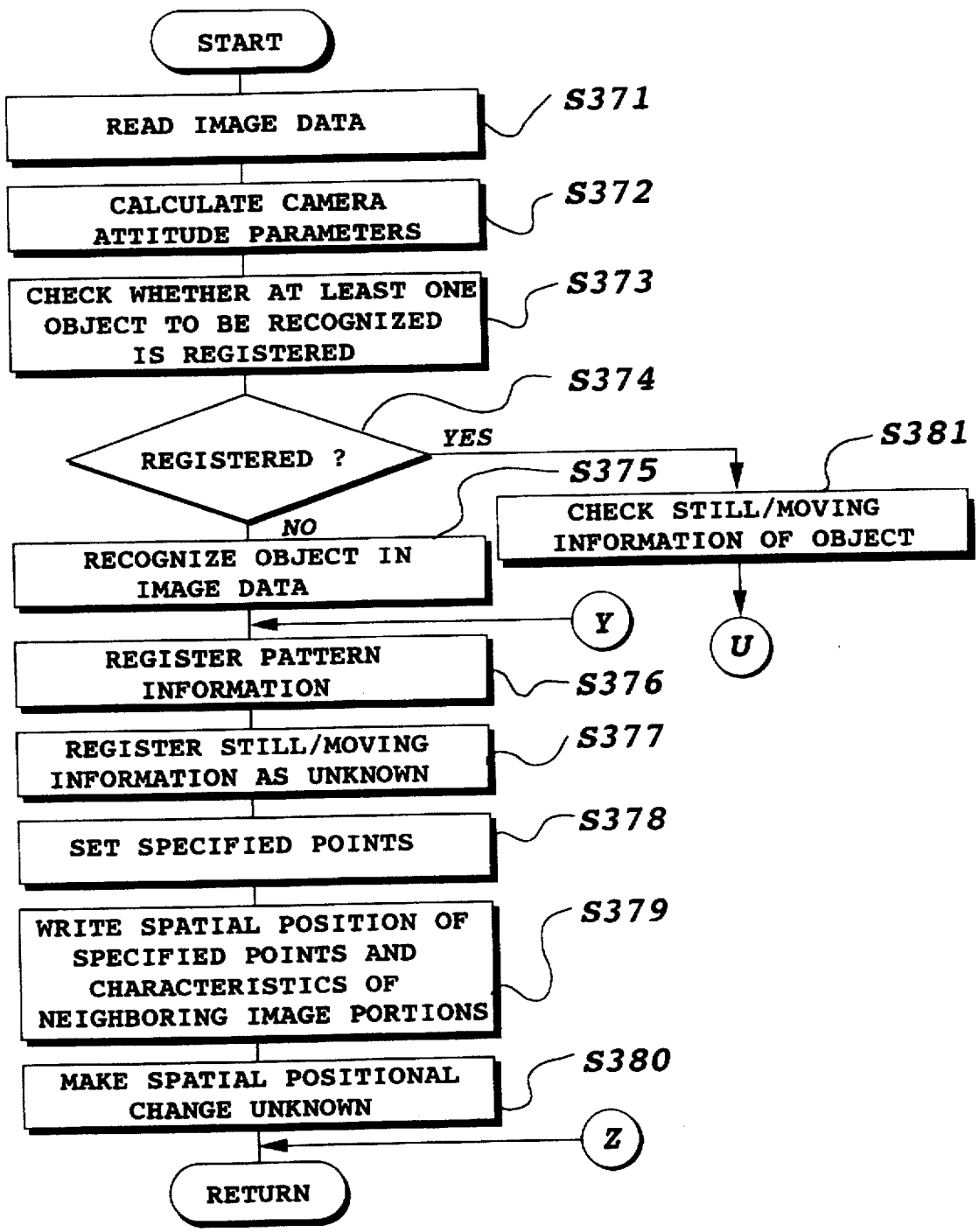
FIGS. 31-35 are flowcharts for explaining the procedures of a tracking recognition processing of an object.

First, image data acquired by the on-vehicle camera 11 is read at step S371 of FIG. 31. At step S372, the attitude parameters of the on-vehicle camera 11 are calculated through the processes described under the heading of "5. The Attitude Parameter Calculation Processing of the On-Vehicle Color Camera".

After that, the object registration table of FIG. 36A and the specified point registration table of FIG. 36B are referred to.

First, the object registration table is searched at step S373, and a decision is made whether at least one object to be recognized is registered therein at step S374. If it is registered, the processing. proceeds to step S381. If the image data is the first one, no object has been registered in the object registration table, and hence, the processing proceeds to step S375, at which the processing extracts all contours of images included in the image plane on the basis of the image data, thereby recognizing the image patterns. In this case, objects to be recognized may be restricted in accordance with the purpose of navigating the vehicle. For example, if the purpose is the safe operation of the vehicle, only moving objects may be selected as the objects to be recognized. On the other hand, if the purpose is the navigation of the vehicle to a destination based on the navigation information shown on the display unit 29 of the position detection processing unit 2, only still objects such as road signs and traffic signals may be selected as the objects to be recognized.

At step S376, sequence numbers are assigned to recognized objects such as vehicles, road signs, pedestrians, and the mark of presence is written into the presence or absence column of the registration table, followed by writing of the pattern information thereof. Then, the still/moving information is registered as "unknown" at step S377. In addition, one or more specified points are set on the basis of the contours of the extracted images, and the number of the specified points is registered at step S378.

Subsequently, the spatial position coordinates (X, Y, Z) of the specified points and the characteristics of an image near each specified point are registered at step S379. Then, the spatial position change of the specified points from the spatial position at the preceding processing period is registered as "unknown" at step S380, and the processing returns to the start. This is because the spatial position change cannot be calculated because of the lack of image data of the preceding processing period.

If it is found at the next processing period that one or more objects have been registered, the processing proceeds from step S374 to step S381, at which the still/moving information in the object registration table is checked.

Figure 32A:
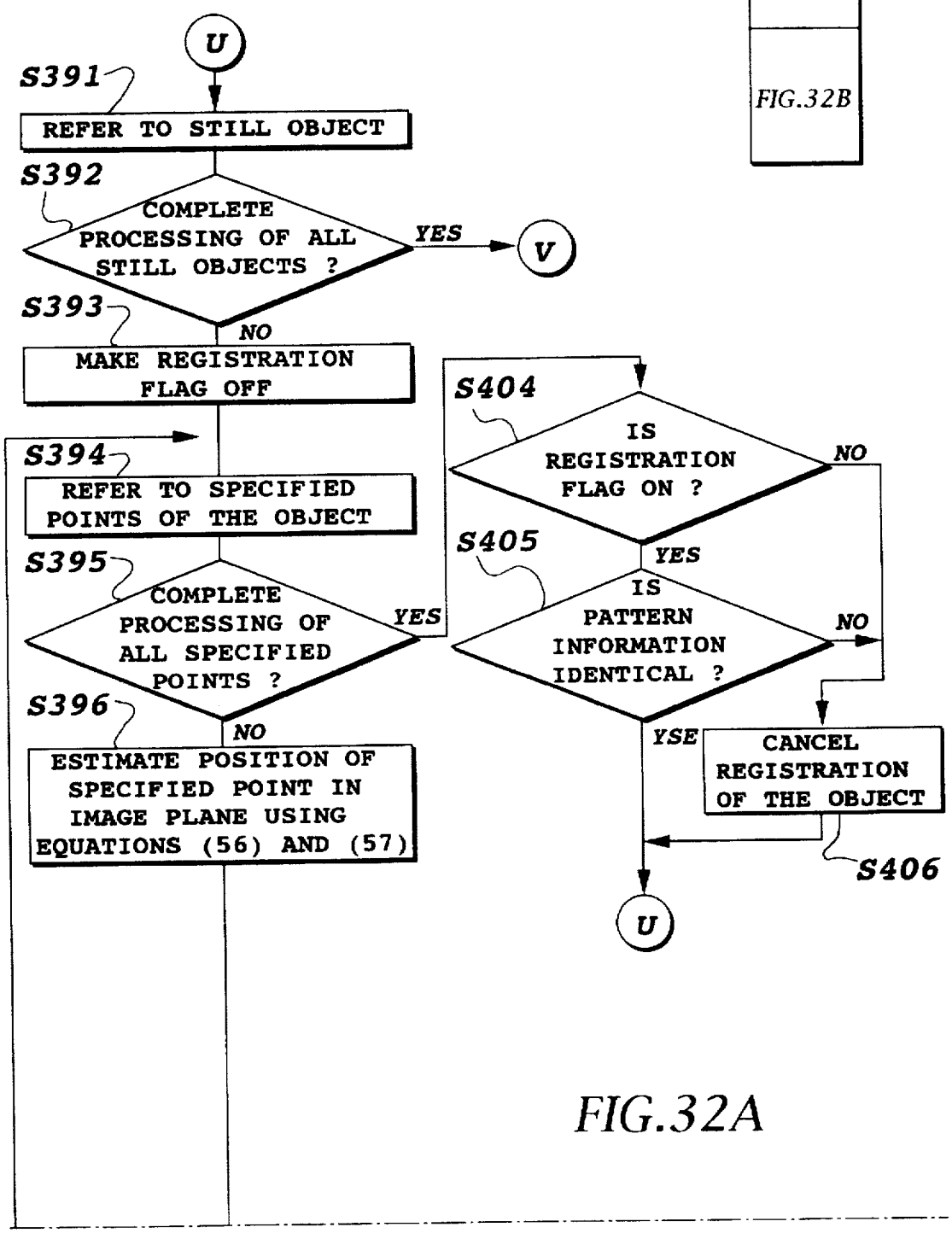
Figure 32B:
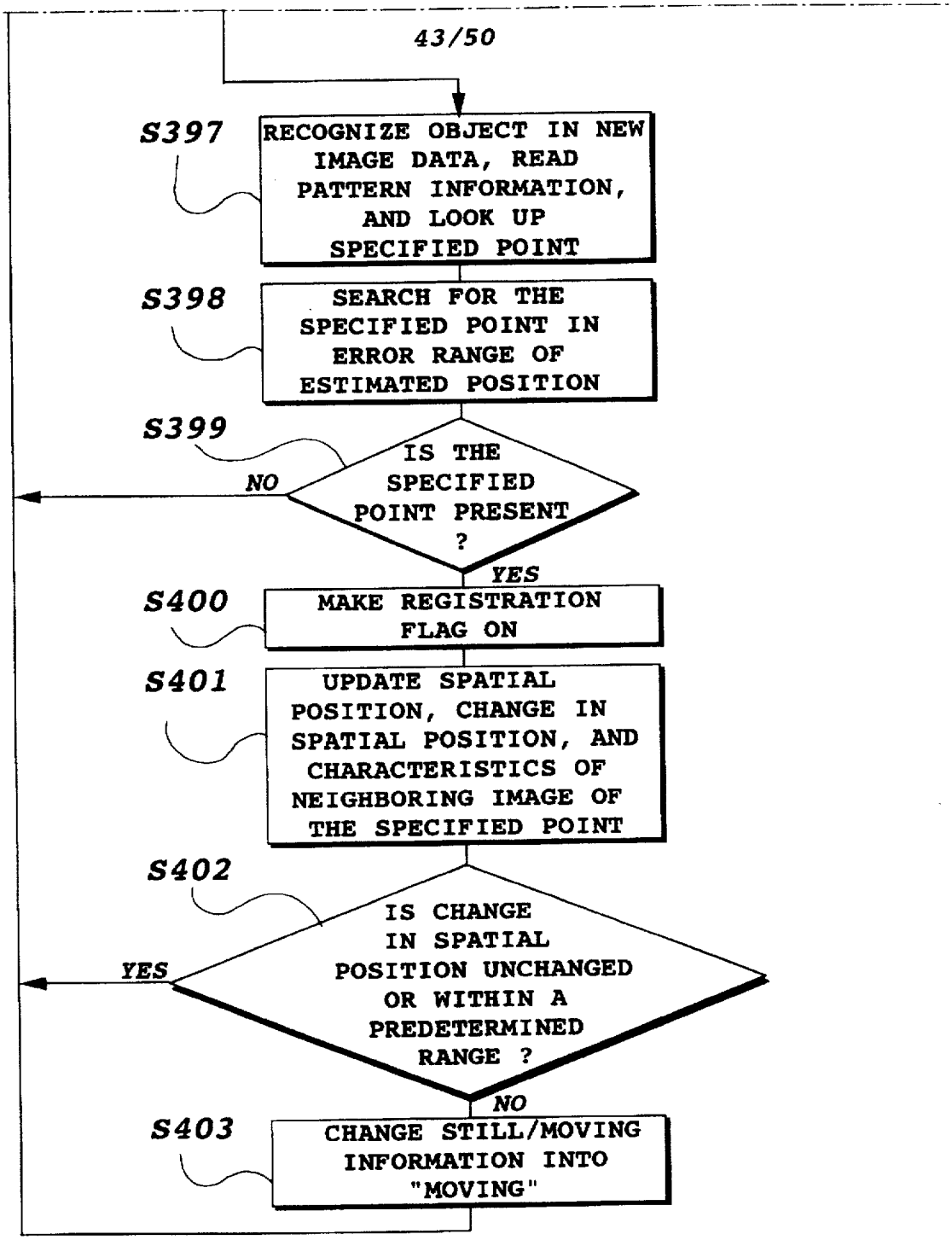
Figure 33A:
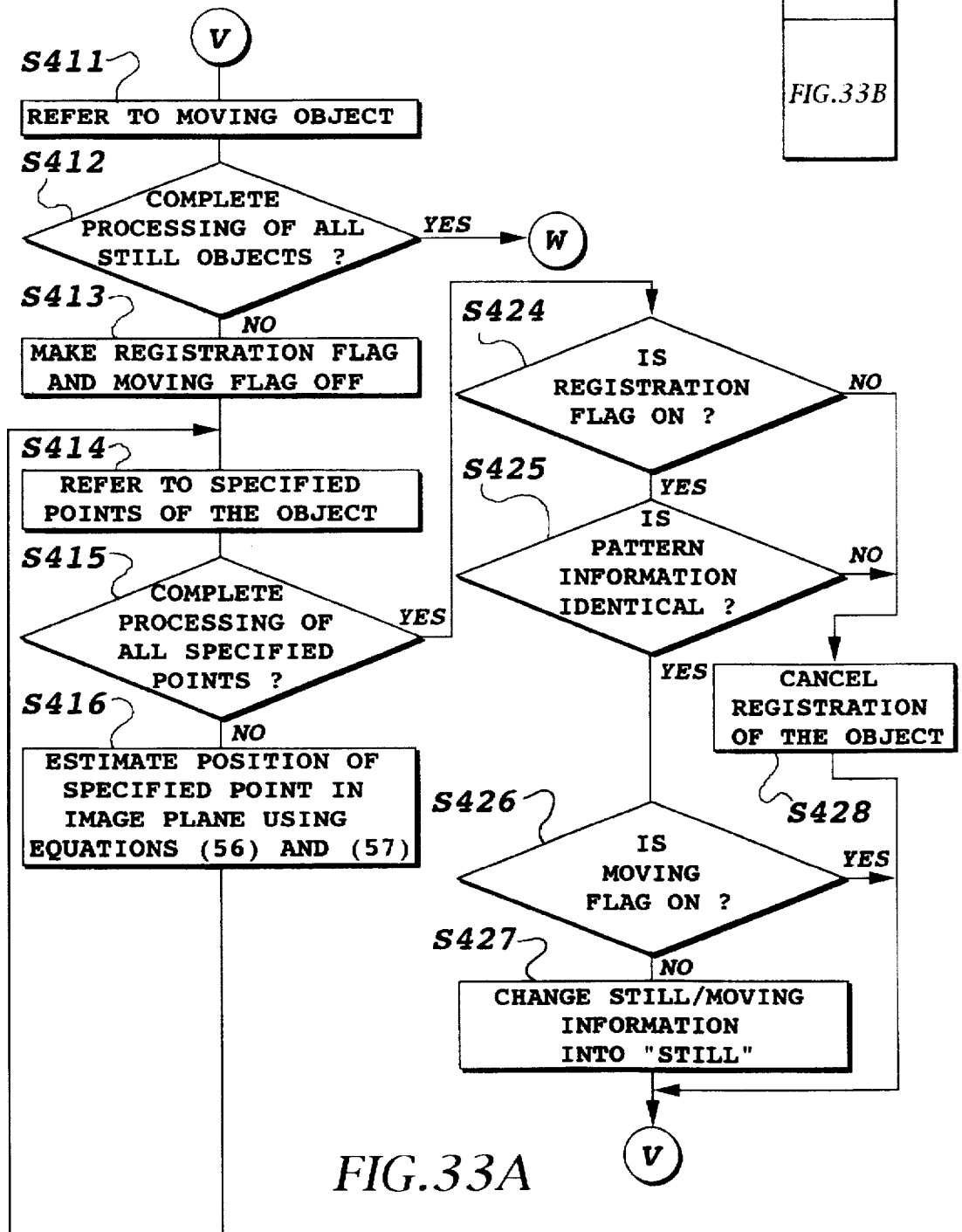
Figure 33B:
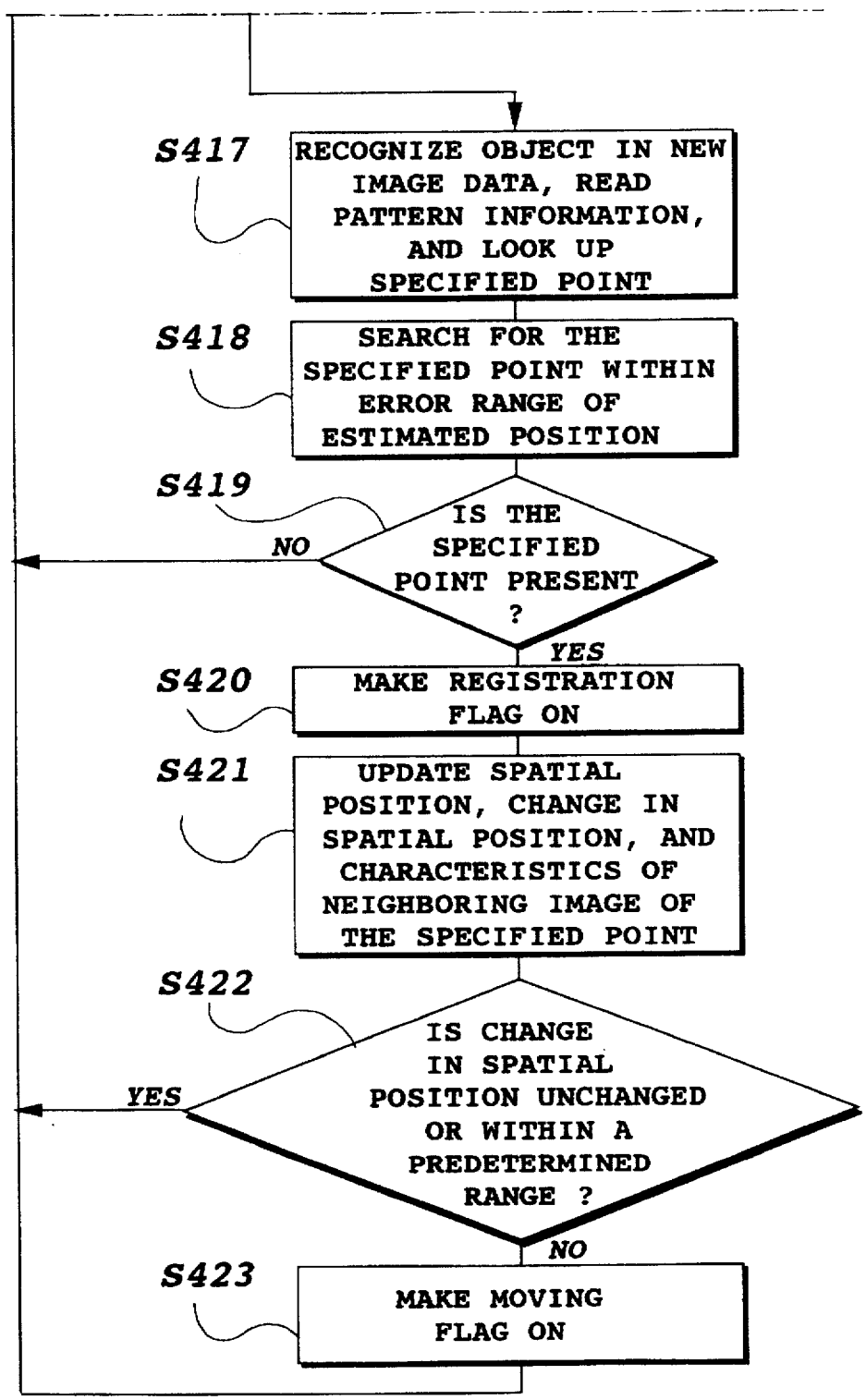
Figure 34B:
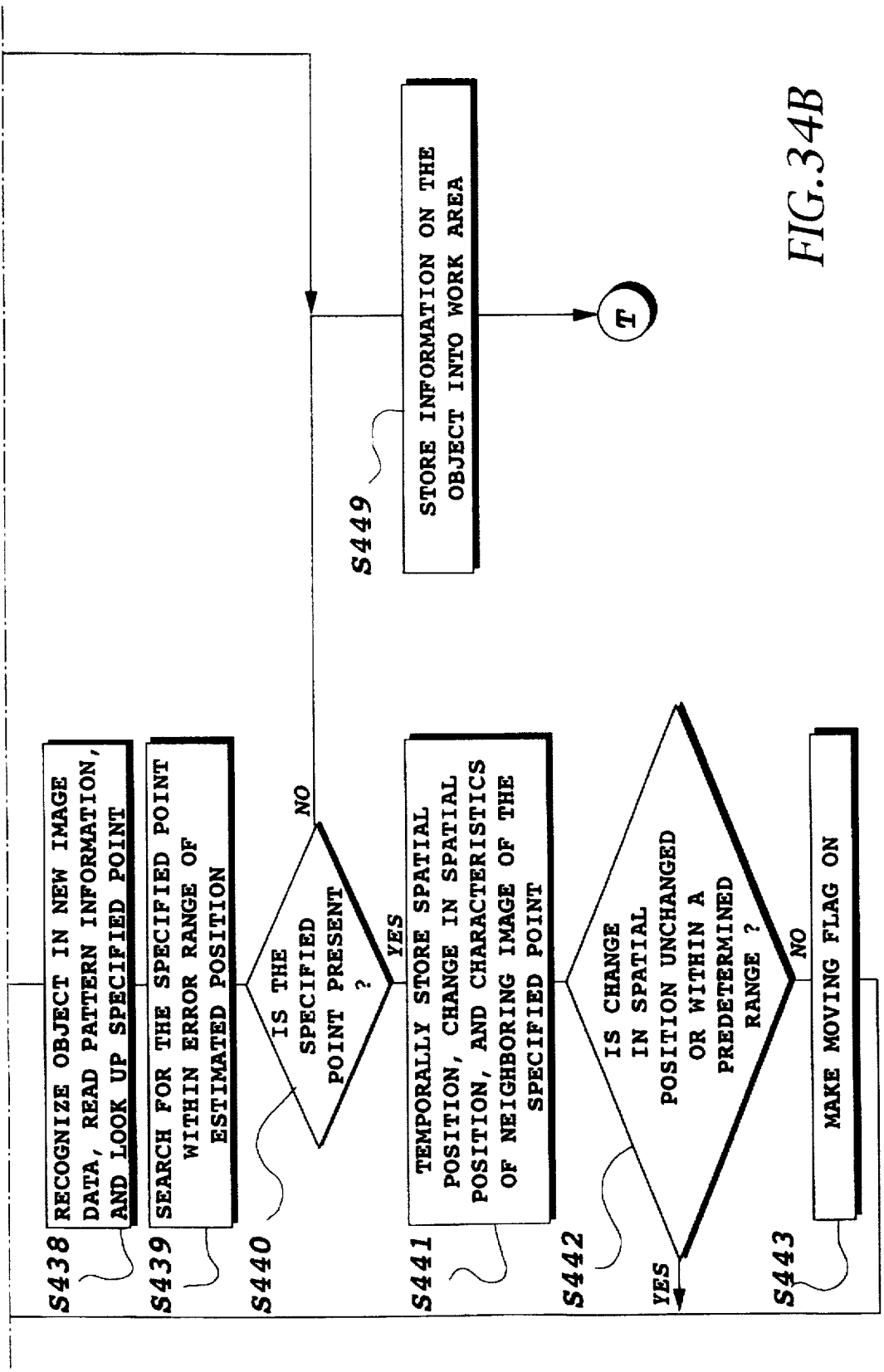

First, an object whose still/moving information is "still" is looked up. FIGS. 32A and 32B are flowcharts for processing an object whose still/moving information is "still". In this processing, an object whose still/moving information is "still" is looked up at step S391, and if it is found, its registration flag is made off at step S393. The registration flag represents whether the specified points in the object are traceable or not. Specifically, if at least one of the specified points in the object is traceable from the preceding processing period to the current processing period, its registration flag is made on.

Then, the specified points of the object are looked up in the specified point registration table at step S394. If a specified point is found, its spatial position (X, Y, Z) at the current processing period is estimated in accordance with the foregoing equation (54) In addition, the position (x', y') of the specified point in the image plane at the current processing period is estimated in accordance with the foregoing equations (56) and (57) at step S396.

Subsequently, the object is recognized on the basis of the new image data, and the pattern data thereof are obtained from the object registration table. Then, the specified point and the characteristics of the neighboring image of that specified point are looked up at step S397. A time required to look up the specified point can be shortened by using contour information associated with the object whose registration is confirmed, and the image data whose internal area is masked. At step S398, looking. up information such as the speed, the change in the moving direction, and the reliability of the attitude parameters of the vehicle, the error range σ of the estimated position is obtained, and the presence of the specified point in that error range is tested by checking the characteristics of the neighboring image. Since this test limits its look up range to the error range σ, an advantage is derived that a test time can be shortened. The check rules of the characteristics of the neighboring image are as follows: First, when the specified point is set on the contour of the object, the rule is that the direction of the contour substantially agrees with that of the reference pattern, and that the characteristics at both sides of the contour agree with those of the reference pattern. On the other hand, if the specified point is set at one side of the contour of the image of the object, the rule is that one side of the contour substantially agrees with that of the reference pattern.

If it is decided at step S399 that a specified point is found whose neighboring image characteristics are the same as those of the specified point of the preceding processing period, or in the allowable range thereof the registration flag is made on at step S400, and the spatial position coordinates (X, Y, Z), the spatial position change, and the neighboring image characteristics of the specified point in the specified point registration table are updated to new values at step S401. Then, a decision is made at step S402 whether the spatial position change of the specified point is within a predetermined range. This range is for deciding whether the object is still or moving, and may be set with a sphere or a spheroid whose center is at the origin of the X-Y-Z coordinate system. The radius of the sphere or the spheroid can be determined at an optimum value by actually running the vehicle and carrying out the process with various objects. When the spatial position change of the specified point is out of the predetermined range, the still/moving information of the object is changed to "moving" at step S403.

When the specified point is not found in the error range σ at step S399, the processing returns to step S394 without updating the spatial position coordinates or the like of the specified point. This can be replaced, however, by the processing of obtaining the spatial position coordinates or the like from the searched position (x', y') as long as the position (x', y') is present in the image plane, and thereby updating the contents of the specified point registration table.

Alternatively, as long as the position (x', y') of the specified point estimated in accordance with equations (56) and (57) is present in the image plane, the spatial position coordinates or the like may be obtained by considering the position (x', y') as the position of the specified point, thereby updating the contents of the specified point registration table.

In addition, if the error range σ itself is masked by another object while searching for the specified point in the error range σ, the specified point will not be found in the error range σ. In such a case, it is preferable to continue the tracking processing of the object by considering the position (x', y') of the specified point estimated in accordance with the foregoing equations (56) and (57) to be the position of the specified point. The masking of the error range σ can be decided by using the spatial position coordinates (X, Y, Z) of the specified point registration table.

After the processing of all the specified points associated with the object has been completed, the processing proceeds to step S404, at which the registration flag is tested whether it is ON. If it is ON, a decision is made at step S405 whether the type and the color tone of the object agree with those of the pattern information of the object registration table associated with the object. If they are the same, or in an allowable range, the tracking of the object is considered successful, and the processing returns to step S391, thereby repeating a similar processing with another still object.

If the registration flag is not ON, this means that no specified point of the object is found in the error range associated with the estimated position of that specified point in the new image. Accordingly, a decision is made that the object is lost, and hence, the registration thereof is deleted from the object registration table at step S406.

After the processing of all the still objects has been completed, the objects whose still/moving information is "moving" will be processed. In this processing, an object whose still/moving information is "moving" is looked up at step S411, and if it is found, its registration flag and moving flag are made ON at step S413. The moving flag represents whether the object is moving or not.

Then, the specified points of the object are looked up in the specified point registration table at step S414. If a specified point is found, its two-dimensional position (x', y') in the image plane at the current processing period is estimated in accordance with the foregoing equations (56) and (57) at step S416. Subsequently, the object is recognized in the new image data, and its pattern data, specified points and the characteristics of the neighboring image are obtained from the object registration table at step S417. Then, the specified point is searched for whether it is present in the error range σ around its estimated position (x', y') at step S418. It presents an advantage that a time required to look up the specified point can be shortened because the search range is limited to the error range σ. If it is decided at step S419 that a specified point is found whose neighboring image characteristics are the same as those of the specified point of the preceding processing period, or in the allowable range thereof, the registration flag is made ON at step S420, and the spatial position coordinates (X, Y, Z), the spatial position change, and the neighboring image characteristics of the specified point in the specified point registration table are updated to new values at step S421. Then, a decision is made at step S422 whether the spatial position change of the specified point is within a predetermined range. This range is for deciding whether the object is still or moving, and may be set with a sphere whose center is at the origin of the XYZ coordinate system. When the spatial position change of the specified point is out of the predetermined range, the moving flag is made ON at step S423.

After the processing of all the specified points associated with the object has been completed, the processing proceeds to step S424, at which the registration flag is tested whether it is ON. If it is ON, a decision is made at step S425 whether the type and the color tone of the object agree with those of the pattern information of the object registration table associated with the object. If they are the same, or similar, the moving flag is tested whether it is ON at step S426. If the moving flag is not ON, a decision is made that the object is not moving, and hence, the still/moving information is changed to "still". Conversely, if the moving flag is ON, it is decided that the object continues to move, and hence, the still/moving information is not changed. In either case, the tracking of the object is considered successful, and the processing returns to step S421, thereby repeating a similar processing with another moving object.

If the registration flag is not ON at step S424, this means that no specified point of the object is found in the error range σ associated with the estimated position of that specified point in the new image. Accordingly, a decision is made that the object has been lost, and hence, the registration thereof is deleted from the object registration table at step S428. In addition, if the pattern information of the object does not agree at step S425, it is considered that the object has been lost, and the registration thereof is deleted at step S428.

After the processing of all the moving objects has been completed, the processing moves to the recognition of objects whose still/moving information is unknown. In this processing, an object whose still/moving information is "unknown" is looked up at step S431, and if it is found, its moving flag is made OFF at step S433. Then, temporarily stored data which are temporarily stored in a buffer area of the memory portion 17, and are associated with the spatial position or the like of specified points of the object are cleared at step S434, and the presence or absence of the specified points of the object is tested at step S435. If a specified point is found, assuming that the specified point is still, its two-dimensional position (x', y') in the image plane at the current processing period is estimated in accordance with the foregoing equation (54) at step S437. The specified point is assumed to be still because the still/moving information of the specified point is unknown, and hence, tracking of the object is tried by obtaining the estimated position in accordance with equation (54) under this assumption. Thus, the object is recognized in the new image data, and its pattern data, specified points and the characteristics of the neighboring image are obtained from the object registration table at step S438. Then, the specified point is searched for whether it is present in the error range σ around its estimated position (x', y') at step S439.

If it is decided at step S440 that a specified point is found whose neighboring image characteristics are the same as those of the specified point of the preceding processing period, or similar thereto, this means that the specified point assumed to be still is identified. Thus, the spatial position coordinates (X, Y, Z), the spatial position change, and the neighboring image characteristics are temporarily stored in the buffer area in the memory portion 17 at step S441. Then, a decision is made at step S442 whether the spatial position change of the specified point is within a predetermined range. When the spatial position change of the specified point is out of the predetermined range, the moving flag is made ON at step S443.

After the processing of all the specified points associated with the object has been completed, the processing proceeds to step S444, at which the pattern information of the object is compared with that of the object registration table. If they are the same, or similar, the temporarily stored spatial position coordinates (X, Y, Z), the spatial position change, and the neighboring image characteristics of the specified point are stored into the specified point registration table at step S445. Subsequently, the moving flag is tested whether it is ON at step S446. If the moving flag is not ON, the still/moving information of the object is made "still" at step S447, whereas if still/moving flag is ON, the still/moving information of the object is made "moving" at step S448.

Figure 35:
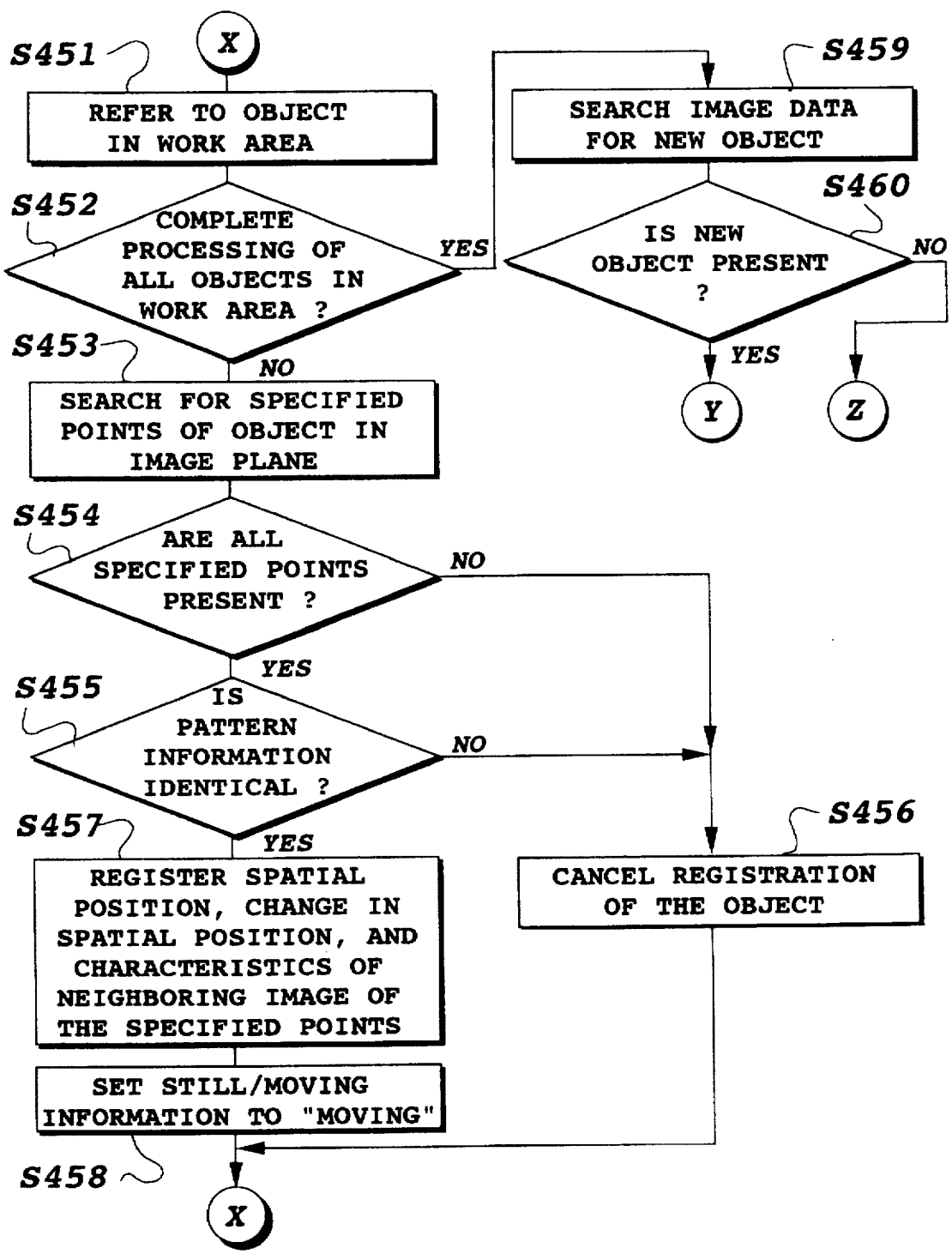

If no specified point of the object is found in the error range σ of the new image at step S440, or the pattern information does not agree at step S444, the information associated with the object is stored in a work area at step S449 instead of deleting the registration information of the object, and proceeds to the flowchart of FIG. 35.

In the processing of FIG. 35, an additional recognition processing (a kind of a repechage processing) is carried out with the object whose data are stored in the work area.

The reason to perform this processing is as follows: The object of the processing is one whose still/moving information has been made "unknown" at step S377 of FIG. 31, and the tracking thereof as a still object has been failed at step S437 of FIG. 34A. In other words, the object is a moving one whose motion characteristics are unknown. Accordingly, the foregoing equation (58), which takes account of the temporal, positional change of a moving object, cannot be used. Accordingly, the processing of FIG. 35 resigns estimating the error range σ and searching for a specified point therein, and broadens its searching area to the entire image plane. This will makes it possible to recognize the object with considerable accuracy even if it is located at unexpected position.

First, the data of the object stored in the work area is looked up at step S451 of FIG. 35. Subsequently, the object in the image plane is recognized, and the image plane is searched for the specified points of the object at step S453. Then, checking the neighboring image. characteristics, a decision is made at step S454 whether the entire specified points of the object stored in the work area are present in the image plane or not. If the entire specified points are present in the image plane, the agreement or disagreement of the pattern information of the object is decided at step S455. If the pattern information agrees, the tracking of the object is considered successful, and the spatial position coordinates (X, Y, Z), the spatial position change, and the neighboring image characteristics of the specified point are registered to the specified point registration table at step S457. Then, the still/moving information of the object is made "moving" at step S458. This is because if the object were still, the tracking of the object would have been successful in the processing of FIG. 32A and 32B or 34, and so, the object must be considered moving. Even if one of the specified point of the object is absent, or the pattern information of the object does not agree, the registration of the object is deleted at step S456. The deletion is carried out even if one of the specified point is absent, because it is highly possible that a recognition error has occurred in this case.

When the foregoing processings have been completed with all the objects whose data are stored in the work area, the image data is searched for an unregistered object at step S459. If a new object is recognized at step S460, the processing returns to step S376 of FIG. 31, at which the pattern information thereof is written. In addition, the still/moving information is made unknown at step S377, specified points of the object are set and the number thereof is registered at step S378, the spatial position coordinates (X, Y, Z) and the neighboring image characteristics of the specified point are registered at step S379, and the spatial position change of the specified point as compared with the spatial position at the preceding processing period is registered as unknown.

If no new object is found at step S460, the processing returns to "RETURN" of FIG. 31.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A camera attitude parameter generating apparatus comprising:

an on-vehicle camera mounted on a vehicle to acquire an image ahead of or behind the vehicle;

means for detecting a pair of road parallel lines in the image acquired by said on-vehicle camera while the vehicle is traveling on a road, each of said road parallel lines being parallel with the longitudinal direction of the road;

means for obtaining the intersection of the pair of orad parallel lines, thereby generating the intersection as a road vanishing point;

parameter generating mean for generating at least one of camera attitude parameters on the basis of the pair of road parallel lines and the road vanishing point, said camera attitude parameters representing the attitude of said on-vehicle camera with respect to the road; and a position detection device including sensors and road map data, said position detection device detecting first support information including a bearing, a position, and a mileage of the vehicle, wherein said parameter generating means uses the first support information in generating said camera attitude parameters, and wherein said parameter generating means obtains the bearing of the vehicle from the position detection device, and inhibits the generation of the camera attitude parameters if the change in the bearing of the vehicle is greater than a predetermined value.

2. A camera attitude parameter generating apparatus comprising:

an on-vehicle camera mounted on a vehicle to acquire an image ahead of or behind the vehicle;

means for detecting a pair of road parallel lines in the image acquired by said on-vehicle camera while the vehicle is traveling on a road, each of said road parallel lines being parallel with the longitudinal direction of the road;

means for obtaining the intersection of the pair of orad parallel lines, thereby generating the intersection as a road vanishing point;

parameter generating mean for generating at least one of camera attitude parameters on the basis of the pair of road parallel lines and the road vanishing point, said camera attitude parameters representing the attitude of said on-vehicle camera with respect to the road; and a position detection device including sensors and road map data, said position detection device detecting first support information including a bearing, a position, and a mileage of the vehicle, wherein said parameter generating means uses the first support information in generating said camera attitude parameters, and wherein said position detection device provides said parameter generating means with information associated with the acceleration of the vehicle, and said parameter generating means inhibits the generation of the camera attitude parameters when the acceleration exceeds a predetermined value.

3. A camera attitude parameter generating apparatus comprising:

an on-vehicle camera mounted on a vehicle to acquire an image ahead of or behind the vehicle;

means for detecting a pair of road parallel lines in the image acquired by said on-vehicle camera while the vehicle is traveling on a road, each of said road parallel lines being parallel with the longitudinal direction of the road;

means for obtaining the intersection of the pair of orad parallel lines, thereby generating the intersection as a road vanishing point;

parameter generating mean for generating at least one of camera attitude parameters on the basis of the pair of road parallel lines and the road vanishing point, said camera attitude parameters representing the attitude of said on-vehicle camera with respect to the road; and a position detection device including sensors and road map data, said position detection device detecting first support information including a bearing, a position, and a mileage of the vehicle, wherein said parameter generating means uses the first support information in generating said camera attitude parameters, and wherein said parameter generating means generates the camera attitude parameters at a predetermined interval of mileage or time, and generates averages of the generated camera attitude parameters as parameters associated with the attitude of the on-vehicle camera with respect to the vehicle.

4. A camera attitude parameter generating apparatus comprising:

an on-vehicle camera mounted on a vehicle to acquire an image ahead of or behind the vehicle;

road parallel line detecting means for detecting a pair of road parallel lines in the image acquired by said on-vehicle camera while the vehicle is traveling on a road, each of said road parallel lines being parallel with the longitudinal direction of the road;

road vanishing point generating means for obtaining the intersection of the pair of road parallel lines, thereby generating the intersection as a road vanishing point;

yaw angle observation means for observing the yaw angle of the on-vehicle camera with respect to the road on the basis of a coordinate of the road vanishing point, thereby outputting an observed yaw angle;

a position detection device having sensors and road map data, said position detection device detecting first support information including a bearing, a position, a mileage, and changes in the bearing of the vehicle;

yaw angle estimation means for estimating the yaw angle of the on-vehicle camera with respect to the road by applying the previously obtained yaw angle with respect to the road and the changes in the direction of the vehicle to a recursion formula prepared in advance, thereby outputting an estimated yaw angle; and yaw angle generating means for generating the yaw angle of the on-vehicle camera with respect to the road by using at least one of the observed yaw angle and the estimated yaw angle, wherein said yaw angle generating means obtains the difference between the estimated yaw angle and the observed yaw angle, obtains a weighted average of the estimated yaw angle and the observed yaw angle, and outputs the weighted average as the yaw angle, if the difference is within a predetermined range.

5. A camera attitude parameter generating apparatus comprising:

an on-vehicle camera mounted on a vehicle to acquire an image ahead of or behind the vehicle;

road parallel line detecting means for detecting a pair of road parallel lines in the image acquired by said on-vehicle camera while the vehicle is traveling on a road, each of said road parallel lines being parallel with the longitudinal direction of the road;

road vanishing point generating means for obtaining the intersection of the pair of road parallel lines, thereby generating the intersection as a road vanishing point;

yaw angle observation means for observing the yaw angle of the on-vehicle camera with respect to the road on the basis of a coordinate of the road vanishing point, thereby outputting an observed yaw angle;

a position detection device having sensors and road map data, said position detection device detecting first support information including a bearing, a position, a mileage, and changes in the bearing one the vehicle;

yaw angle estimation means for estimating the yaw angle of the on-vehicle camera with respect to the road by applying the previously obtained yaw angle with respect to the road and the changes in the direction of the vehicle to a recursion formula prepared in advance, thereby outputting an estimated yaw angle; and yaw angle generating means for generating the yaw angle of the on-vehicle camera with respect to the road by using at least one of the observed yaw angle and the estimated yaw angle, wherein said yaw angle generating means obtains the difference between the estimated yaw angle and the observed yaw angle, and outputs the estimated yaw angle as the yaw angle of the on-vehicle camera with respect to the road if the difference is greater than a predetermined value.

6. The camera attitude parameter generating apparatus as claimed in claim 5, wherein said yaw angle generating means outputs the observed yaw angle as the yaw angle of the on-vehicle camera with respect to the road when the estimated yaw angle has been made the yaw angle of the on-vehicle camera for more than a predetermined interval.

7. A camera attitude parameter generating apparatus comprising:
- an on-vehicle camera mounted on a vehicle to acquire an image ahead of or behind the vehicle;
- road parallel line detecting means for detecting a pair of road parallel lines in the image acquired by said on-vehicle camera while the vehicle is traveling on a road, each of said road parallel lines being parallel with the longitudinal direction of the road;
- road vanishing point generating means for obtaining the intersection of the pair of road parallel lines, thereby generating the intersection as a road vanishing point;
- yaw angle observation means for observing the yaw angle of the on-vehicle camera with respect to the road on the basis of a coordinate of the road vanishing point, thereby outputting an observed yaw angle;
- a position detection device having sensors and road map data, said position detection device detecting first support information including a bearing, a position, a mileage, and changes in the bearing of the vehicle;
- yaw angle estimation means for estimating the yaw angle of the on-vehicle camera with respect to the road by applying the previously obtained yaw angle with respect to the road and the changes in the direction of the vehicle to a recursion formula prepared in advance, thereby outputting an estimated yaw angle;
- yaw angle generating means for generating the yaw angle of the on-vehicle camera with respect to the road by using at least one of the observed yaw angle and the estimated yaw angle;
- slope detecting means for detecting the slope of each road parallel line outputted from the road parallel line generating means;
- traverse deviation distance observation means for observing a traverse deviation distance of said on-vehicle camera from a predetermined reference line parallel with the road by using the slope of the road parallel lines detected by said slope detecting means and the height of said on-vehicle camera from the surface of the road, thereby outputting an observed traverse deviation distance;
- traverse deviation distance estimation means for estimating the traverse deviation distance of said on-vehicle camera with respect to the road by obtaining the mileage of the vehicle included in the first support information supplied from said position detection device, and by applying a previously obtained traverse deviation distance of the on-vehicle camera with respect to the road and the mileage of the vehicle to a recursion formula prepared in advance; and
- traverse deviation distance generating means for generating the traverse deviation distance of the on-vehicle camera with respect to the road by using at least one of the observed traverse deviation distance and the estimated traverse deviation distance.

8. The camera attitude parameter generating apparatus as claimed in claim 7, wherein said traverse deviation distance generating means selects said estimated traverse deviation distance as the traverse deviation distance of the on-vehicle camera with respect to the road when the observed traverse deviation distance is not obtained by the traverse deviation distance observation means.

9. The camera attitude parameter generating apparatus as claimed in claim 7, wherein said traverse deviation distance generating means obtains the difference between the estimated traverse deviation distance and the observed traverse deviation distance, and outputs the estimated traverse deviation distance as the traverse deviation distance of the on-vehicle camera with respect to the road if the difference is greater than a predetermined value.

10. The camera attitude parameter generating apparatus as claimed in claim 7, wherein said traverse deviation distance generating means suppresses the output of the traverse deviation distance of the on-vehicle camera with respect to the road until a turn of the vehicle has been completed when the turn is detected on the basis of the first support information supplied from the position detection device.

* * * * *